US012287350B2

(12) United States Patent
Ge et al.

(10) Patent No.: US 12,287,350 B2
(45) Date of Patent: Apr. 29, 2025

(54) SAMPLE ANALYSIS WITH MIRRORS

(71) Applicant: President and Fellows of Harvard College, Cambridge, MA (US)

(72) Inventors: Shencheng Ge, Boston, MA (US); Yunzhe Wang, Baltimore, MD (US); Nicolas J. Deshler, Berkeley, CA (US); Daniel J. Preston, Houston, TX (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1074 days.

(21) Appl. No.: 17/056,142

(22) PCT Filed: May 17, 2019

(86) PCT No.: PCT/US2019/032797
§ 371 (c)(1),
(2) Date: Nov. 17, 2020

(87) PCT Pub. No.: WO2019/222582
PCT Pub. Date: Nov. 21, 2019

(65) Prior Publication Data
US 2021/0341369 A1 Nov. 4, 2021

Related U.S. Application Data

(60) Provisional application No. 62/681,756, filed on Jun. 7, 2018, provisional application No. 62/673,405, filed on May 18, 2018.

(51) Int. Cl.
*C12Q 1/68* (2018.01)
*G01N 9/18* (2006.01)

(52) U.S. Cl.
CPC ...................................... *G01N 9/18* (2013.01)

(58) Field of Classification Search
CPC ............. G01N 9/18; G01N 2021/1727; G01N 21/1717; G01N 21/253
See application file for complete search history.

(56) References Cited

U.S. PATENT DOCUMENTS 3,579,306 A * 5/1971 Crane .................... A61B 10/00
422/402
6,586,193 B2 7/2003 Yguerabide et al.
(Continued)

OTHER PUBLICATIONS

Larson et al. (Nature Protocols, 2014, 9(10):2317-2328) (Year: 2014).*

(Continued)

*Primary Examiner* — Stephanie K Mummert
(74) *Attorney, Agent, or Firm* — Wilmer Cutler Pickering Hale and Dorr LLP

(57) ABSTRACT

A device is disclosed, including: a plate including a sample deposition tube adapted to receive a sample comprising one or more analytes, the sample deposition tube defining a vertical axis substantially perpendicular to a main surface of the plate; and a mirror positioned to project, substantially parallel to the main surface of the plate, an image of the sample deposition tube along its vertical axis, so as to allow determination of the vertical location of the one or more analytes inside the sample deposition tube. Methods for determining the density of one or more analytes using various embodiments of the device are also described.

22 Claims, 61 Drawing Sheets

(56) References Cited

U.S. PATENT DOCUMENTS

| | | | |
|---|---|---|---|
| 7,491,366 B2* | 2/2009 | Tokhtuev | G01N 21/51 422/82.05 |
| 7,815,858 B2 | 10/2010 | Sevigny et al. | |

OTHER PUBLICATIONS

Le et al. (Lab Chip, 2009, 9:244-250) (Year: 2009).*

Andersen et al., "Detection of membrane-bound and soluble antigens by magnetic levitation," Lab on a Chip, Sep. 5, 2017, vol. 17, pp. 3462-3473.

Benz et al., "Employing Magnetic Levitation to Monitor Reaction Kinetics and Measure Activation Energy," Journal of Chemical Education, Apr. 6, 2012, vol. 89, pp. 776-779.

Bloxham et al., "Fractionating Polymer Microspheres as Highly Accurate Density Standards," Analytical Chemistry, Jun. 19, 2015, vol. 87, pp. 7485-7491.

Bwambok et al., "Paramagnetic Ionic Liquids for Measurements of Density Using Magnetic Levitation," Analytical Chemistry, Aug. 23, 2013, vol. 85, pp. 8442-8447.

Calleja, F. J. B., "Magnetic Susceptibility as an Application to the Study of Order-Disorder Phenomena in Polymers," Journal of Polymer Science: Part C (1969), No. 16, pp. 4311-4321.

Cugat et al., "Magnetic Micro-Actuators and Systems (MAG-MAS)," IEEE Transactions on Magnetics, Nov. 2003, vol. 39, pp. 3607-3612.

Durmus et al., "Magnetic levitation of single cells," Proc. Natl. Acad. Sci., published online Jun. 29, 2015, vol. 112, E3661-E3668.

Fabry et al., "Dense Cells in Sickle Cell Anemia: The Effects of Gene Interaction," Blood, Nov. 1984, vol. 64(5), pp. 1042-1046.

Ge et al., "Magnetic Levitation to Characterize the Kinetics of Free-Radical Polymerization," J. Am. Chem. Soc., Dec. 6, 2017, vol. 139, pp. 18688-18697.

Grover et al., "Measuring single-cell density," PNAS, Jul. 5, 2011, vol. 108(27), pp. 10992-10996.

International Search Report and Written Opinion mailed Sep. 18, 2019, in the International Application No. PCT/US19/32797. 15 pages.

Knowlton et al., "Sickle cell detection using a smartphone," Scientific Reports, Oct. 22, 2015, vol. 5:15022, 11 pages.

Kumar et al., "Density-based separation in multiphase systems provides a simple method to identify sickle cell disease," Proc. Natl. Acad. Sci., Oct. 14, 2014, vol. 111, pp. 14864-14869.

Lara et al., "Enrichment of rare cancer cells through depletion of normal cells using density and flow-through, immunomagnetic cell separation," Experimental Hematology, Oct. 2004, vol. 32, pp. 891-904.

Mace et al., "Aqueous Multiphase Systems of Polymers and Surfactants Provide Self-Assembling Step-Gradients in Density," J. Am. Chem. Soc., May 17, 2012, vol. 134, pp. 9094-9097.

McCloskey et al., "Magnetic Cell Separation: Characterization of Magnetophoretic Mobility," Anal. Chem., published online Nov. 15, 2003, vol. 75, pp. 6868-6874.

Mirica et al., "Magnetic Levitation in the Analysis of Foods and Water," Journal of Agricultural and Food Chemistry, published online May 13, 2010, vol. 58, pp. 6565-6569.

Mirica et al., "Measuring Densities of Solids and Liquids Using Magnetic Levitation: Fundamentals," J. Am. Chem. Soc., published online Jul. 2, 2009, vol. 131, pp. 10049-10058.

Mirica et al., "Using Magnetic Levitation to Distinguish Atomic-Level Differences in Chemical Composition of Polymers, and to Monitor Chemical Reactions on Solid Supports," JACS, Dec. 8, 2008, vol. 130, pp. 17678-17680.

Nakamura et al., "Differences in Behavior among the Chlorides of Seven Rare Earth Elements Administered Intravenously to Rats," Fundamental and Applied Toxicology, Jun. 1997, vol. 37, pp. 106-116.

Nemiroski et al., "High-Sensitivity Measurement of Density by Magnetic Levitation," Analytical Chemistry, Jan. 27, 2016, vol. 88, pp. 2666-2674.

Nemiroski et al., "Tilted Magnetic Levitation Enables Measurement of the Complete Range of Densities of Materials with Low Magnetic Permeability," J. Am. Chem. Soc., Jan. 2016, vol. 138, pp. 1252-1257.

Pulko et al., "Magnetic separation of Dy(III) ions from homogeneous aqueous solutions," Applied Physics Letters, published online Dec. 11, 2014, vol. 105:232407, 4 pages.

Shapiro et al., "Measuring Binding of Protein to Gel-Bound Ligands Using Magnetic Levitation," J. Am. Chem. Soc., Feb. 24, 2012, vol. 134, pp. 5637-5646.

Sun et al., "Continuous, Flow-Through Immunomagnetic Cell Sorting in a Quadrupole Field," Cytometry, Dec. 1998, vol. 33, pp. 469-475.

Tasoglu et al., "Magnetic Levitational Assembly for Living Material Fabrication," Advanced Healthcare Materials, published online Apr. 14, 2015, vol. 4, pp. 1469-1476.

Thanki et al., "Photo-irradiation induced morphological changes in nylon 66," Polymer, Jan. 2001, vol. 42, pp. 535-538.

Winkleman et al., "A magnetic trap for living cells suspended in a paramagnetic buffer,". Applied Physics Letters, Sep. 20, 2004, vol. 85, pp. 2411-2413.

Xia et al., "Density measurement for polymers by magneto-Archimedes levitation: Simulation and experiments," Polymer Testing, available online Sep. 11, 2017, vol. 63, pp. 455-461.

* cited by examiner

SAMPLE ANALYSIS WITH MIRRORS

CROSS-REFERENCES TO RELATED APPLICATIONS

This application is a National Stage Entry of PCT International Application No. PCT/US2019/032797, filed May 17, 2019, which claims the benefit and priority of U.S. Provisional Patent Application Nos. 62/673,405, filed on May 18, 2018, and 62/681,756, filed on Jun. 7, 2018, the contents of each of which are hereby incorporated by reference in their entirety.

STATEMENT REGARDING FEDERALLY SPONSORED RESEARCH OR DEVELOPMENT

This invention was made with government support under DE-FG02-00ER45852 awarded by the U.S. Department of Energy and 1420570 awarded by the National Science Foundation. The government has certain rights in the invention.

INCORPORATION BY REFERENCE

All patents, patent applications and publications cited herein are hereby incorporated by reference in their entirety in order to more fully describe the state of the art as known to those skilled therein as of the date of the invention described therein.

FIELD OF THE INVENTION

The present disclosure relates generally to the field of analytical chemistry. More particularly, the present disclosure relates to density analysis.

SUMMARY

In one aspect, a device is described, including:
a plate including a sample deposition tube adapted to receive a sample including one or more analytes, the sample deposition tube defining a vertical axis substantially perpendicular to a main surface of the plate; and
a mirror positioned to project, substantially parallel to the main surface of the plate, an image of the sample deposition tube along its vertical axis, so as to allow determination of the vertical location of the one or more analytes inside the sample deposition tube.

In any one or more of the embodiments described herein, the mirror is positioned at about 40° to about 50° with respect to the vertical axis perpendicular to the main surface of the plate.

In any one or more of the embodiments described herein, the mirror is positioned at about 45° with respect to the vertical axis perpendicular to the main surface of the plate.

In any one or more of the embodiments described herein, the device further includes a plurality of said sample deposition tubes and one or more said mirrors, wherein each one of the plurality of mirrors is positioned to project, substantially parallel to the main surface of the plate, an image of one or more of the plurality of the sample deposition tubes along the axis substantially perpendicular to the main surface of the plate.

In any one or more of the embodiments described herein, the device further includes an image-capturing device.

In any one or more of the embodiments described herein, the image-capturing device includes a flatbed scanner, a camera, or a combination thereof.

In any one or more of the embodiments described herein, the device further includes one or more relay lenses configured to focus the projected image.

In any one or more of the embodiments described herein, the main surface of the plate is defined by an x-axis and a y-axis, and wherein the plate includes m sample deposition tubes arranged in a row along the x-axis, n sample deposition tubes arranged in a row along the y-axis, and a plurality of said mirrors each positioned to project, substantially parallel to the main surface of the plate, an image of one of the sample deposition tubes along its vertical axis.

In any one or more of the embodiments described herein, m and n are 2 and 3, 3 and 4, 4 and 6, 6 and 8, 8 and 12, 16 and 24, or 32 and 48, respectively.

In any one or more of the embodiments described herein, the plate includes 6, 12, 24, 48, 96, 384 or 1536 said sample deposition tubes.

In any one or more of the embodiments described herein, the plate includes 96 said sample deposition tubes.

In any one or more of the embodiments described herein, the device further includes a first magnet and a second magnet disposed adjacent to the sample deposition tube to impart a magnetic field that is inside the sample deposition tube; wherein each magnet includes a first pole and a second pole, and the first pole of the first magnet faces the first pole of the second magnet.

In any one or more of the embodiments described herein, the device further includes a third magnet disposed underneath the first magnet and a fourth magnet disposed underneath the second magnet; wherein each of the third and fourth magnets include a first pole and a second pole, and the second pole of the third magnet faces the second pole of the second magnet.

In any one or more of the embodiments described herein, the device further includes a plurality of said sample deposition tubes and a plurality of said first and second magnets.

In any one or more of the embodiments described herein, the sample includes a paramagnetic medium.

In any one or more of the embodiments described herein, the paramagnetic medium includes a paramagnetic salt, a paramagnetic hydrophobic metal chelate, or a paramagnetic ionic liquid.

In any one or more of the embodiments described herein, the paramagnetic salt includes $MnCl_2$, $GdCl_3$, $DyCl_3$, $MnBr_2$, $CuSO_4$, $FeCl_2$, or $HoCl_3$.

In any one or more of the embodiments described herein, the metal chelate includes gadopentetate dimeglumine (Gd•DTPA), gadodiamide, gadoversetamide, gadobenate dimeglumine, gadoxetate disodium, gadofosveset trisodium, gadoteridol, gadobutrol, or gadoterate meglumine.

In any one or more of the embodiments described herein, the paramagnetic ionic liquid includes [methyltrioctylammonium]$_2$[MnCl$_4$], [methyltrioctylammonium]$_3$[GdCl$_6$], [methyltrioctylammonium]$_3$[HoCl$_6$], [methyltrioctylammonium]$_3$[HoBr$_6$], [1-butyl-3-methyl imidazolium]$_3$[HoCl$_6$], [1-butyl-3-methyl imidazolium][FeCl$_4$], [1-butyl-2,3-dimethyl imidazolium]$_2$[MnCl$_4$], [1-butyl-2,3-dimethyl imidazolium]$_3$[DyCl$_6$], [1-butyl-3-methyl imidazolium]$_3$[DyCl$_6$], [alanine methylester][FeCl$_4$], [alanine methylester]$_2$[MnCl$_4$], [alanine methylester]$_3$[GdCl$_6$], [alanine methylester]$_3$[HoCl$_6$], or [alanine methylester]$_3$[DyCl$_6$].

In any one or more of the embodiments described herein, the one or more analytes include a diamagnetic material.

In any one or more of the embodiments described herein, the one or more analytes include molecules, particles, powders, emulsions, biological samples or biological cells.

In another aspect, a device is described, including:

a plate including a sample deposition tube adapted to receive a sample including one or more analytes, the sample deposition tube defining a vertical axis substantially perpendicular to a main surface of the plate;

a first magnet and a second magnet disposed adjacent to the sample deposition tube to impart a magnetic field that is inside the sample deposition tube; wherein each of the first and second magnets includes a first pole and a second pole, and the first pole of the first magnet faces the first pole of the second magnet; and a third magnet disposed underneath the first magnet and a fourth magnet disposed underneath the second magnet; wherein each of the third and fourth magnets includes a first pole and a second pole, and the second pole of the third magnet faces the second pole of the second magnet.

In any one or more of the embodiments described herein, the device further includes a plurality of said sample deposition tubes and a plurality of said first, second, third, and fourth magnets.

In any one or more of the embodiments described herein, the device further includes a mirror positioned to project, substantially parallel to the main surface of the plate, an image of the sample deposition tube along its vertical axis, so as to allow determination of the vertical location of the one or more analytes inside the sample deposition tube.

In any one or more of the embodiments described herein, the device further includes one or more of mirrors each positioned to project, substantially parallel to the main surface of the plate, an image of one or more of the plurality of the sample deposition tubes along the axis substantially perpendicular to the main surface of the plate.

In any one or more of the embodiments described herein, the sample includes a paramagnetic medium.

In any one or more of the embodiments described herein, the paramagnetic medium includes a paramagnetic salt, a paramagnetic hydrophobic metal chelate, or a paramagnetic ionic liquid.

In any one or more of the embodiments described herein, the paramagnetic salt includes $MnCl_2$, $GdCl_3$, $DyCl_3$, $MnBr_2$, $CuSO_4$, $FeCl_2$, or $HoCl_3$.

In any one or more of the embodiments described herein, the metal chelate includes gadopentetate dimeglumine (Gd•DTPA), gadodiamide, gadoversetamide, gadobenate dimeglumine, gadoxetate disodium, gadofosveset trisodium, gadoteridol, gadobutrol, or gadoterate meglumine.

In any one or more of the embodiments described herein, the paramagnetic ionic liquid includes [methyltrioctylammonium]$_2$[MnCl$_4$], [methyltrioctylammonium]$_3$[GdCl$_6$], [methyltrioctylammonium]$_3$ [HoCl$_6$], [methyltrioctylammonium]$_3$[HoBr$_6$], [1-butyl-3-methyl imidazolium]$_3$[HoCl$_6$], [1-butyl-3-methyl imidazolium][FeCl$_4$], [1-butyl-2,3-dimethyl imidazolium]$_2$[MnCl$_4$], [1-butyl-2,3-dimethyl imidazolium]$_3$[DyCl$_6$], [1-butyl-3-methyl imidazolium]$_3$[DyCl$_6$], [alanine methylester][FeCl$_4$], [alanine methylester]$_2$[MnCl$_4$], [alanine methylester]$_3$[GdCl$_6$], [alanine methylester]$_3$[HoCl$_6$], or [alanine methylester]$_3$[DyCl$_6$].

In any one or more of the embodiments described herein, the one or more analytes include a diamagnetic material.

In any one or more of the embodiments described herein, the one or more analytes include molecules, particles, powders, emulsions, biological samples or biological cells.

In yet another aspect, a method is described, including:

providing the device of any one or more of the embodiments described herein;

depositing a sample including one or more analytes into the sample deposition tube;

allowing the one or more analytes to migrate to a position at least partially determined by its density; and projecting, substantially parallel to the main surface of the plate, an image of the sample deposition tube along its vertical axis to determine the vertical location of the one or more analytes inside the sample deposition tube.

In any one or more of the embodiments described herein, the method further includes determining the density of the one or more analytes based on the location of the one or more analytes in the sample deposition tube as shown in the projected image.

In any one or more of the embodiments described herein, the method further includes capturing the projected image by an image-capturing device.

In any one or more of the embodiments described herein, the method further includes capturing the projected image by an image-capturing device.

In any one or more of the embodiments described herein, the method further includes focusing the projected image.

In any one or more of the embodiments described herein, the sample includes a mixture of the one or more analytes, and the method further includes separating the mixture of the one or more analytes into individual analytes according to their densities.

In any one or more of the embodiments described herein, the sample including one or more analytes is a reaction mixture from a chemical reaction.

In any one or more of the embodiments described herein, the method further includes monitoring the progress of the chemical reaction.

In yet another aspect, a method is described, including:

providing the device of any one or more of the embodiments described herein;

depositing a sample including one or more analytes into the sample deposition tube; and allowing the one or more analytes to migrate to a position at least partially determined by its density and the magnetic field.

In any one or more of the embodiments described herein, the sample includes a mixture of the one or more analytes, and the method further includes separating the mixture of the one or more analytes into individual analytes according to their densities.

Unless otherwise defined, used, or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "linked to," "on," "connected to," "coupled to," "in contact with," etc., another element, it may be directly linked to, on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. The term "about" as used herein describes a range of a recited value including ±10%, ±5%, or ±2% of the value. Additionally, the terms "includes," "including," "comprises," and "comprising" specify the presence of the stated elements or steps but do not preclude the presence or addition of one or more other elements or steps.

DESCRIPTION OF THE DRAWINGS

The invention is described with reference to the following figures, which are presented for the purpose of illustration only and are not intended to be limiting. In the Drawings.

DETAILED DESCRIPTION

Density can be useful to separate and characterize a wide range of materials. For example, a mixture of particles can be separated and identified based on their behavior in a uniform force gradient (e.g., viscous medium, centrifugal force, magnetic fields, and a combination thereof), which, in turn, is dependent upon their individual densities.

However, many sample tubes for holding the samples for density-based testing exist as part of a larger structure (e.g., rack or plate), obfuscating the view of the sample inside the tube. Disclosed herein is a device having a mirror positioned next to the sample tube to project an image of the sample tube onto a plane or axis that is more easily captured or viewed. In some embodiments, the device includes a plate having a main surface perpendicular to the sample tube's vertical axis. In these embodiments, the mirror projects the image of the sample tube onto a plane substantially parallel to the plate's main surface. Thus, the image of the sample tube can be captured from the top or the bottom of the device, e.g., by using a camera or a scanner. In some embodiments, the device includes a plurality of sample tubes and a plurality of mirrors, and thus can analyze a plurality of samples simultaneously to enable high-throughput testing.

Figure 1A:
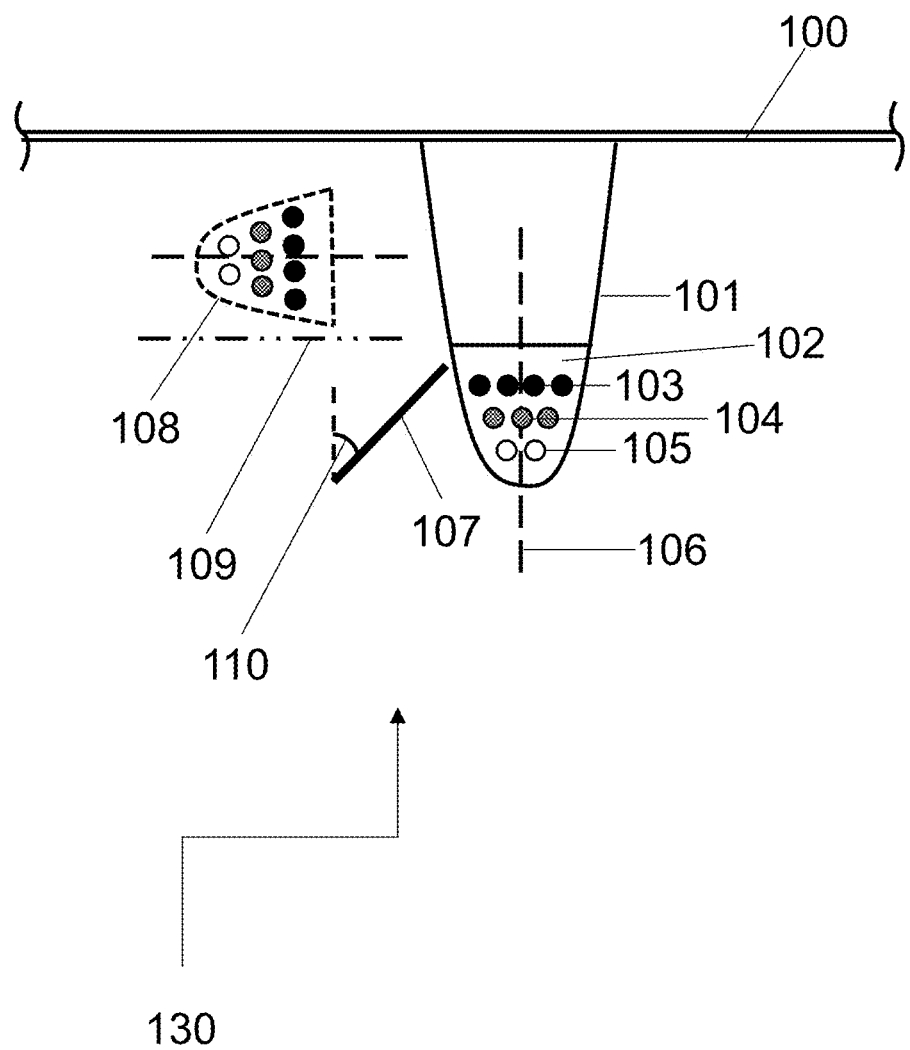
FIG. 1A illustrates an analytic device according to one or more embodiments.

The one or more embodiments are now described with reference to FIG. 1A. In one aspect, a device 130 includes a plate having a main surface 100 and a sample deposition tube 101 adapted to receive a sample 102 including one or more analytes 103-105. In some embodiments, the sample deposition tube 101 is defined by a vertical axis 106 which is substantially perpendicular to the main surface 100 of the plate. In some embodiments, the sample deposition tube 101 contains a sample 102. In some embodiments, the sample 102 includes one or more analytes 103, 104, and 105 which have different densities. In order to determine the vertical location, and thus density, of the one or more analytes 103-105 in the sample deposition tube 101, a mirror 107 is placed adjacent to the sample deposition tube 101 at an angle 110. The mirror 107 is positioned to project, substantially parallel to the main surface of the plate 100, an image of the sample deposition tube 101 along its vertical axis 106, so as to allow determination of the vertical location of the one or more analytes 103-105 inside the sample deposition tube 101. In these embodiments, the mirror 107 projects the sample deposition tube 101 as an image 108 which is substantially parallel to the main surface 100 of the plate, i.e., along an axis 109 that is substantially parallel to the main surface of the plate.

In some embodiments, the mirror 107 is at an angle 110 of about 20° to 60°, such as 20°, 40°, 45°, 50°, or 60° with respect to the vertical axis 106 of the sample deposition tube 101. In some embodiments, the mirror 107 is positioned at about 40-50° or about 45° with respect to the vertical axis 106 of the sample deposition tube 101.

In some embodiments, the mirrors can include any shiny, reflective material. In some embodiments, the mirror can include metallic foil, Chrome Mirror Silver Vinyl Wrap, thin glass, or Mylar® film. In some embodiments, the mirrors are Mylar® film.

In some embodiments, the device 130 further includes a plurality of sample deposition tubes 101 and a mirror 107, wherein the mirror 107 is positioned to project, substantially parallel to the main surface 100 of the plate, a plurality of images 108, where each of the images corresponds to an image of one of the plurality of the sample deposition tubes 101 along the axis 106 substantially perpendicular to the main surface of the plate 100. In other embodiments, the device 130 further includes a plurality of sample deposition tubes 101 and a plurality of mirrors 107, wherein each one of the plurality of mirrors 107 is positioned to project, substantially parallel to the main surface 100 of the plate, an image 108 of one or more of the plurality of the sample deposition tubes 101 along the axis 106 substantially perpendicular to the main surface of the plate 100. Thus, in these embodiments, the image of each of the sample deposition tubes 108 can be projected substantially parallel to the main surface 100 of the plate to allow easy view/capture of these images, thus allowing the analysis of a plurality of samples simultaneously in a high-throughput fashion.

Figure 1B:
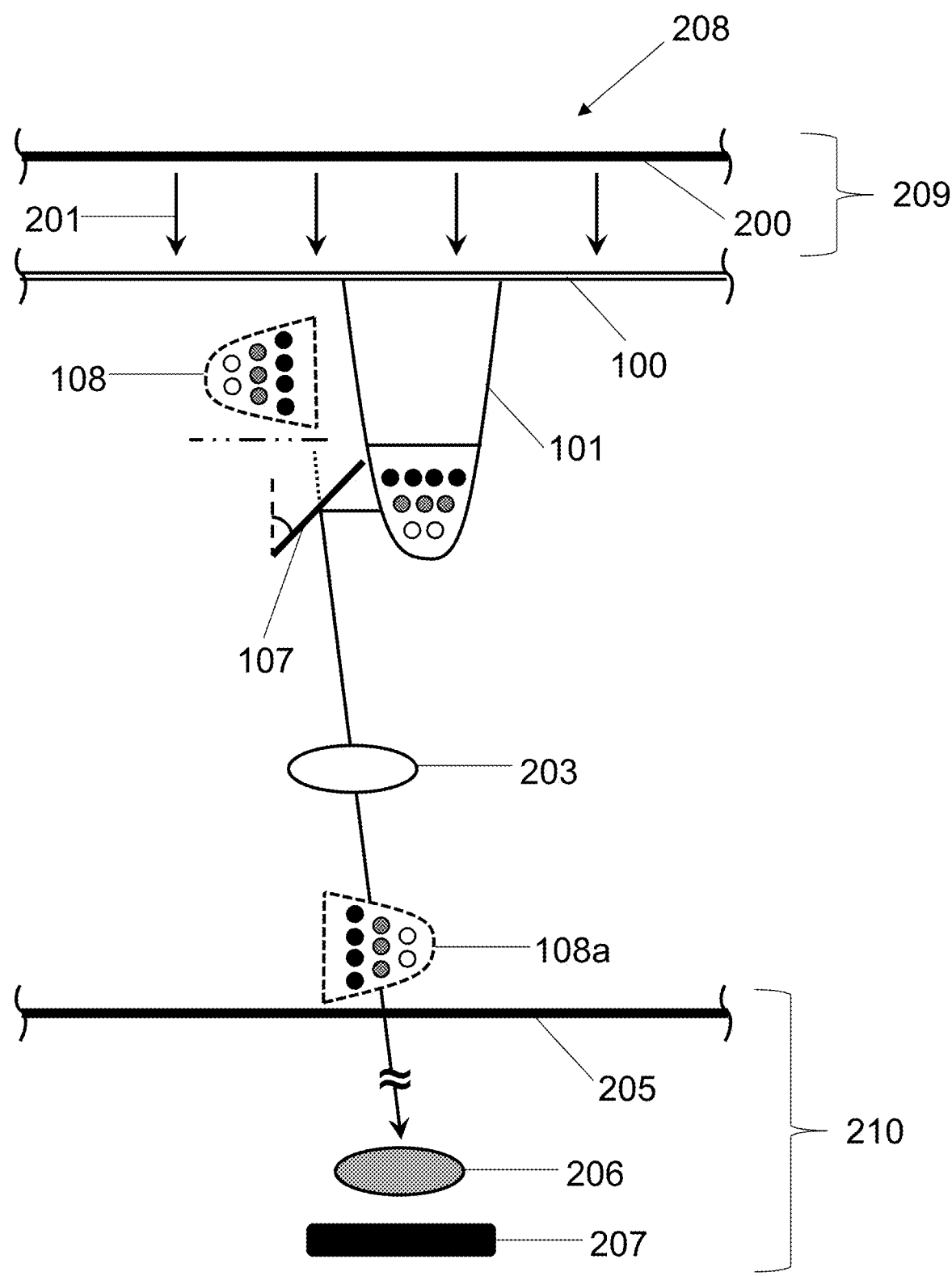
FIG. 1B illustrates an analytic device in combination with an image capture device, according to one or more embodiments.

The one or more embodiments are now described with reference to FIG. 1B. In some embodiments, a device 208 includes a plurality of the device 130 and components of a flatbed scanner (various components shown as 209 and 210). A light source 200 shines light 201 on the main surface 100 of the plate. In some embodiments, the light source 200 is housed within the lid 209 of a flatbed scanner. The image 108 of the sample deposition tube 101 projected by the mirror 107 is focused through one or more lenses 203 onto the flatbed 205 of a flatbed scanner. The image 108a can then be focused through one or more lenses 206 (e.g., relay lenses) and captured by an image capture device 207. In some embodiments, the image-capturing device 207 includes a scanner, a camera, or a combination thereof. In some embodiments, the lenses 203 and 206 are biconvex plastic lenses.

In some embodiments, the light source 200 is an LED with uniform, line illumination. In some embodiments, the LED is a component of the flatbed scanner 209/210. In some embodiments, the flatbed scanner 209/210 is Perfection V550 from EPSON. In some embodiments, the flatbed scanner 209/210 has an imaging area of about 216 mm×about 297 mm, has a detachable lid 209, or has an optical resolution of about 6400 dpi or 4 µm per dot, or a combination thereof. In some embodiments, the flatbed scanner 209/210 takes about 1 minute to about 1 hour, inclusive, to capture the images 108a of all the sample deposition tubes 101 included in the plate.

Figure 1C:
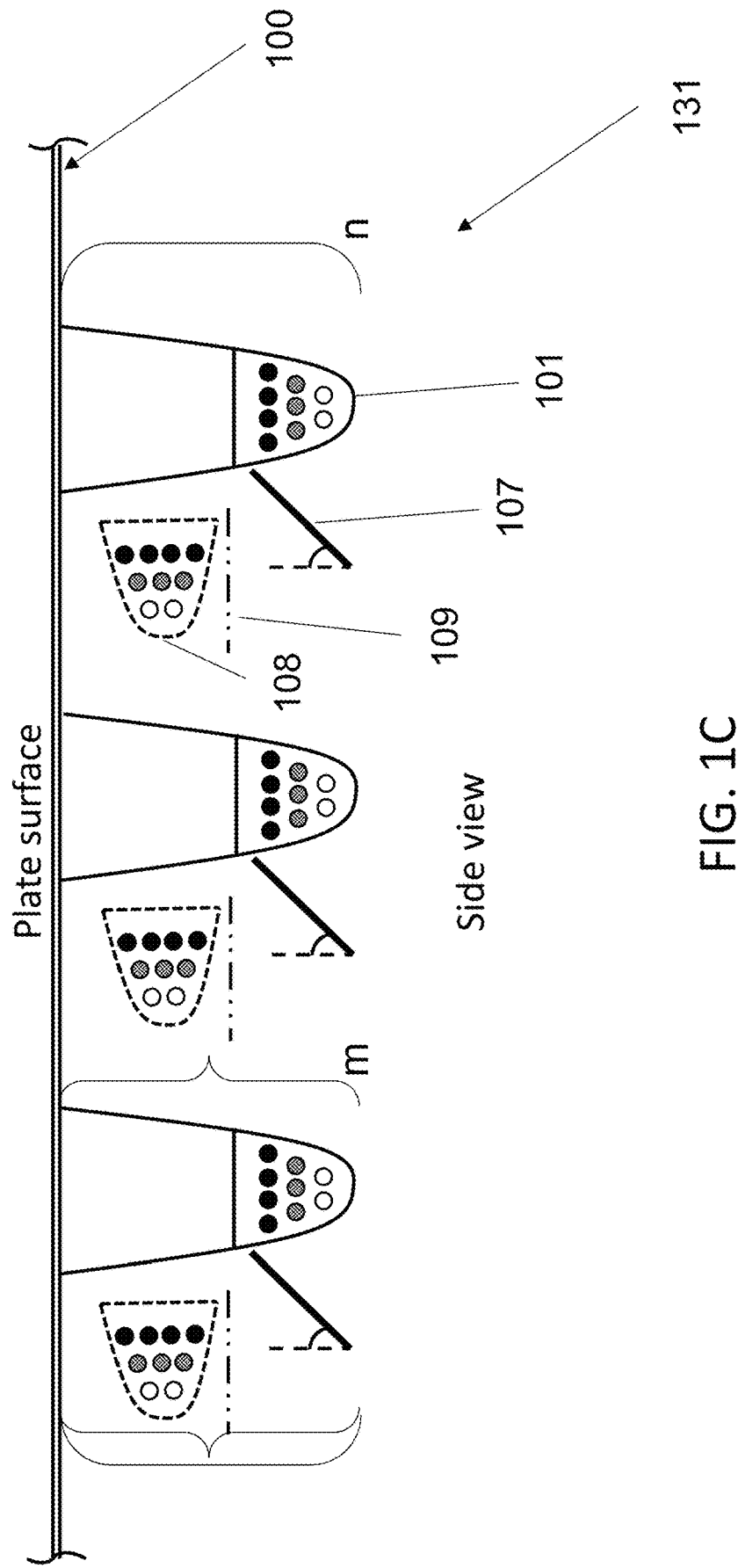
FIG. 1C illustrates an analytic device for high throughput measurements according to one or more embodiments.

The one or more embodiments are now described with reference to FIG. 1C. A device 131 is shown, including a plate with a main surface 100 including a plurality of the sample deposition tube 101 and a plurality of the mirror 107. Each mirror 107 projects the image 108 of one or more sample deposition tube 101 onto the axis 109 that is substantially parallel to the main surface of the plate 100. In some embodiments, m is an integer that defines the number of sample deposition tube 101/mirror 107 combinations along the plane of the page (x-direction) and n is an integer that defines the number of sample deposition tube 101/mirror 107 combinations located horizontally across the plane of the page (y-direction). In some embodiments, m is between 2 and 32, inclusive, and n is between 3 and 48, inclusive. In some embodiments, m and n are 2 and 3, 3 and 4, 4 and 6, 6 and 8, 8 and 12, 16 and 24, or 32 and 48, respectively. In some embodiments, m and n are 8 and 12, respectively.

Figure 1D:
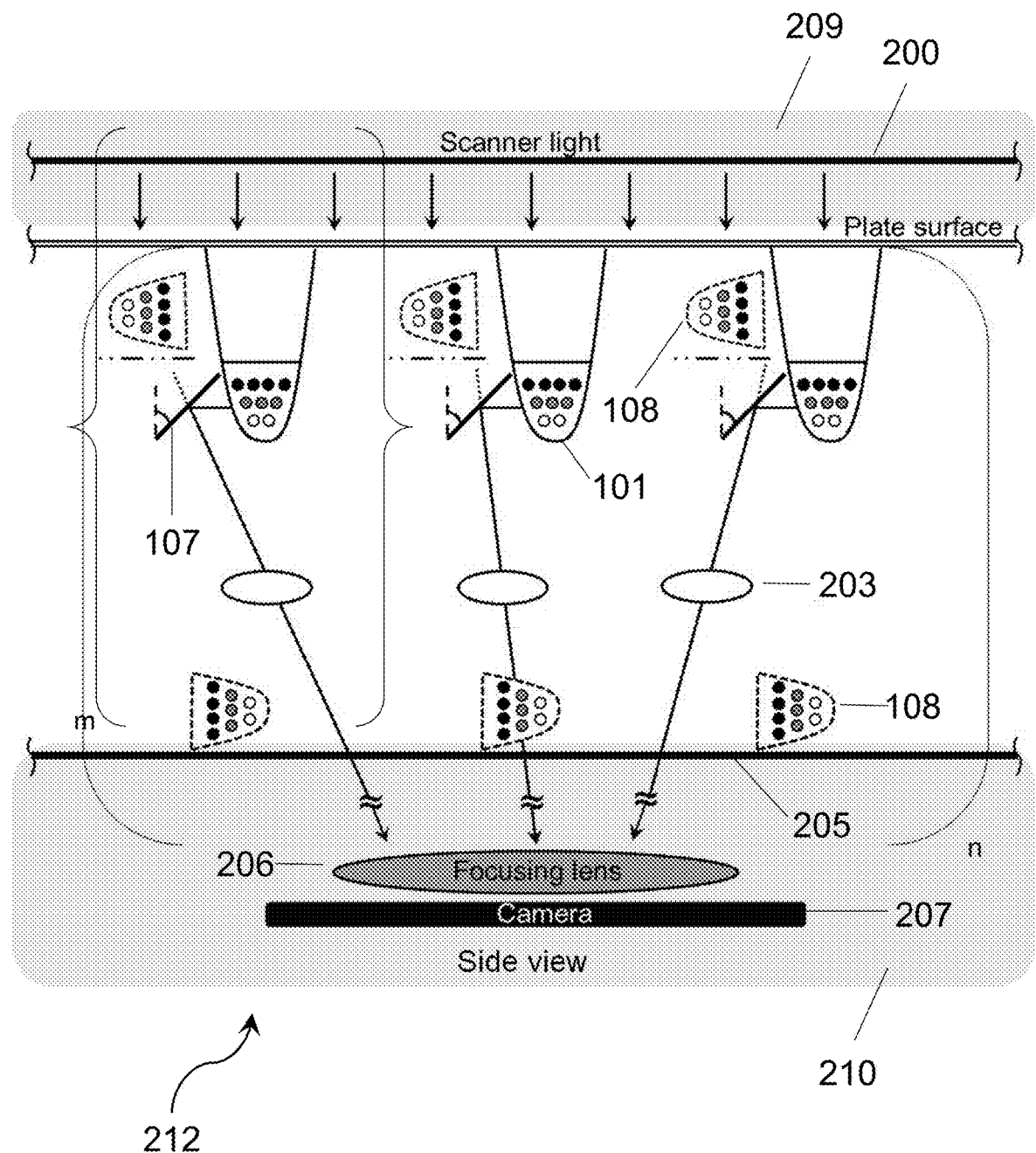
FIG. 1D illustrates an analytic device for high throughput measurements in combination with an image capture device, according to one or more embodiments.

The one or more embodiments are now described with reference to FIG. 1D. In some embodiments, a device 212 includes a plurality of the device 208. In some embodiments, a light source 200 from the scanner lid 209 shines on the main surface 100 of the plate, where the plate includes plurality of the sample deposition tube 101 and a plurality of the mirror 107. In some embodiments, m is an integer that defines the number of sample deposition tube/mirror combinations along the plane of the page (x-direction) and n is an integer that defines the number of sample deposition tube/mirror combinations located horizontally across the plane of the page (y-direction). In some embodiments, m is between 2 and 32, inclusive, and n is between 3 and 48, inclusive. In some embodiments, m and n are 3 and 2, 4 and 3, 6 and 4, 8 and 6, 12 and 8, 24 and 16, or 48 and 32, respectively. In some embodiments, m and n are 12 and 8, respectively. In some embodiments, the image 108 of each sample deposition tube 101 projected by each mirror 107 is focused through one or more relay lenses 203 onto the flatbed 205 of the flatbed scanner 210. In some embodiments, the images 108 may be focused through one or more focusing lenses 206 and captured by an image capture device 207 (e.g., camera).

In some embodiments, the camera 207 can be a charge-coupled device (CCD) camera or a CMOS-based camera. In some embodiments, the camera 207 is a charge-coupled device (CCD) camera.

In some embodiments, the main surface 100 of the plate includes about 6, 12, 24, 48, 96, 384, or 1536 sample deposition tubes 101. In some embodiments, the main surface 100 of the plate includes about 96 sample deposition tubes 101.

In some embodiments, a device for magnetic levitation (MagLev) is described, including two permanent magnets placed coaxially with like-poles facing, and uses a cuvette filled with paramagnetic media as the container to levitate diamagnetic samples (when placed between the two magnets). Thus, in these embodiments, the samples occupy different locations in the cuvette in response to the magnetic field generated by the magnet, and as a function of their density. In some embodiments, the device described herein is capable of analyzing a plurality of samples (e.g., those levitated in magnetic levitation (MagLev)) in high-throughput fashion.

Figure 6A:
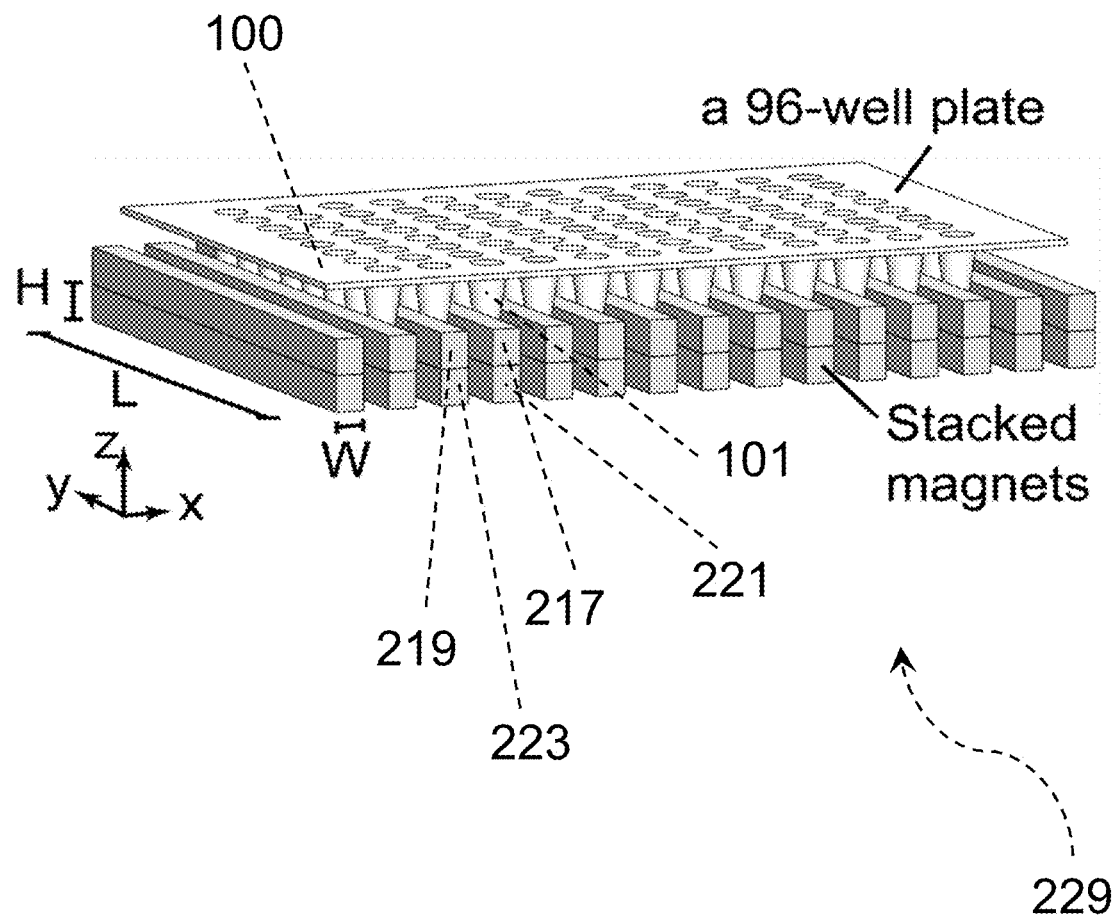
FIG. 6A shows 15 pairs of evenly spaced magnets with the like-poles facing one another on a 96-well plate, according to one or more embodiments.
Figure 6B:
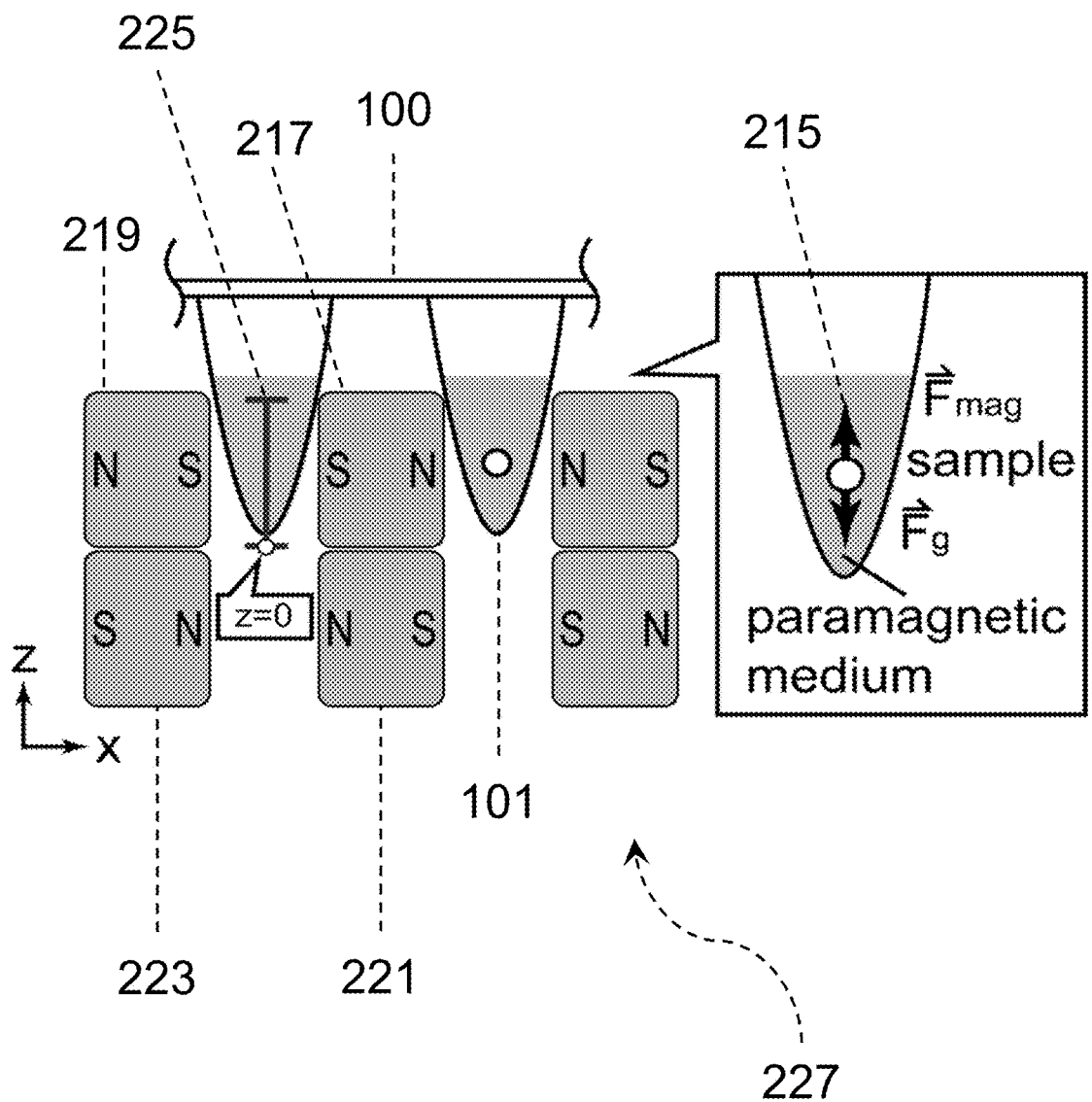
FIG. 6B shows the magnetic field along the midline of the sample deposition tube exploited to levitate samples in the configuration of FIG. 6A, according to one or more embodiments.

As shown in FIGS. 6A and 6B, in some embodiments, the device includes a first magnet 217 and a second magnet 219, disposed adjacent to the sample deposition tube 101 to impart a magnetic field that is inside the sample deposition tube 101; where each magnet 217 and 219 includes a first pole and a second pole, and the first pole of the first magnet 217 faces the first pole of the second magnet 219. In some embodiments, the north pole of the first magnet 217 on one side of the sample deposition tube 101 faces the north pole of the second magnet 219 on the other side of the sample deposition tube 101. In some embodiments, the south pole of the first magnet 217 on one side of the sample deposition tube 101 faces the south pole of the second magnet on the other side of the sample deposition tube 101.

In some embodiments, the devices described in one or more embodiments herein further include a second set of magnets placed beneath the first set of magnets (e.g., FIG. 6B, 221 and 223). Applicants have surprisingly found that placing a second set of magnets beneath the first set of magnets result in an enhanced magnetic field gradient inside the sample deposition tubes 101. The non-limiting benefits of having enhanced magnetic fields include allowing analysis of samples with a wider range of densities, the use of lower concentrations of paramagnetic species in the paramagnetic medium, faster separation according to density, and a combination thereof, which can, for example, improve biocompatibility (e.g., for analysis of biological cells).

Thus, in some embodiments, a third magnet 221 is disposed underneath the first magnet 217 and a fourth magnet 223 disposed underneath the second magnet 219, wherein each of the third 221 and fourth 223 magnets has a first pole and a second pole, and the second pole of the third magnet 221 faces the second pole of the second magnet 219. In some embodiments, the stacking of the third magnet 221 and the fourth magnet 223 underneath the first 217 and second 219 magnets, respectively, increases the strength and gradient of the magnetic field 215.

In some embodiments, the device includes a plurality of the sample deposition tubes 101. In some embodiments, the device includes a plurality of the first 217, second 219, third 221, and fourth 223 magnets.

Figure 4A:
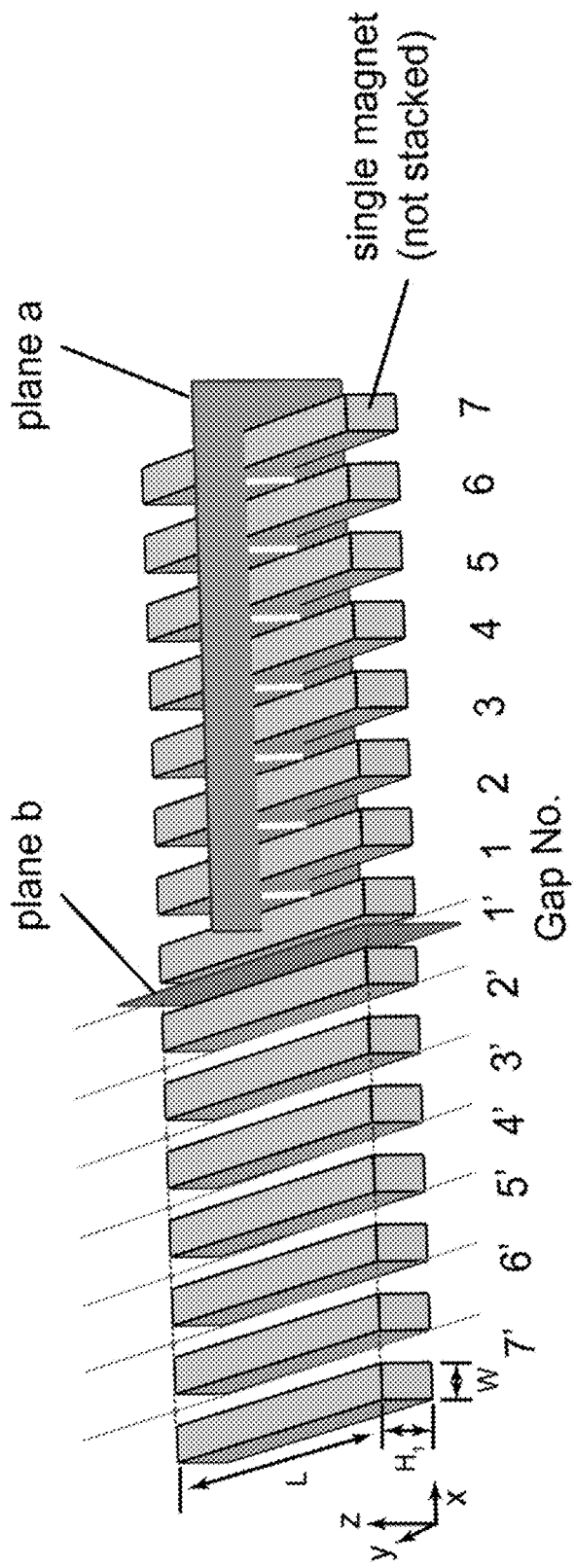
FIG. 4A shows a schematic of the spatial arrangement of the magnets on a 96-well plate, according to one or more embodiments.
Figure 4B:
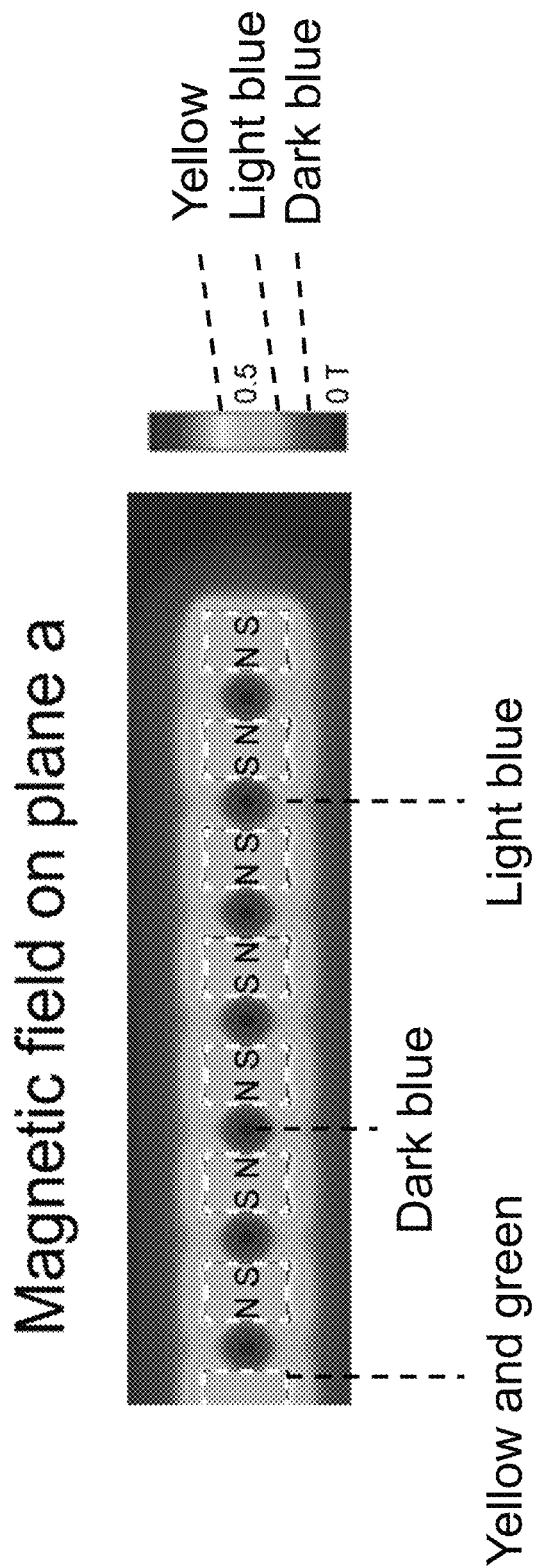
FIG. 4B shows the profile of magnetic field strength on plane a in FIG. 4A, according to one or more embodiments.
Figure 6C:
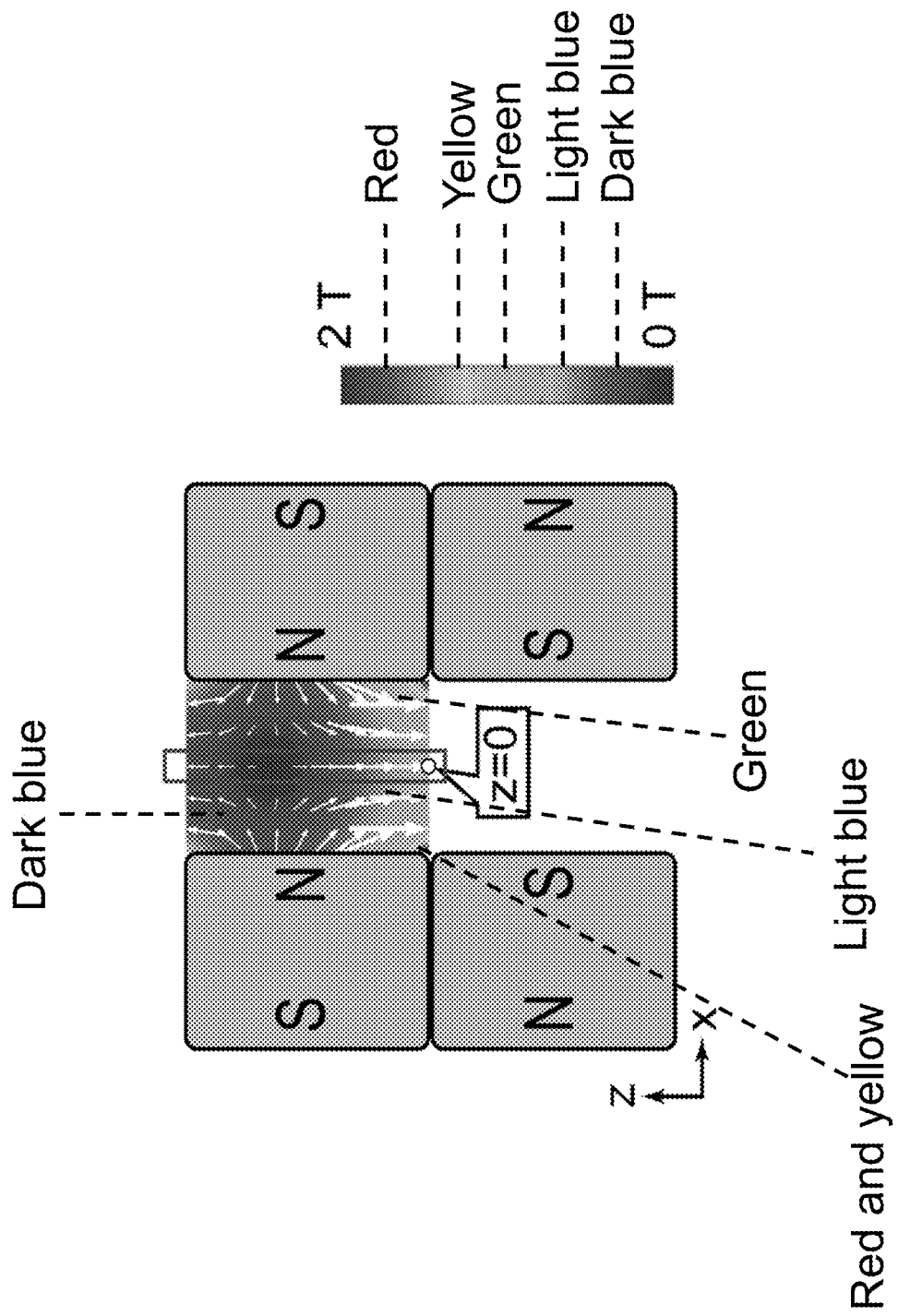
FIG. 6C shows COMSOL® simulation showing the cross-sectional profile (on the x-z plane) of the magnetic field in the gap between a pair of the magnets depicted in FIG. 6A, according to one or more embodiments.

In some embodiments, the magnets generate a magnetic field gradient 215 along the vertical centerline in the gap between the faces of the magnets 225 (see also FIG. 6C). In some embodiments, the magnetic fields are identical around each sample deposition tube included in the plate (FIG. 4B). In some embodiments, the magnetic field 215 has a strength of about 0.1, 0.2, 0.3, 0.4, 0.5, 0.6, 0.7, 0.8, 0.9, 1.0, 1.1, 1.2, 1.3, or 1.4 T along the vertical centerline in the gap between the faces of the magnets 225. In some embodiments, the magnetic field 215 is approximately linear over about 1, 2, 3, 4, 5, 6, 7, 8, 9, or 10 mm in the gaps between the magnets.

In some embodiments, the first 217 and second 219 magnets have a dimension that allows them to fit in-between the rows of sample deposition tubes 101 included in the plate. In some embodiments, the first 217 and second 219 magnets have a dimension of about 101.6 mm×about 4.8 mm×about 6.4 mm (length×width×height). In some embodiments, there are 15 first magnets 217 and 15 second magnets 219 included on the plate.

In some embodiments, the sample includes a paramagnetic medium. In some embodiments, the paramagnetic medium includes paramagnetic salts. In these embodiments, the paramagnetic salts include $MnCl_2$, $GdCl_3$, $DyCl_3$, $MnBr_2$, $CuSO_4$, $FeCl_2$, or $HoCl_3$. In some embodiments, the paramagnetic medium includes paramagnetic hydrophobic metal chelates. In these embodiments, the paramagnetic hydrophobic metal chelates include gadopentetate dimeglumine (Gd•DTPA), gadodiamide, gadoversetamide, gadobenate dimeglumine, gadoxetate disodium, gadofosveset trisodium, gadoteridol, gadobutrol, or gadoterate meglumine.

In some embodiments, the paramagnetic medium includes paramagnetic ionic liquids. In these embodiments, the paramagnetic ionic liquids include [methyltrioctylammonium]$_2$[MnCl$_4$], [methyltrioctylammonium]$_3$[GdCl$_6$], [methyltrioctylammonium]$_3$[HoCl$_6$], [methyltrioctylammonium]$_3$[HoBr$_6$], [1-butyl-3-methyl imidazolium]$_3$[HoCl$_6$], [1-butyl-3-methyl imidazolium][FeCl$_4$], [1-butyl-2,3-dimethyl imidazolium]$_2$[MnCl$_4$], [1-butyl-2,3-dimethyl imidazolium]$_3$[DyCl$_6$], [1-butyl-3-methyl imidazolium]$_3$[DyCl$_6$], [alanine methylester][FeCl$_4$], [alanine methylester]$_2$[MnCl$_4$], [alanine methylester]$_3$[GdCl$_6$], [alanine methylester]$_3$[HoCl$_6$], or [alanine methylester]$_3$[DyCl$_6$]. In some embodiments, the sample includes a solvent. In some embodiments, the solvent includes an aqueous solvent or a hydrophobic solvent. In some embodiments, the concentration of the paramagnetic salts, hydrophobic metal chelates, or paramagnetic ionic liquids is about 0.1, 0.5, 1.0, 1.5, 2.0, 2.5, or 3.0 M, or in a range bounded by any two values disclosed herein.

In some embodiments, the analytes 103-105 are diamagnetic. In some embodiments, the analytes 103-105 include molecules, particles, powders, emulsions, biological substances, biological cells, or a combination thereof. In some embodiments, the analytes 103-105 have a size of about 1 μm to about 1 mm, inclusive.

In some embodiments, the analytes 103-105 occupy different locations in the sample deposition tube 101 as a function of their densities. In some embodiments, the analytes 103-105 migrate to different locations in the sample deposition tube 101 as a function of their densities. In some embodiments, the analytes 103-105 migrate to different locations in the sample deposition tube 101 as a function of their densities and in response to the magnetic field in the tube 215. In some embodiments, the densities of the analytes 103-105 are between about 0 $g/cm^3$ to about 10 $g/cm^3$, inclusive.

In some embodiments, the device is described with reference to FIG. 8A. In these embodiments, the device 231 further includes a mirror 107 positioned to project, substantially parallel to the main surface of the plate 100, an image of the sample deposition tube along its vertical axis 108, to allow determination of the vertical location of the one or more analytes 103-105 inside the sample deposition tube 101.

In some embodiments, the device 231 further includes a plurality of mirrors 107 each positioned to project, substantially parallel to the main surface of the plate 100, an image 108 of one of the plurality of the sample deposition tubes along the axis substantially perpendicular to the main surface of the plate 100.

In some embodiments, the one or more analytes include a diamagnetic material. In some embodiments, the one or more analytes include molecules, particles, powders, emulsions, biological samples or biological cells. In another aspect, a method for analyzing the densities of one or more analytes is described. In some embodiments, the method includes providing the device of any one of the preceding embodiments. In some embodiments, a sample 102 including one or more analytes 103-105 is deposited into the sample deposition tube 101. In some embodiments, the one or more analytes 103-105 are allowed to migrate to a position in the sample deposition tube 101 at least partially determined by their density. In some embodiments, an image of the sample deposition tube along its vertical axis 108 is projected substantially parallel to the main surface of the plate 100, to determine the vertical location of the one or more analytes 103-105 inside the sample deposition tube 101.

In some embodiments, the method further includes determining the density of the one or more analytes 103-105 based on the location of the one or more analytes 103-105 in the sample deposition tube 101 as shown in the projected image 108. In some embodiments, the method further includes capturing the projected image 108 by an image-capturing device (e.g., 209/210, 207). In some embodiments, the method further includes focusing the projected image 108. In some embodiments, the sample includes a mixture of the one or more analytes 103-105, and the method further includes separating the mixture of the one or more analytes 103-105 into individual analytes 103-105 according to their densities.

In yet another aspect, a method for analyzing the densities of one or more analytes 103-105 includes providing the device 130, 208, 131, 212, 227, or 229 of any one of the preceding embodiments, depositing a sample 102 including one or more analytes 103-105 into the sample deposition tube 101, and allowing the one or more analytes 103-105 to migrate to a position in the sample deposition tube 101 at least partially determined by its density and the magnetic field (e.g., 215).

In some embodiments, the device of the method includes a plurality of sample deposition tubes 101 and a plurality of mirrors 107.

In some embodiments, the method is used to determine the density of one or more of the analytes 103-105 based on their location in the sample deposition tube 101, as shown in the image of the sample deposition tube along the axis substantially parallel to the main surface of the plate 100. In some embodiments, the image 108 is captured by an image capture device (e.g., 209/210, 207). In some embodiments, the image 108 is focused one or more times by one or more lenses 203 and/or 206 before being captured by the image capture device (e.g., 209/210, 207). In some embodiments, the image capture device is a flatbed scanner 209/210. In some embodiments, the image capture device includes a camera 207.

In some embodiments, the method is used to separate a mixture of analytes 103-105 into individual analytes 103-105 according to their density.

In some embodiments, the sample of one or more analytes 103-105 is a reaction mixture from a chemical reaction. In some embodiments, the analytes 103-105 bond together. In some embodiments, the individual analytes 103-105 and the bonded analytes occupy or migrate to a position at least partially determined by their densities and the method further includes determines properties of the bonding. In some embodiments, the properties of the bonding include amount of bonding, rate of bonding, and activation energy of bonding. In these embodiments, the method further includes monitoring the progress of a chemical reaction.

In some embodiments, the analytes 103-105 are diamagnetic. In some embodiments, the analytes 103-105 include molecules, particles, powders, emulsions, biological samples, or biological cells.

The term "substantially parallel" as used herein means that the angle of the two referenced objects (e.g., a projected image and a main surface of the plate as described herein) relative to each other is about 170°-180°, 175°-180°, or 179°-180°, or about 170°, 171°, 172°, 173°, 174°, 175°, 176°, 177°, 178°, 179° or 180°. In some embodiments, the angle of the two referenced objects (e.g., a projected image and a main surface of the plate as described herein) relative to each other is about 180°.

The term "substantially perpendicular" as used herein means that the angle of the two referenced objects (e.g., a vertical axis and a main surface of the plate as described herein) relative to each other is about 80°-90°, 85°-90°, or 89°-90°, or about 80°, 81°, 82°, 83°, 84°, 85°, 86°, 87°, 88°, 89°, or 90°.

In some embodiments, the angle of the two referenced objects (e.g., a vertical axis and a main surface of the plate as described herein) relative to each other is about 90°.

Examples

Density is a fundamental physical property of all matter: the density of homogeneous matter (e.g., solids, liquids, gels, and gases) is described by the ratio of mass to volume ($p=m/V$). Heterogeneous matter (e.g., composites, polymers with amorphous and crystalline regions, or phase-separated regions) has a density averaged over the volumes of the different sub-regions described by the same formula, since these regional densities may differ. Changes in density are associated with changes in both physical and chemical properties of a material. For example, the densities of polymers, such as solid plastic parts, may depend on their method of fabrication, or following chemical degradation when they are exposed to UV irradiation or acids/bases. Cells of different types have different densities. For example, the densities of erythrocytes are different than the densities of adipocytes rich in fat, and even than sickled erythrocytes.

Density is useful to separate, characterize, and identify both biological and non-biological materials. Density-based methods have been used to, for example, characterize materials, to separate, isolate, or fractionate sub-populations from complex mixtures, and to follow changes in density in systems (e.g., responses of biological cells to drug treatments, such as bacteria, and chemical reactions, such as polymerization).

Existing analytical methodologies—from simple centrifugation-based methods (e.g., Percoll gradient centrifugation) to more specialized techniques and types of instrumentation (e.g., methods based on pycnometers, density gradient columns, or vibrating tube densitometers)—are examples of the uses of density. More complex approaches (e.g., microfluidics-based approaches using cantilever-based microresonators) are also expanding the uses of density.

Two distinct but complementary approaches to perform density measurements and/or separations are useful. (i) The use of aqueous multiphase polymer systems (AMPS)—mixtures of polymers that form distinct phases with different densities in water. These phases are separated by interfaces that are sharp on the molecular scale; these phases and interfaces can be used to perform density-based separations. (ii) Magnetic levitation (MagLev), a technique that uses competing gravitational (buoyant) and magnetic forces to form an effectively continuous density gradient in an aqueous paramagnetic medium in a magnetic field, and allows separations of particles suspended in the medium on the basis of their densities. Magnetic levitation (MagLev) using permanent magnets and paramagnetic media is a versatile tool for measurement of density. It is applicable to a wide variety of samples.

Figure 2:
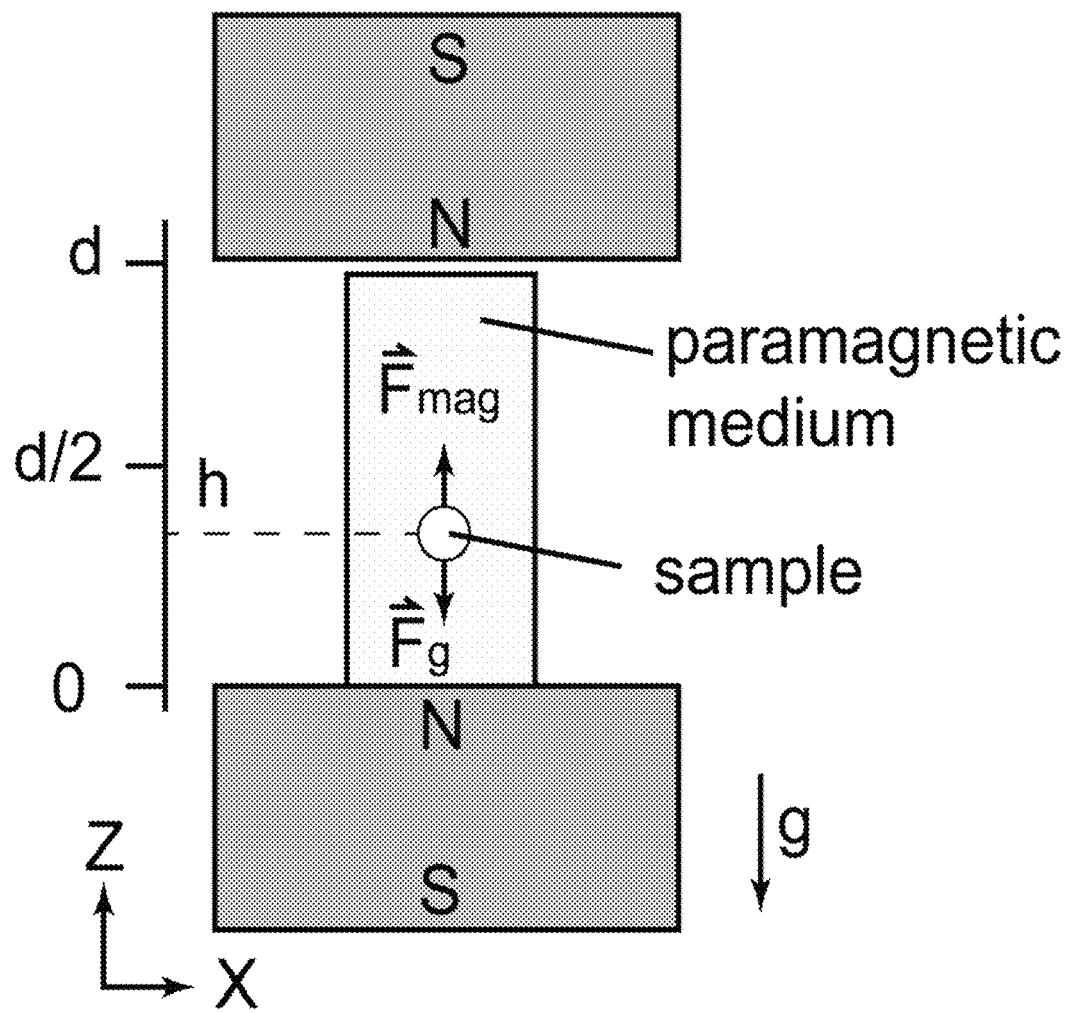
FIG. 2 illustrates magnetic levitation (MagLev) according to one or more embodiments.

In some embodiments, the device used for magnetic levitation (MagLev) is, shown, for example, in FIG. 2, consisting of two permanent magnets placed coaxially with like-poles facing, and uses a cuvette filled with paramagnetic media as the container to levitate samples (when placed between the two magnets). Magnetic levitation (MagLev) is distinct from the magnetic separation technologies common in biochemistry, which use superparamagnetic particles and involve magnetic fields to separate these particles from diamagnetic suspensions. In some embodiments, the central axis of the magnetic levitation (MagLev) device is aligned with the gravitational field, and the objects levitate vertically along this axis. In some embodiments, magnetic levitation (MagLev) covers a density range of about 0.8 to about 3 g/cm$^3$ when the paramagnetic solution is a concentrated solution of common paramagnetic salts (e.g. $MnCl_2$ and $GdCl_3$). In some embodiments, depending on the dimensions and orientation of the magnets, the metrics for analytical performance (e.g., dynamic range and sensitivity) can be appropriately optimized to cover the entire range of densities (about 0 to about 23 g/cm$^3$) observed in matter at ambient temperature, or reach an exceptionally high sensitivity, up to about 10$^{-6}$ g/cm$^3$, in resolving differences in density. In some embodiments, the magnetic levitation (MagLev) device can be miniaturized (e.g., as used for measurements of densities of single cells). In some embodiments, the magnetic levitation (MagLev) device and its variants can measure one sample (which may, nonetheless, include a number of different sample components) at a time.

In some embodiments, an integrated analytical system is disclosed, using magnetic levitation (MagLev) to make it possible to measure multiple samples at a time, i.e. high-throughput magnetic levitation (MagLev), for example, for density-based array screening. In some embodiments, the system integrates a flatbed scanner and simple optical components (mirrors and lenses) to acquire images of the levitated contents (e.g., particles) in aqueous paramagnetic media (e.g., with a working volume of about 0 μL per sample) in a multi-well (e.g., 96-well) plate format.

In some embodiments, FIGS. 2 and 3A-3C show an engineered magnetic field between two pairs of like-poles facing, stacked magnets to levitate multiple samples in a paramagnetic medium. This design took advantage of the magnetic gradient along the vertical centerline in the gap between the faces of the magnets to make an array of these gradients in space so that the device was compatible with common types of containers for arrays of small (e.g., about 300 μL) liquid samples in the laboratory (e.g., 6, 12, 24, 48, 96, 384 and 1536-well plates).

In some embodiments, long and thin magnets (e.g., L×W×H for each indistinguishable magnet: 101.6 mm×4.8 mm×6.4 mm) were used. These magnets were inserted in the space between the rows of tubes on a 96-well plate with the like-poles facing one another (see FIGS. 6A-6C). This format allowed parallel reading using indistinguishable magnetic fields around each well.

Finite-element simulation in COMSOL® evaluated the profile of the magnetic field in the gaps of the magnet array. In some embodiments, the dimensions used for the array generated both a strong magnetic field (e.g., up to about 0.7 T along the central z-axis in the gaps) and field gradient, and therefore, required low concentrations of paramagnetic salts to levitate samples (e.g., about 0.5 M $MnCl_2$ covers a range of densities from about 1.0 g/cm$^3$ to about 1.6 g/cm$^3$, which would otherwise require about 3 M $MnCl_2$ to cover the same range in the magnetic levitation (MagLev) device of FIG. 2. In some embodiments, low concentrations of paramagnetic salts improve the biocompatibility of the suspending media, and are particularly useful for levitating biological cells.

In some embodiments, magnetic levitation (MagLev) has eight non-limiting characteristics that can make it useful for performing high-throughput density measurements: (i) Magnetic levitation (MagLev) can be simple in design and use. It can use permanent magnets to generate a magnetic field, and does not require electricity to operate. The device can be assembled simply, and be used, in principle, indefinitely without maintenance beyond occasional calibration. (ii) Magnetic levitation (MagLev) can use inexpensive, commercially available paramagnetic salts (e.g. $MnCl_2$) to generate appropriate media in aqueous solutions. $DyCl_3$ can also sometimes be useful for its high magnetic susceptibility. (iii) Magnetic levitation (MagLev) can be a label-free method that directly measures the densities of the materials. It does not require, but does not exclude, chemical derivatization or labeling (e.g., with chromophores or fluorophores). (iv) It can be used in a format that enables parallel measurements, and thus, the ability to do high-throughput measurements of density. (v) Magnetic levitation (MagLev) can cover a wide range of densities—e.g., from an air bubble (about 0 g/cm$^3$, using 3 M $DyCl_3$) to copper particles (8.96 g/cm$^3$)—and can have a tunable sensitivity in density measurements (e.g. Δρ as small as about 0.001 g/cm$^3$ using 0.1 M $MnCl_2$). (vi) Magnetic levitation (MagLev) can require small quantities of samples and small sizes of samples (e.g., it can detect single colored particles about 200 μm in diameter). It can be applied to a variety of samples with different physical forms (e.g., heterogeneous, sticky, fragile, and irregularly-shaped samples). (vii) Magnetic levitation (MagLev) can enable measurements over a convenient interval of time (e.g., a few minutes to <1 h for a single scan of the plate). (viii) In some embodiments, the configuration of magnetic levitation (MagLev) is compatible with a simple flatbed scanner for imaging purposes.

Parallel density measurements across the entire multi-well plate validated the performance and reproducibility of the analytic device described in one or more embodiments. Broad applicability of high-throughput density measurements of biological and non-biological materials in aqueous paramagnetic media using this analytic device was demonstrated for three exemplary, non-limiting, types of samples: (i) surfactant-stabilized drops of 3-chlorotoluene (a hydrophobic liquid), (ii) small solid particles and powders (crystals of cholesterol, glass particles, copper powders, and polymer beads), and (iii) human erythrocytes.

Magnetic Levitation (MagLev)

In some embodiments, magnetic levitation (MagLev) is a technique that uses competing gravitational (buoyant) and magnetic forces to form an effectively continuous density gradient in an aqueous paramagnetic medium in a magnetic field, and allows separations of particles suspended in the medium on the basis of their densities. Magnetic levitation (MagLev) using permanent magnets and paramagnetic media is a versatile tool for measurement of density. It is applicable to a variety of samples.

In some embodiments, the magnetic levitation (MagLev) device (e.g., FIG. 2) includes two permanent magnets positioned with their like-poles facing (e.g., L×W×H for each indistinguishable magnet: 50.8 mm×50.8 mm×25.4 mm) and coaxially at a distance (e.g., 45.0 mm) to yield an approximately linear magnetic field along the central axis between the magnets. In some embodiments, this central axis aligns with the vector of gravity. In some embodiments, when a diamagnetic sample is placed in a container filled with a paramagnetic medium and then centered coaxially in the device, the sample can float, or levitate, stably without physically contacting the container. At equilibrium, the gravitational force $\vec{F}_g$ acting on the object (corrected for the effect of buoyancy) balances the magnetic force $\vec{F}_{mag}$—the physical force the sample experiences as a result of the direct interaction of the magnetic field and the paramagnetic medium that surrounds the sample. In some embodiments, the levitation height, h, the distance from the centroid (the geometric center) of the sample to the top surface of the bottom magnet, is proportional to the density of the sample, and, therefore, can be measured experimentally (with appropriate calibrations using known density standards) to calculate the unknown density of the sample.

In some embodiments, equation 1 describes the balance of physical forces acting on the levitated sample. In some embodiments, equation 2 shows that the density of the sample that levitates at a given position can be calculated using the characteristics of the suspending medium (including its density, $\rho_m$, and the magnetic susceptibility, $\chi_m$), the magnetic susceptibility of the sample, $\chi_s$ (which is usually negligible in comparison to $\chi_m$), and the strength and gradient of the magnetic field $B_z(dB_z/dz)$ at the position of equilibrium.

$$\vec{F}_g + \vec{F}_{mag} = (\rho_s - \rho_m)V\vec{g} + \frac{(\chi_s - \chi_m)}{\mu_o}V(\vec{B}\cdot\vec{\nabla})\vec{B} = 0 \quad (1)$$

$$\rho_s \approx \frac{(\chi_s - \chi_m)}{\mu_o g}\left(B_z\frac{dB_z}{dz}\right) + \rho_m \quad (2)$$

In equation 1 and equation 2, $\vec{F}_g$(N) is the gravitational force corrected for the effect of buoyancy, $\vec{F}_{mag}$ (N) is the magnetic force, $\rho_s$ (g/cm³) is the density of the suspended sample, $\rho_m$ (g/cm³) is the density of the paramagnetic medium, $\vec{g}$ (−9.810 m/s²) is the vector of gravity, $\chi_m$ (unitless) is the magnetic susceptibility of the paramagnetic medium, $\chi_s$ (unitless) is the magnetic susceptibility of the suspended sample, $\mu_o$ ($4\pi\times10^{-7}$ N/A²) is the magnetic permeability of free space, V (m³) is the volume of the object, $\vec{B}$ (T) is the magnetic field, $\vec{\nabla}$ is the gradient operator, $B_z$ is the z-component of the magnetic field, and $(dB_z/dz)$ is the gradient of the z-component of the field along the central z-axis.

Figure 3A:
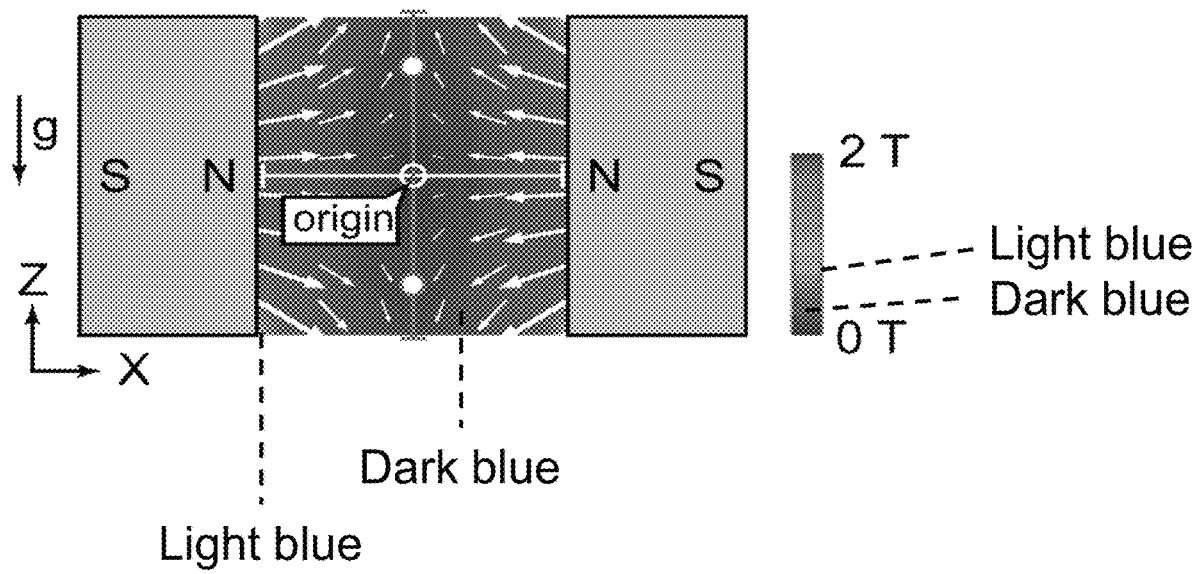
FIG. 3A shows magnetic levitation (MagLev) in the perpendicular configuration where the magnetic field gradient is parallel to the surfaces of the magnets, according to one or more embodiments.
Figure 3B:
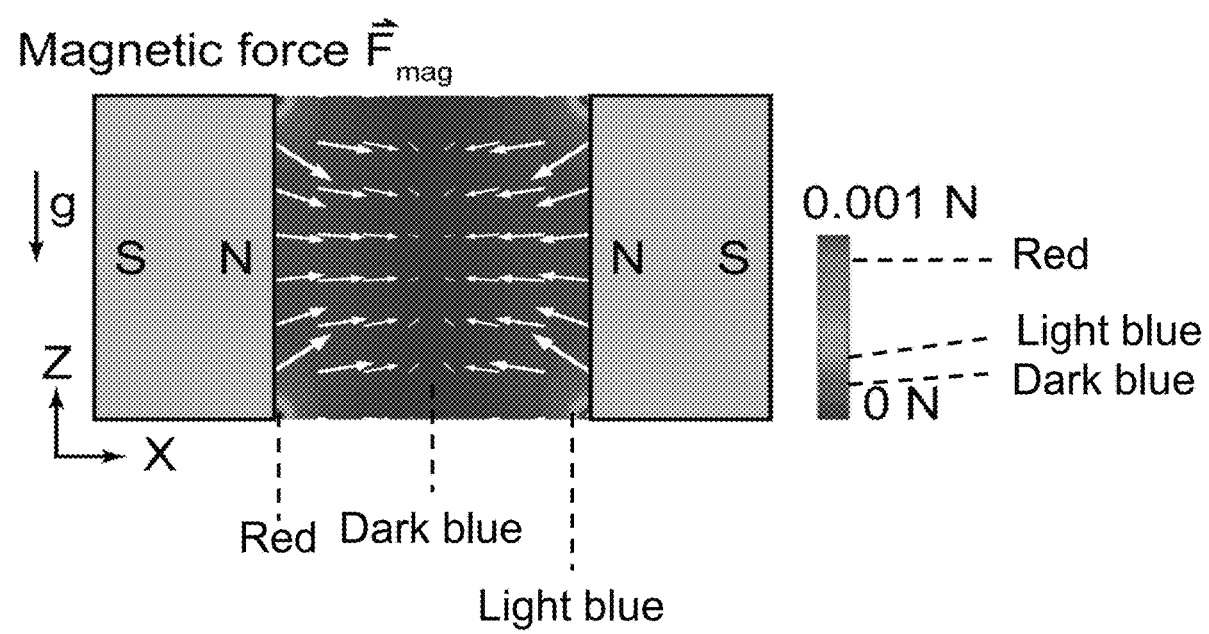
FIG. 3B shows the magnetic force that a diamagnetic particle experiences when it is suspended in a paramagnetic medium and placed in the field between the magnets, according to one or more embodiments.

In one or more of the embodiments described herein, the magnetic field gradient that is perpendicular to the central z-axis of the magnetic levitation (MagLev) configuration of FIG. 2 is aligned to the gravity, to levitate samples suspended in paramagnetic media (FIG. 3A). To illustrate this design, the magnetic levitation (MagLev) configuration of FIG. 2 was rotated 90° in the x-z plane about the geometric center. FIG. 3B shows the magnetic force (estimated using equation 1 and plotted as 2.3 log|$\vec{F}_{mag}$|) that a diamagnetic particle (5 mm in diameter, modeled after the commonly used density standard beads) experienced when it was suspended in an aqueous solution of 1 M MnCl₂, and placed in the field between the magnets. The field gradient exploited in the magnetic levitation (MagLev) configuration of FIG. 2 became horizontal (the horizontal midline in FIG. 3A); the field gradient exploited in this study (the vertical midline in FIG. 3A) became aligned with that of gravity. The force of gravity was constant across the sample. The linear range of this gradient (bounded by the open circles in FIG. 3A) was functionally similar to the gradient along the central axis in the magnetic levitation (MagLev) configuration of FIG. 2 for levitating samples in paramagnetic media (against gravity). In some embodiments, when a sample is suspended in a paramagnetic medium and then placed in this magnetic field, the sample will experience a magnetic force that pushes it towards the central z-axis, and simultaneously reach its position of equilibrium along the z-axis based on the balance of physical forces along this axis (equation 1).

Figure 3C:
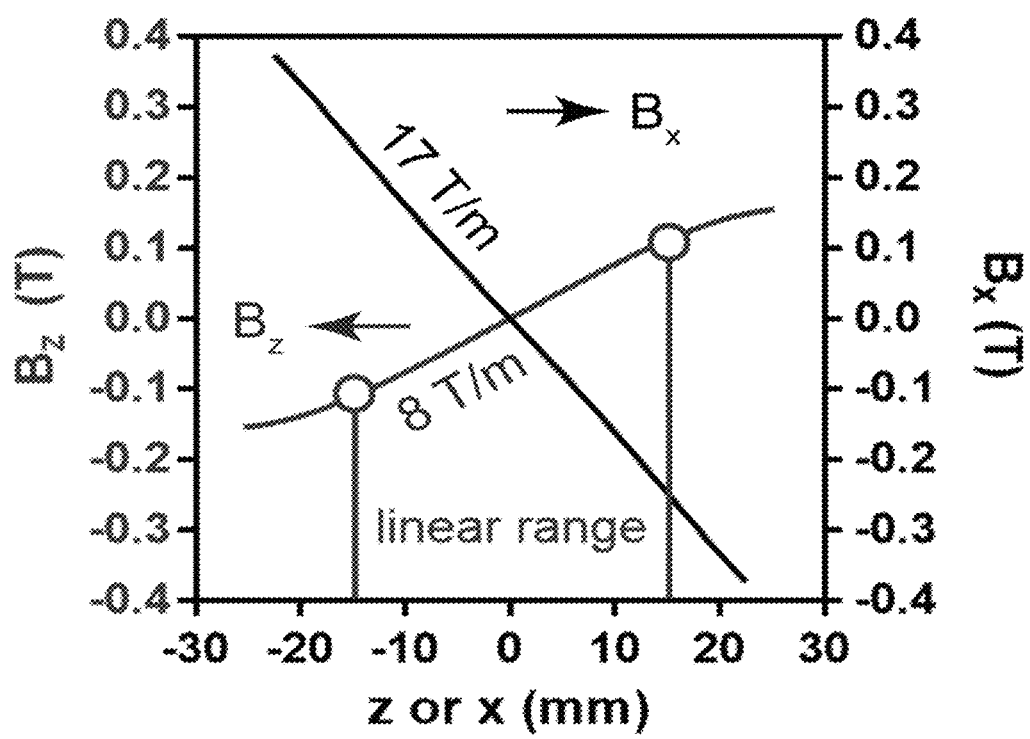
FIG. 3C shows the strength of the magnetic field along the vertical and horizontal midlines in FIG. 3A, according to one or more embodiments.

Equations 1 and 2 are equally applicable to the samples that levitate in the linear range of the field ($B_z$ in FIG. 3C, which was slightly weaker than the gradient exploited in the magnetic levitation (MagLev) configuration of FIG. 2, $B_r$).

Design of the Magnet Array

In some embodiments, magnets are inserted into the space between rows of tubes along the shorter dimension of the 96-well plate established the magnetic field for the tubes (FIG. 6A). The profile of the magnetic field between every pair of like-poles facing magnets (i.e., N/N or S/S) was similar to that in the single-sample magnetic levitation (MagLev) device. The vertical field gradient (i.e., along the z-axis in FIG. 3A) in parallel to the faces of the magnets was leveraged to levitate samples suspended in a 96-well plate.

Figure 7A:
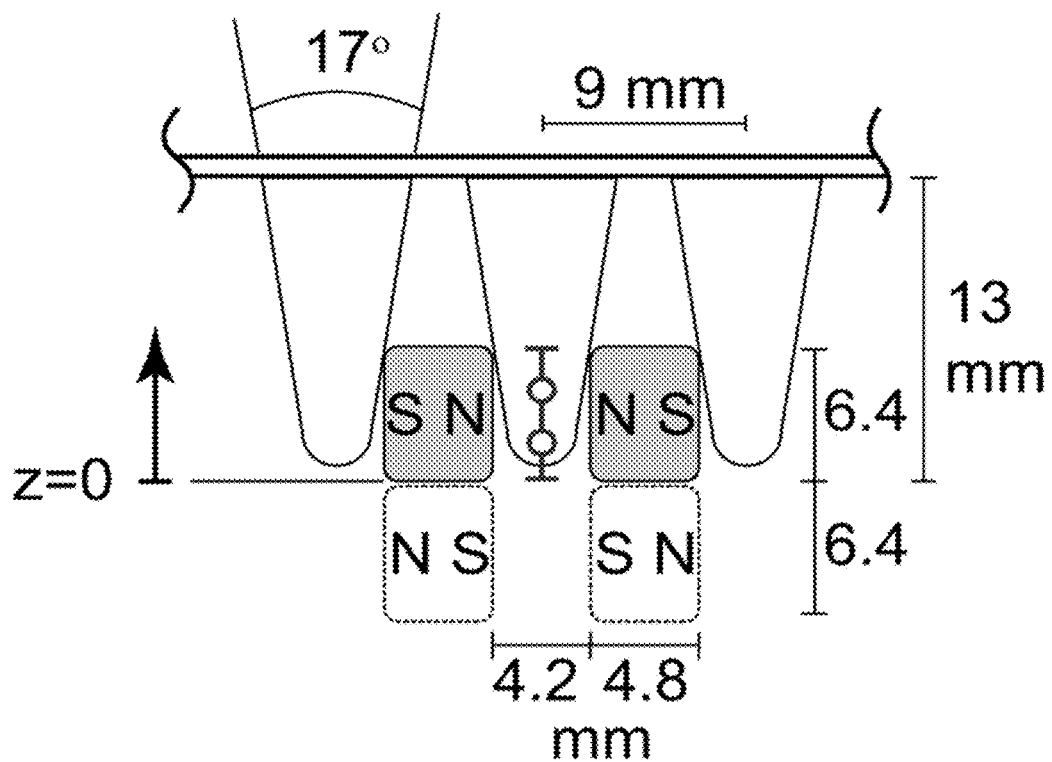
FIG. 7A is a schematic showing the key dimensions of a 96-well plate and the spatial arrangement and dimensions of the magnets between the tubes, according to one or more embodiments.

The one or more embodiments of magnetic levitation (MagLev) described herein is compatible with biological samples. Two different but complementary approaches enabled this biological compatibility by increasing the strength and gradient of the magnetic field (vertical line at the center of the sample deposition tube in FIG. 6B), and thus, minimizing the concentrations of paramagnetic salt needed to levitate living cells, and other samples sensitive to high concentrations of salts (equation 2). (i) Decreasing the size of the magnets relative to those used in the magnetic levitation (MagLev) configuration of FIG. 2 was important in designing the magnet array to be compatible with a 96-well plate. In some embodiments, the spatial profiles of the magnetic fields for permanent magnets (single or combinations) are uniformly scalable—that is the shape and strength of the magnetic field are maintained as the absolute dimension of the field changes (e.g., comparing the values of gradients in FIG. 3C vs. the gradients in FIG. 7B). This miniaturization, therefore, allowed straightforward adjustment of the gradient of the magnetic field. (ii) Stacking an additional set of magnets at the bottom of the first set (FIG. 7) enhanced the strength of the magnetic field in the gaps of the array. In some embodiments, this approach of stacking of magnets increased the gradient of the field (from 137 T/m to 198 T/m, a factor of about 1.45, FIG. 7B), and also increased the value of $B_z(dB_z/dz)$ (e.g., from 28 T²/m to 116 T²/m at z=1.5 mm, a factor of 4.14, FIG. 7C). The strength of the gradient was critical in determining the concentration of paramagnetic species required to levitate a sample of a given density (equation 2). See FIGS. 4A-4E and FIGS. 5A-5E for details on simulation of the magnetic fields (using COMSOL®), according to some embodiments.

Selecting the Number and Dimensions of Magnets

A typical 96-well plate used for applications with polymerase chain reactions was chosen because of the optical transparency of its thin-walled tubes, and because it was facile to insert magnets between the rows of the tubes. The dimensions of the tubes were used to define the wells (conically shaped tubes with a cone angle of about 17°, a height of 13 mm, and an inter-tube spacing of 9 mm, FIG. 7A) to select the number and size of the magnets.

COMSOL® was used to simulate and evaluate the profile of the magnetic field in the gaps of the magnet array. Simulation in COMSOL showed that a minimum number of 15 magnets and a minimum length of about 101.6 mm (about 4 inches) of the magnets were required to create a nearly uniform magnetic field in all 12 gaps to accommodate all 12 columns of tubes on a 96-well plate. An array of 15 magnets of 101.6 mm×4.8 mm×6.4 mm (L×W×H)—half of the final magnet array—was used as an example to illustrate the design.

Figure 4C:
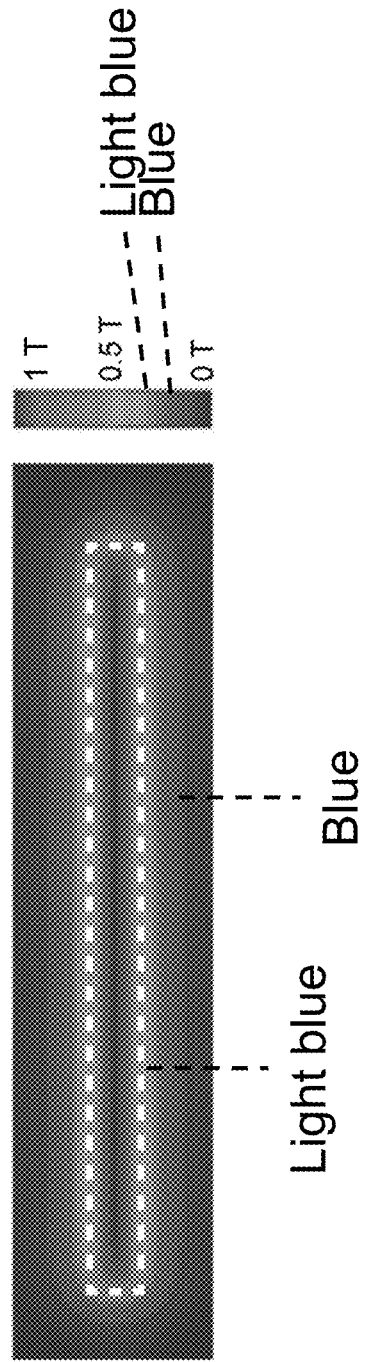
FIG. 4C shows the profile of magnetic field strength on plane b in FIG. 4A, according to one or more embodiments.
Figure 4D:
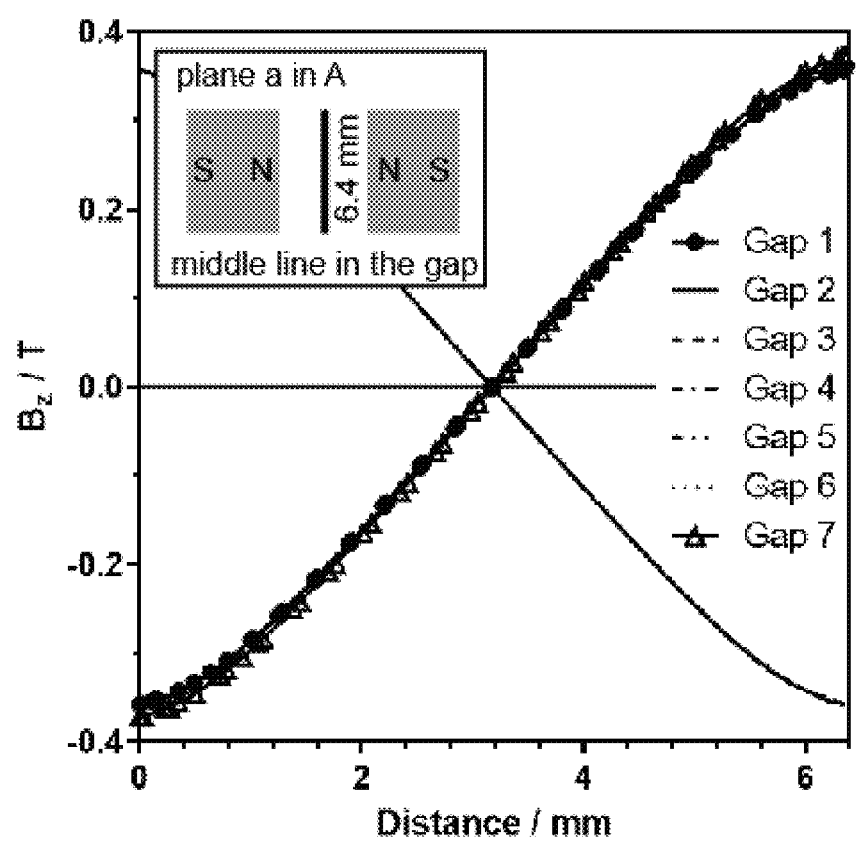
FIG. 4D shows $B_z$ along the white lines in FIG. 4C, according to one or more embodiments.
Figure 4E:
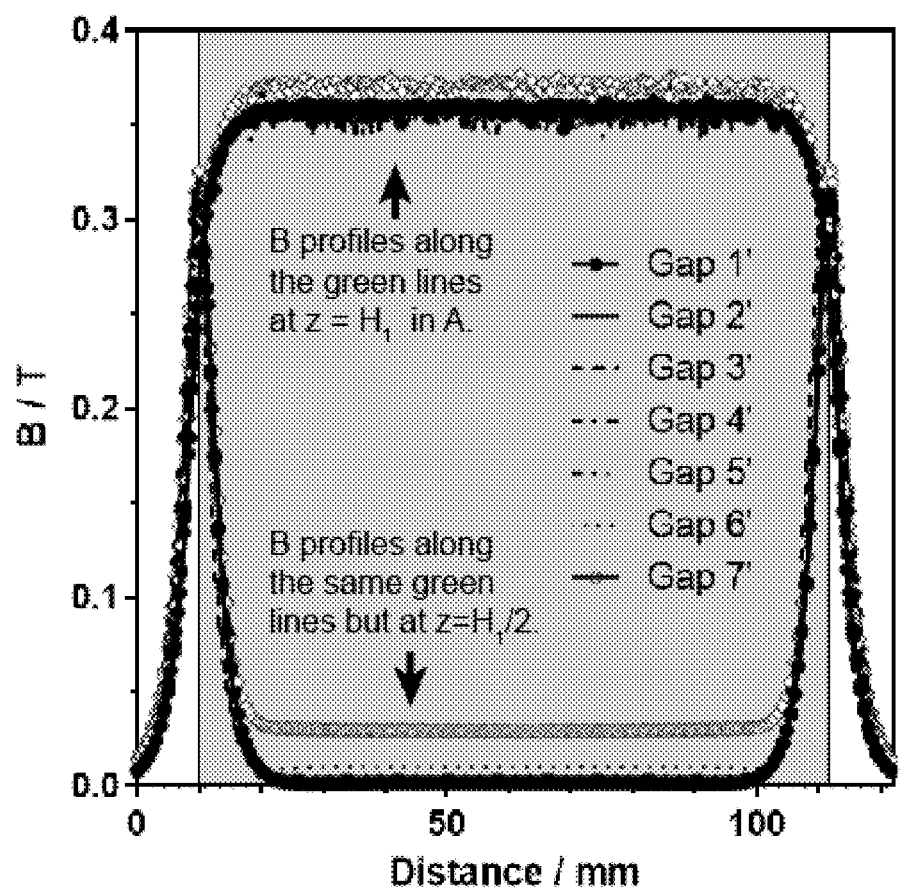
FIG. 4E shows the profile of the magnetic field strength along the long dimension of the magnets at two different heights.

First, the profile of the magnetic field in the outermost gaps deviated slightly from those in the middle, which were virtually indistinguishable. For example, the strength of the field along the y-axis (along the longest dimension of the magnets) at both $z=H_1/2$ and $z=H_1$ (FIG. 4A, plane b, lines parallel to the magnet's longest dimension, $H_1$ is the height of the magnet, and $z=0$ is defined at its bottom face) in the middle of the outermost gaps 7 and 7' deviated from those in other gaps (FIGS. 4C and 4E). Similarly, the z-component of the magnetic field along the vertical centerlines of the gaps (FIG. 4A, white lines on plane a) in the outermost gaps deviated from those in other gaps (FIGS. 4B and 4D). While the outermost gaps were similarly functional to levitate objects, they were excluded in this example for simplicity.

Second, a minimum length of 101.6 mm (4 inches) of a magnet was required to create a uniform profile of the magnetic field in the gaps along the length of the magnet (represented by the flat profiles of the field along the y-axis in the middle segments, FIG. 4E). The magnetic field was not uniform—as expected—towards the edge of the magnets. The uniform profile of the field was important to ensure that all eight tubes in a single column on the plate (which spans about 63 mm) experienced indistinguishable magnetic fields.

Figure 5A:
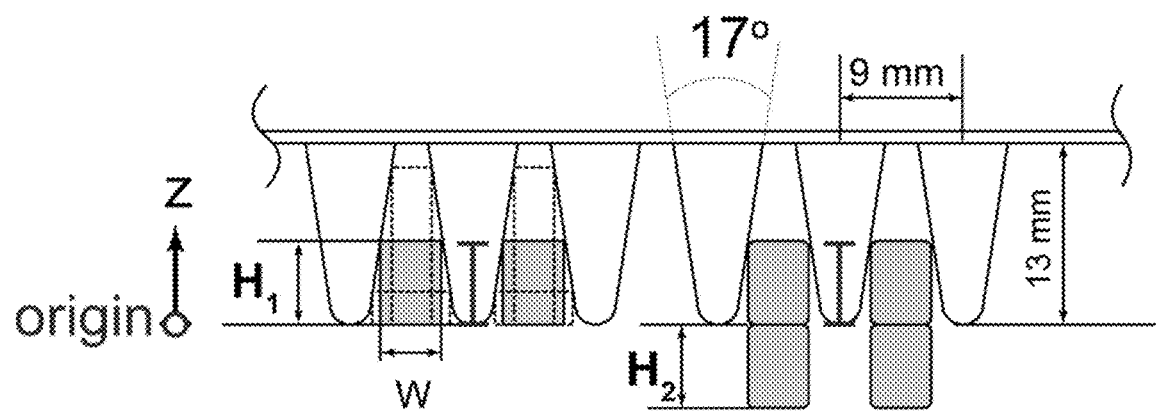
FIG. 5A shows a schematic of the spatial arrangement of the magnets and the tubes on the 96-well plate used for the simulation, according to one or more embodiments.
Figure 5B:
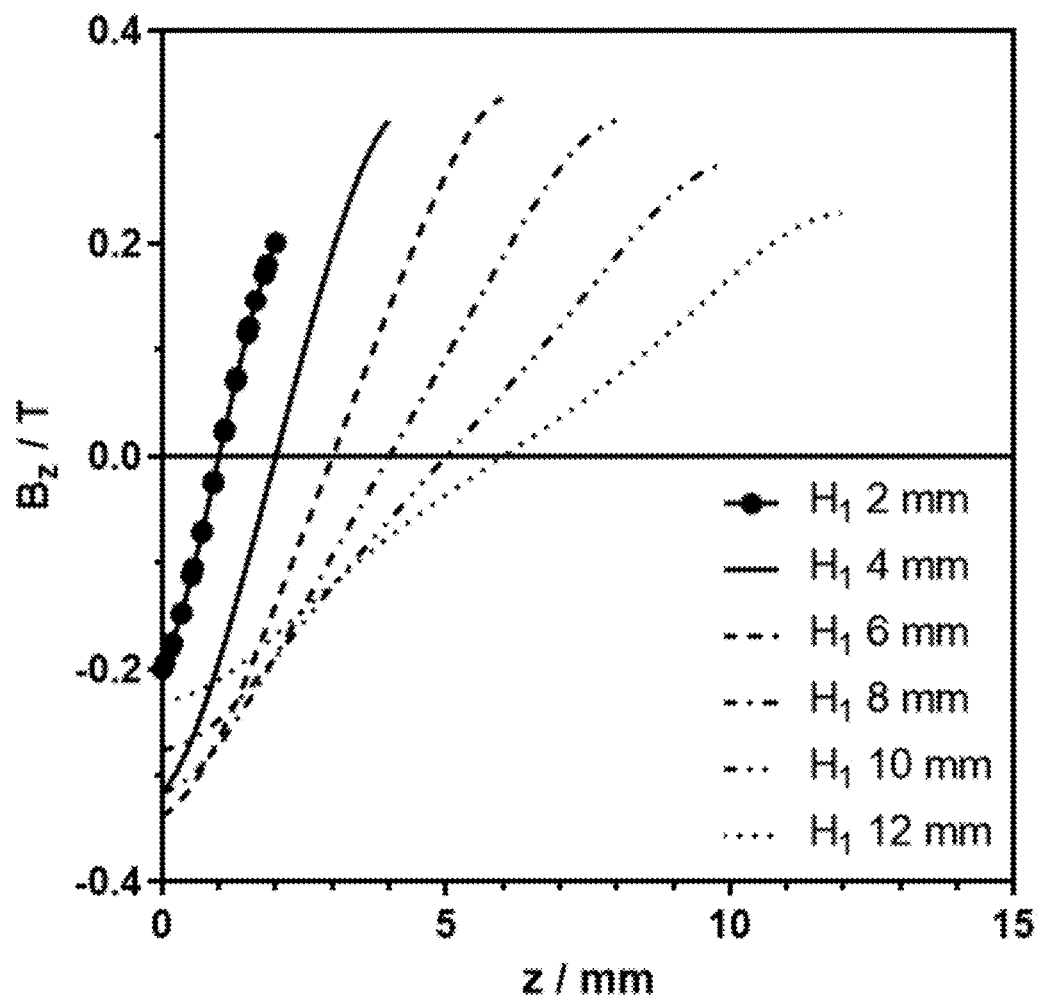
FIG. 5B shows $B_z$ along the midline of the sample deposition tube as the height of the magnets, $H_1$, varies, according to one or more embodiments.
Figure 5C:
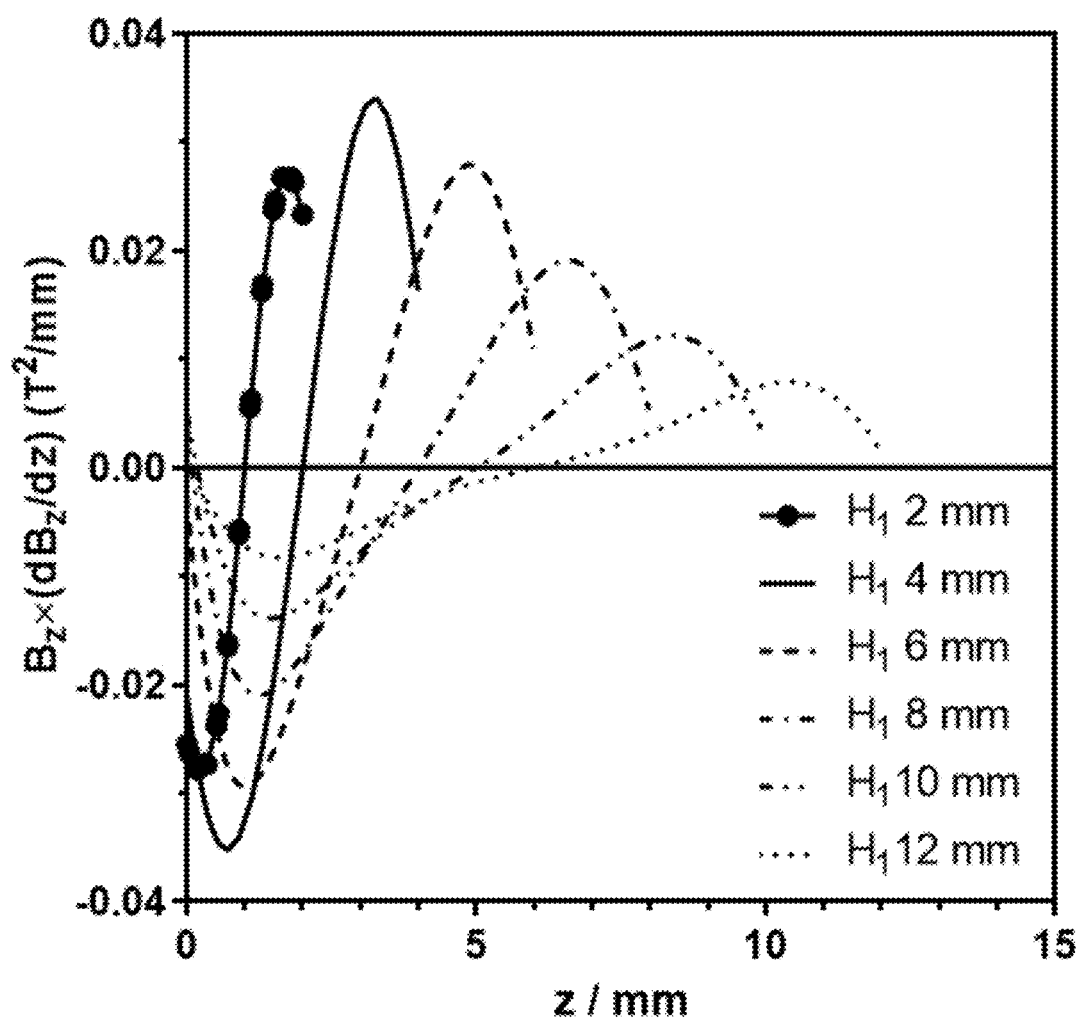
FIG. 5C shows the derived term $B_z \times (dB_z/dz)$ along the midline of the sample deposition tube as the height of the magnets, $H_1$, varies, according to one or more embodiments.
Figure 5D:
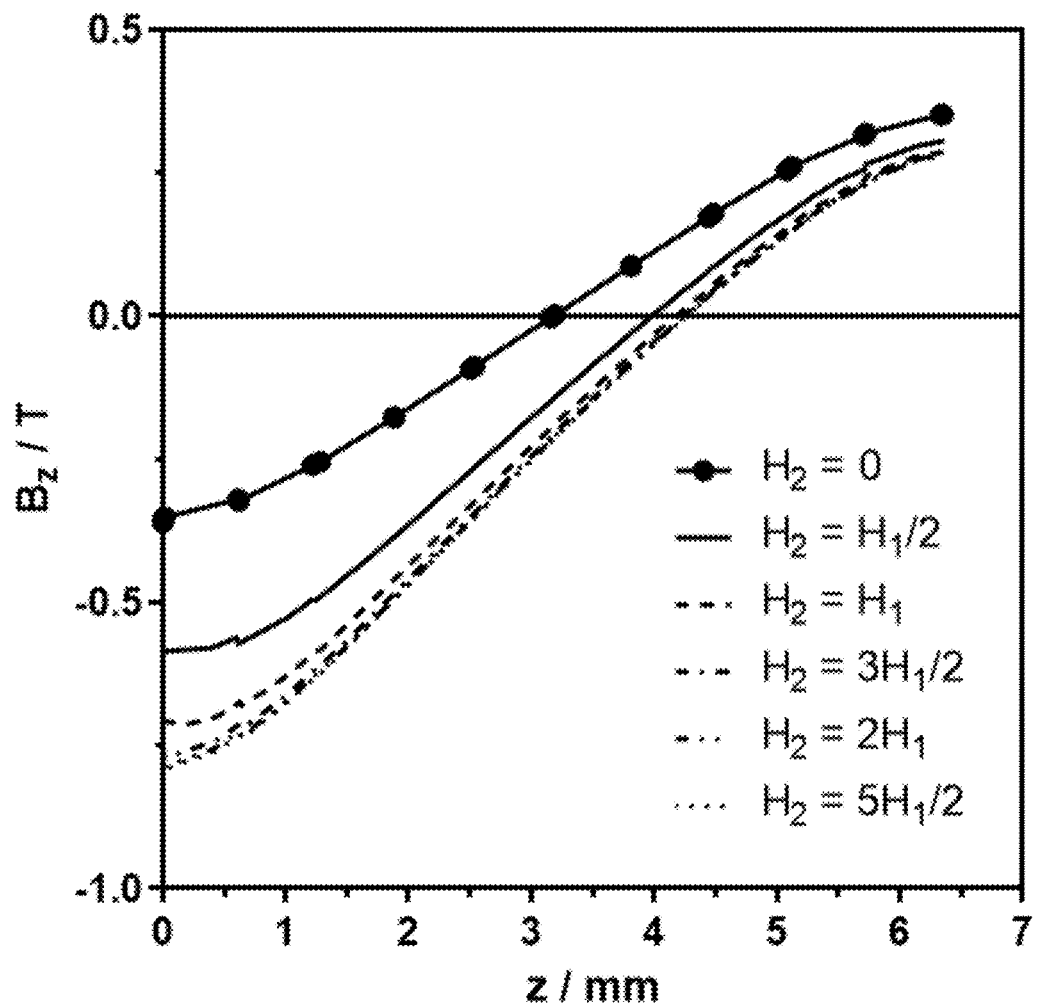
FIG. 5D shows $B_z$ along the midline of the sample deposition tube as the height of the bottom magnets, $H_2$, varies ($H_1$ is constant), according to one or more embodiments.
Figure 5E:
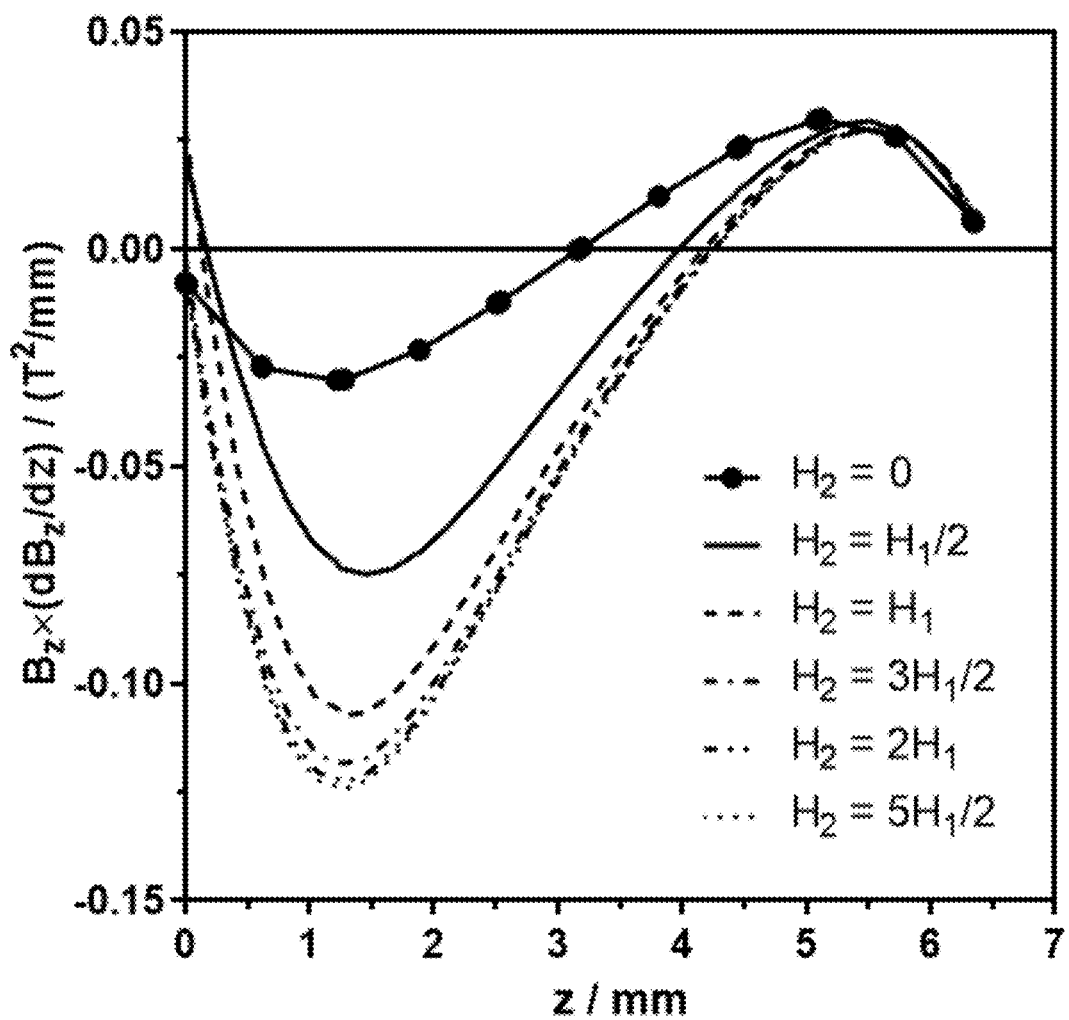
FIG. 5E shows the derived term $B_z \times (dB_z/dz)$ along the midline of the sample deposition tube as the height of the bottom magnets, $H_2$, varies ($H_1$ is constant), according to one or more embodiments.

Third, the specific dimensions of the magnets—the width (W) and height ($H_1$)—were optimized. In some embodiments, equation 2 suggested that, for a given concentration of paramagnetic medium (and thus a fixed value of the magnetic susceptibility of the suspending medium), the measurable range of density could be determined by the characteristics of the magnetic field as indicated by the $B_z(dB_z/dz)$ term; therefore, its dependence on the dimensions of the magnets was evaluated. In the simulation, the origin of the z-axis was placed at the bottom of the tube to maximize the use of the space between the magnets for density measurements. The bottom faces of the magnets were then set at $z=0$ and the height of the magnets, $H_1$, swept—the width of the magnets changed accordingly as the magnets adapted to the tubes on the plate. The influence of height of the magnets on the z-component of the field $B_z$ and the term $B_z(dB_z/dz)$ was quantitatively evaluated. FIGS. 5B and 5C show that as the height of the magnets increased from 2 mm to 12 mm, the z-component of the magnetic field $B_z$ increased to reach a maximum at $H_{1~6}$ mm while $B_z(dB_z/dz)$ reached its maximum earlier at $H_1$~4 mm. As $H_1$ increased beyond ~8 mm, neither $B_z$ nor $B_z(dB_z/dz)$ was linear. Given the commercial availability of magnets (long and thin NdFeB magnets were brittle and susceptible to mechanical breakage, and were only available in limited selection of sizes and shapes even for customized magnets), and the physical dimensions of the 96-well plate, 15 magnets of $H_1$=6.4 mm were used to generate uniform magnetic fields for all of the tubes included in the plate, while maximizing both the working distance and the gradient of the magnetic fields.

Fourth, a second set of magnets was stacked at the bottom of the first set to increase the strength of the magnetic field further, and, thus, to reduce the concentration of the paramagnetic species in the medium required to levitate samples. The strong magnetic field around the boundary was exploited where two opposite poles of the magnets meet as shown in FIG. 3C. In the simulation, the same width and length as for the second set of magnets was used, and its height, $H_2$, swept. The $B_z$ at $z=0$ in the gap (FIG. 5D) clearly increased when the height of the second set of magnets $H_2$ increased from zero to $H_2=H_1$, and then quickly plateaued beyond $H_2>H_1$. Therefore, $H_2=H_1$ was selected as the final configuration. It was estimated that this approach of stacking magnets increased $B_z(dB_z/dz)$ by about 4× (at $z=1.5$ mm, FIG. S2E)—that is, in some embodiments, about 4× diluted paramagnetic medium may be used to levitate samples of the same density (equation 2).

Figure 7B:
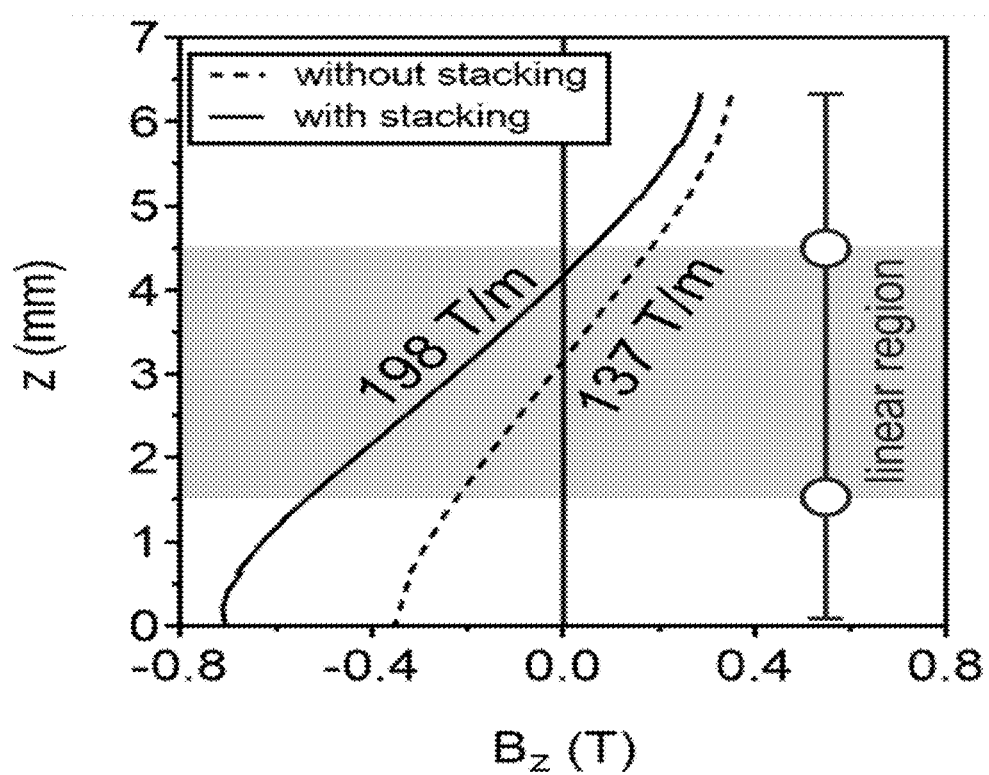
FIG. 7B shows the magnitude of $B_z$ along the central z-axis in the gap increased by stacking a second set of magnets (the unfilled boxes in FIG. 7A) below the first set (the filled boxes in FIG. 7A), according to one or more embodiments.
Figure 7C:
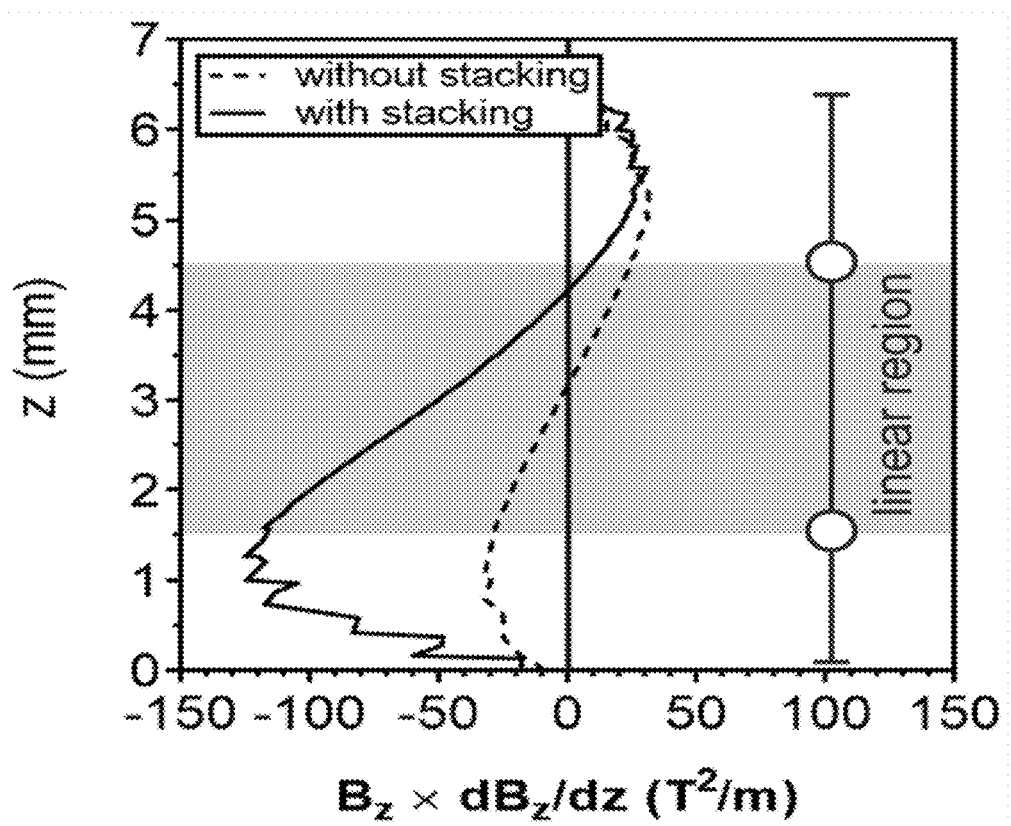
FIG. 7C shows the magnitude of $B_z \times dB_z/dz$ along the central z-axis in the gap increased by stacking a second set of magnets (the unfilled boxes in FIG. 7A) below the first set (the filled boxes in FIG. 7A), according to one or more embodiments.

In summary, in some embodiments, COMSOL® simulations, commercial availability, and spatial constraints of the well plate were used to construct the following magnet array of the device: 15 magnets of 101.6 mm×4.8 mm×6.4 mm (L×W×H), and a second set of magnets of the same type at the bottom to further increase the strength of the magnetic field while maintaining an approximately linear magnetic field over ~3 mm in the gaps (FIG. 7B). The equations of linear fits to the curves within the highlighted region were $z=5.06B_z+4.18$ ($R^2>0.99$, solid curve) and $z=7.34B_z+3.18$ ($R^2>0.99$, dashed line). FIG. 7C shows the magnitude of $B_z(dB_z/dz)$ increased by ~4× at $z=1.5$ mm by stacking a second set of magnets. The jagged steps on the lines are due to the low spatial resolution used in the simulation. The enhanced strength and gradient of the magnetic field were critical in decreasing the concentrations of the paramagnetic salts required to levitate living cells.

Choice of Paramagnetic Medium

In some embodiments, magnetic levitation (MagLev) requires a paramagnetic medium to levitate a diamagnetic sample. In addition, in some embodiments, the paramagnetic medium should be compatible with (e.g., unreactive with, and non-dissolving and non-toxic toward) the sample to be levitated. In some embodiments, cost, commercial availability, volatility, and density are also important. For biological samples, water is an exemplary solvent. For non-biological applications, paramagnetic salts (e.g. aqueous solutions of $MnCl_2$ or $GdCl_3$), hydrophobic Gd chelates (dissolved in hydrophobic solvents, such as aromatic hydrocarbons), and paramagnetic ionic liquids can be used to levitate objects.

In some embodiments, biologically compatible Gd•DTPA ($Gd^{3+}$ chelated with diethylenetriaminepentaacetic acid) is used in biological applications to magnetically trap and translate single cells in 3D. In other embodiments, similar Gd chelates, such as gadobutrol (Gadovist®) and gadobenate dimeglumine (MultiHancea®), can be used to levitate living cells for separations and analyses. In one or more of the embodiments described herein, gadobutrol was used to levitate living cells because of its biological compatibility, based on preliminary work with cells. In some embodiments, given the commercial availability of a large range of paramagnetic chelates (e.g., based on $Gd^{3+}$ or $Mn^{2+}$), and differences in cost and performance, selection of chelates for specific applications should be evaluated where appropriate.

Figure 13:
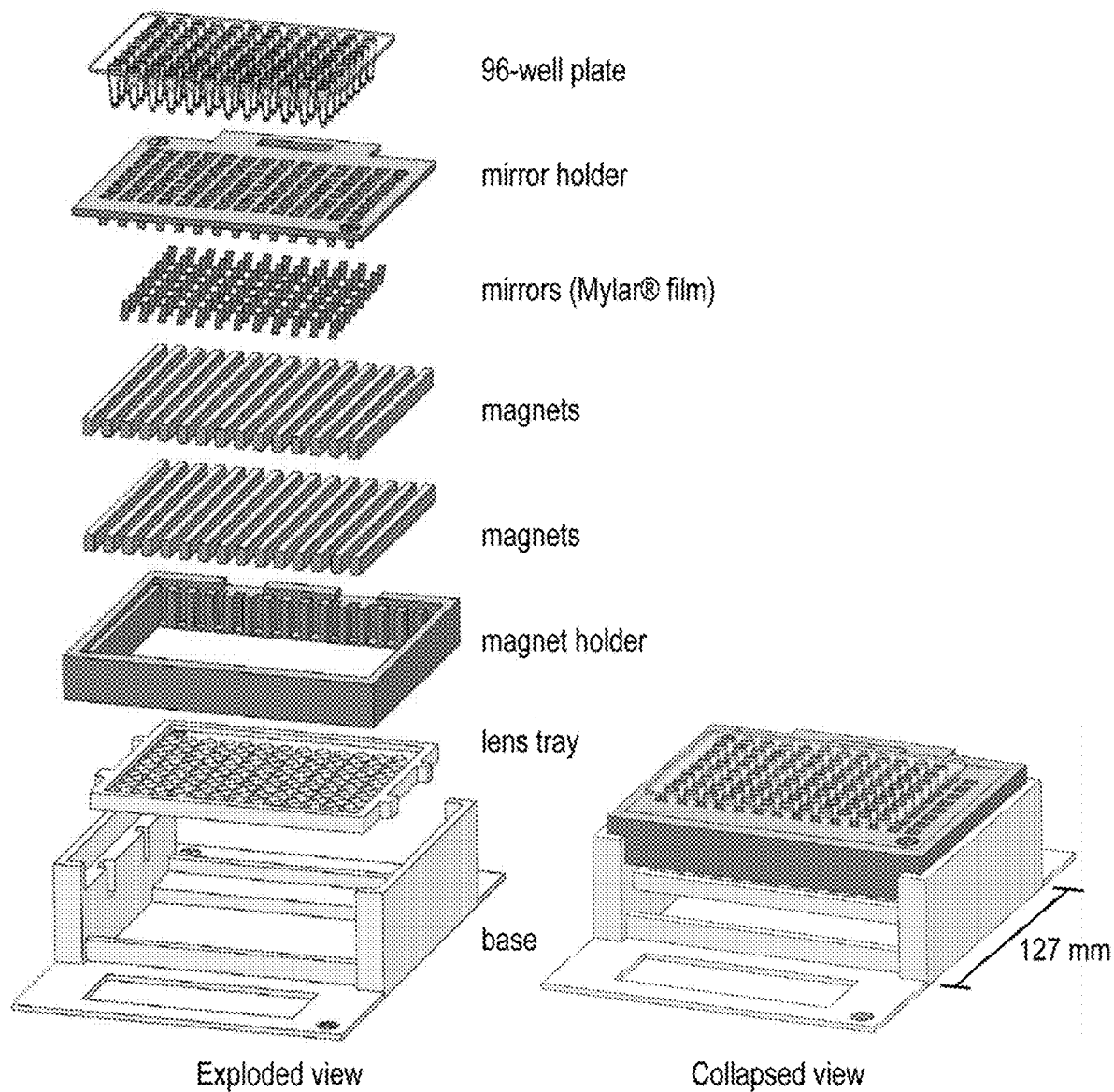
FIG. 13 shows exploded and collapsed views of an assembled device according to one or more embodiments.

Design of a Device, Incorporating a Flatbed Scanner, to Image Samples that Levitate in a 96-Well Plate A flatbed scanner was used to acquire images of the levitated samples in a 96-well plate, and an apparatus (including a flatbed scanner and a simple interface) was designed that uses mirrors and relay lenses to project focused images of the levitated samples to the scanner bed. In some embodiments, the flatbed scanner provided a simple, affordable imaging device to acquire images of levitated samples in a 96-well plate. In some embodiments, a specific model (Perfection V550 from Epson®) has six useful characteristics: (i) It is inexpensive (~$200 for one scanner), and requires minimal maintenance. (ii) The imaging area of the scanner is large (216 mm×297 mm), and can accommodate up to two 96-well plates (80 mm×120 mm), for example positioned end-to-end with the long axis of the plate parallel to the centerline of the scanner. (iii) It has a built-in light source: a LED that provides a uniform, line illumination. It is used in the "transmittance" mode to scan transparency films, and has a width (~83 mm, perpendicular to the direction of scanning) that can span the full width of a 96-well plate (80 mm). The lid is also detachable from the scanner body, and thus, was raised in height to accommodate the analytic device (FIG. 13). (iv) The scanner has a high optical resolution (6400 dpi, i.e. ~4.0 μm per dot)—a resolution useful to image small particles (e.g., suspended powders or clusters of cells). (v) The scanning process is fast. (e.g., about 10 min to scan an entire 96-well plate at a resolution of 6400 dpi.) (vi) The scanner is compact, lightweight, and portable.

In some embodiments, using the scanner to capture the image of samples in the 96-well plate required overcoming the fact that the scanner has its focal plane at the flatbed, and has a limited focus range to resolve clearly samples that are placed at a distance above the focal plane, or the flatbed. Hence, in some embodiments, mirrors were inserted in the gaps of the magnet array and between the tubes at about 45° to project images of the tubes downward to the scanner. The images of the samples in the mirrors that formed were at least about 13 mm (the height of the stacked magnets) above the flatbed of the scanner.

To focus the images, in some embodiments, an array of relay lenses were employed—e.g., a simple, inexpensive, biconvex plastic lens that formed a focused image of an object on the other side of the lens—to project focused images of the samples within the tubes onto the flatbed of the scanner, the plane on which samples (e.g., a document) are placed to be scanned.

Figure 8A:
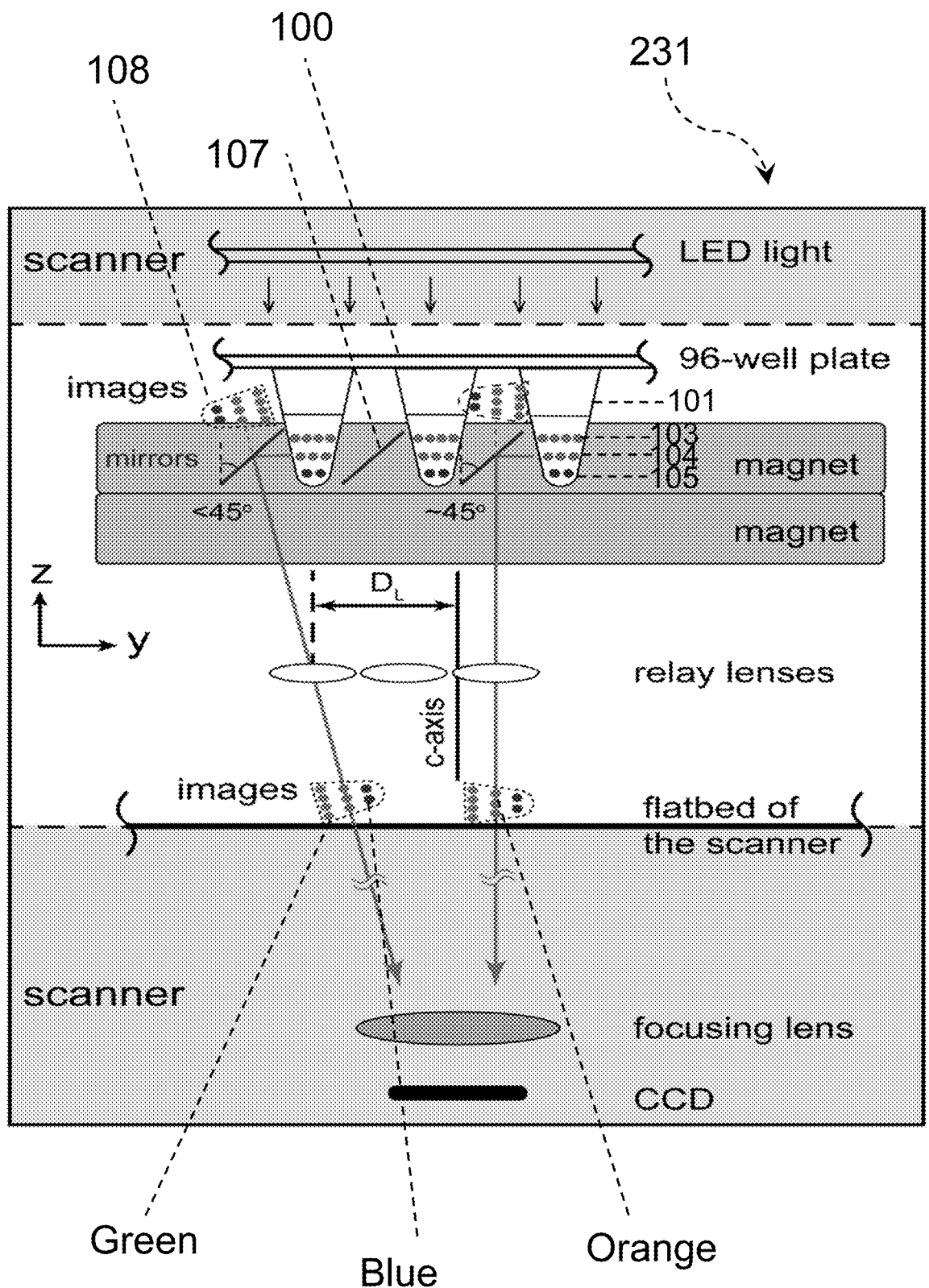
FIG. 8A shows the spatial arrangement of the key optical components of the system, according to one or more embodiments.
Figure 8B:
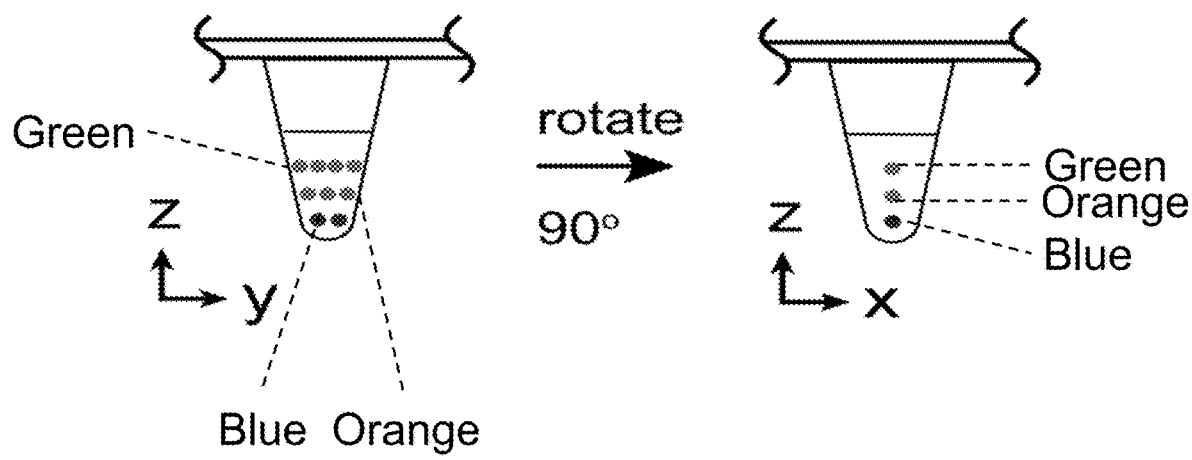
FIG. 8B shows particles having the same densities levitate at the same z-coordinates, and form parallel lines in the tubes, according to one or more embodiments.
Figure 8C:
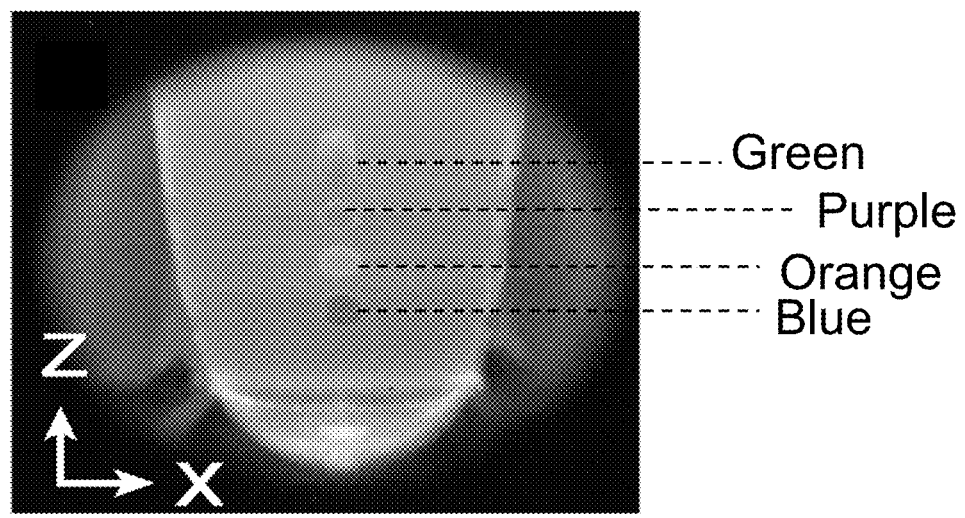
FIG. 8C shows four density standard beads levitated at different z-coordinates and appeared to the scanner through the relay lens, according to one or more embodiments.
Figure 9:
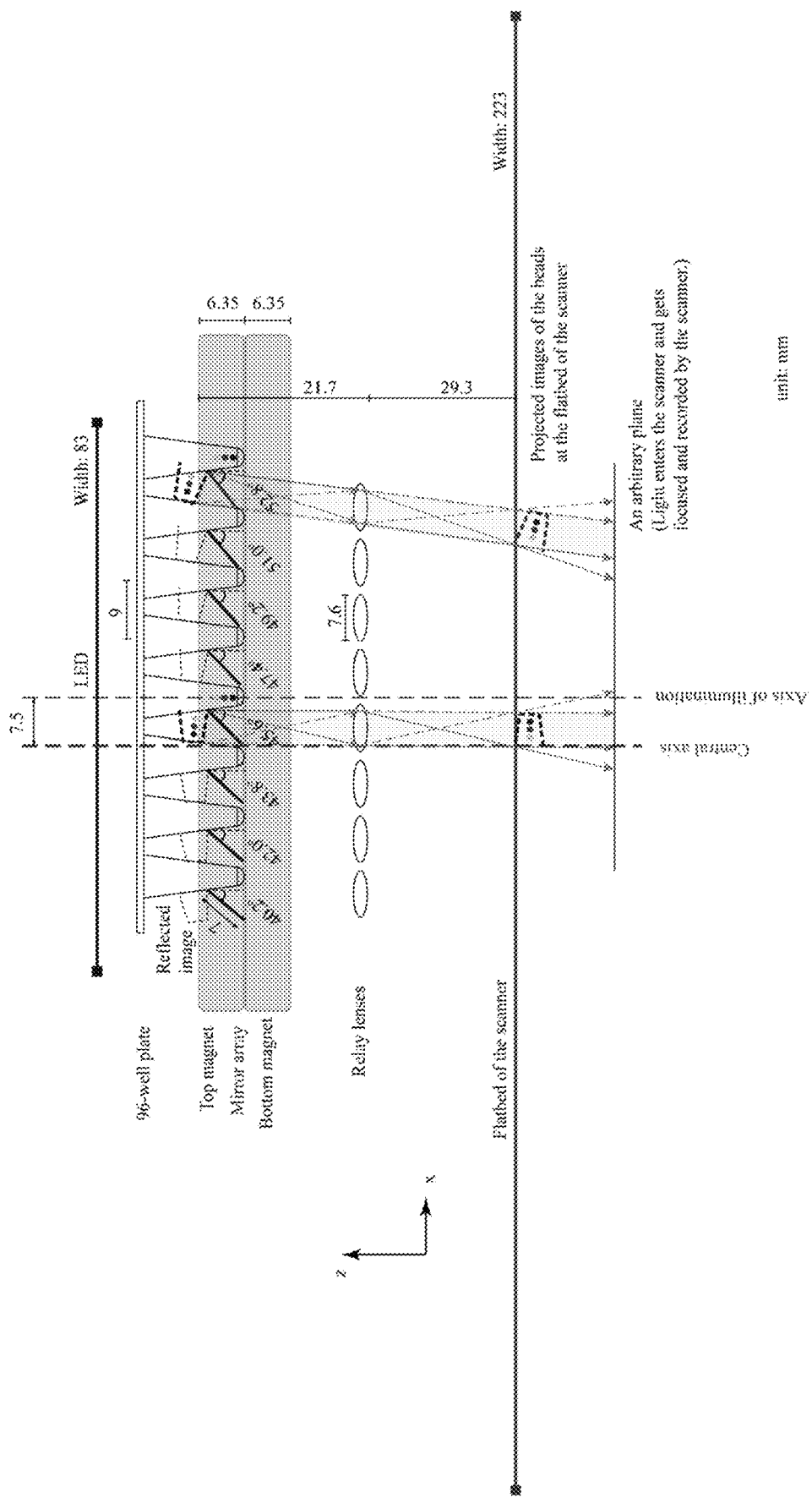
FIG. 9 shows spatial arrangement of magnets, mirrors and lenses used to levitate and image samples in paramagnetic media in a 96-well plate, according to one or more embodiments.
Figure 10A:
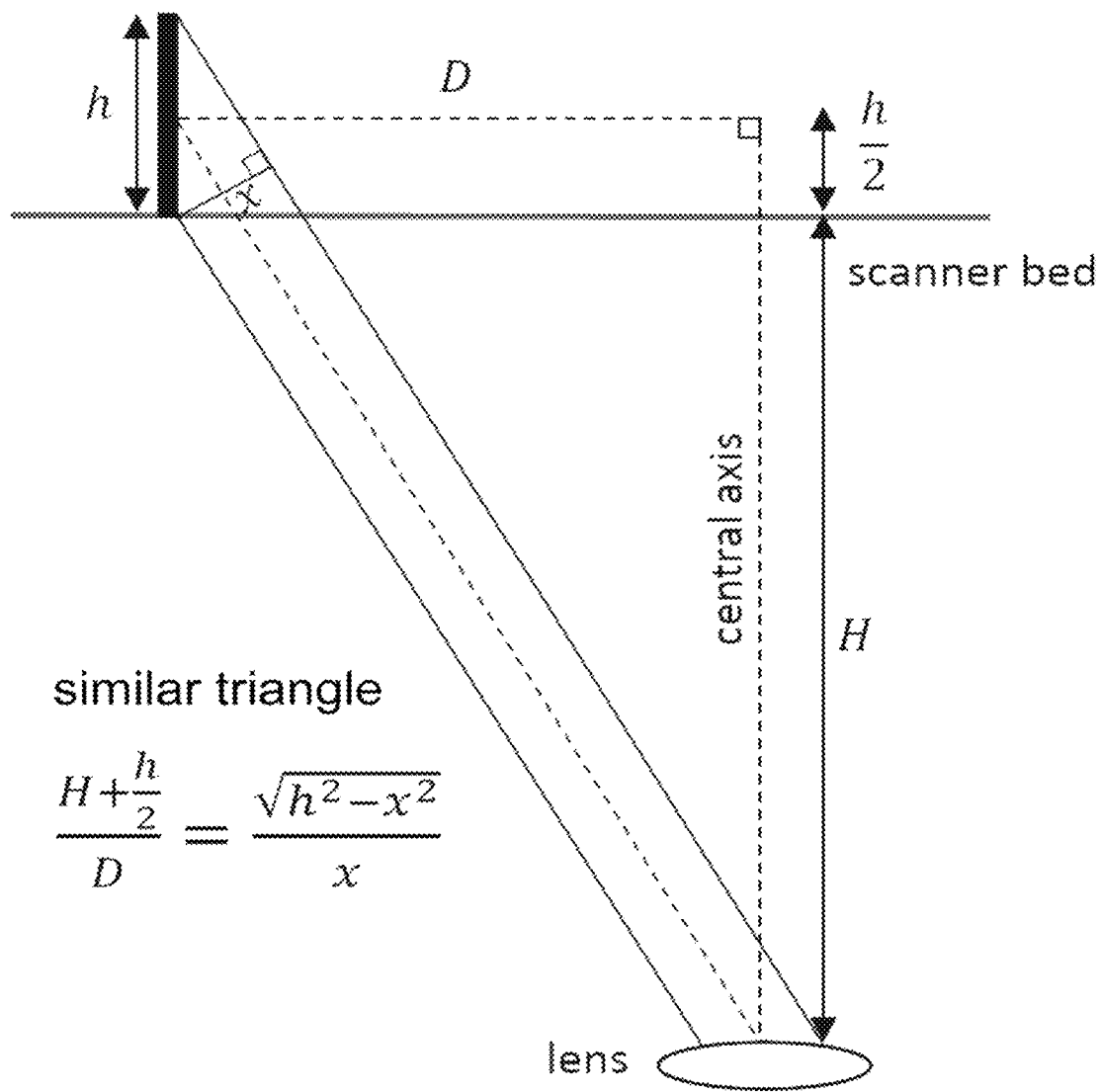
FIG. 10A shows a schematic of an optical system to model the optics internal to the scanner, according to one or more embodiments.
Figure 10B:
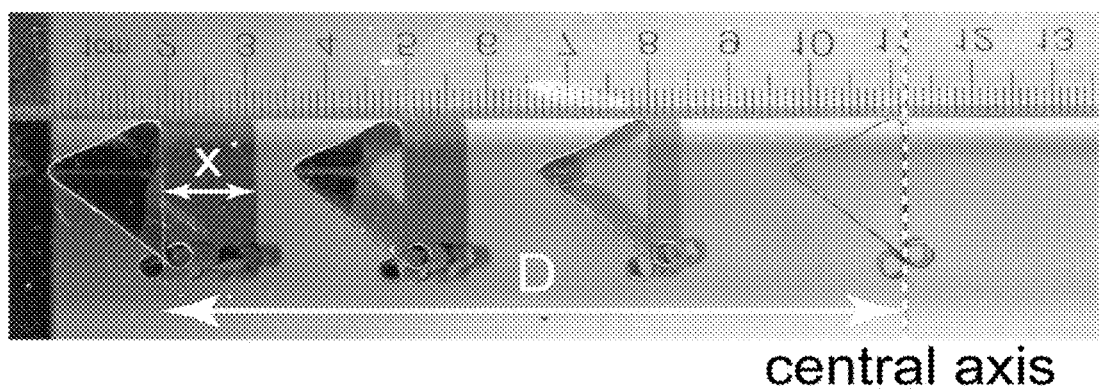
FIG. 10B shows four binder clips (h=32 mm), along with a ruler, placed on the scanner at various distances to the central axis (dashed line), according to one or more embodiments.
Figure 11:
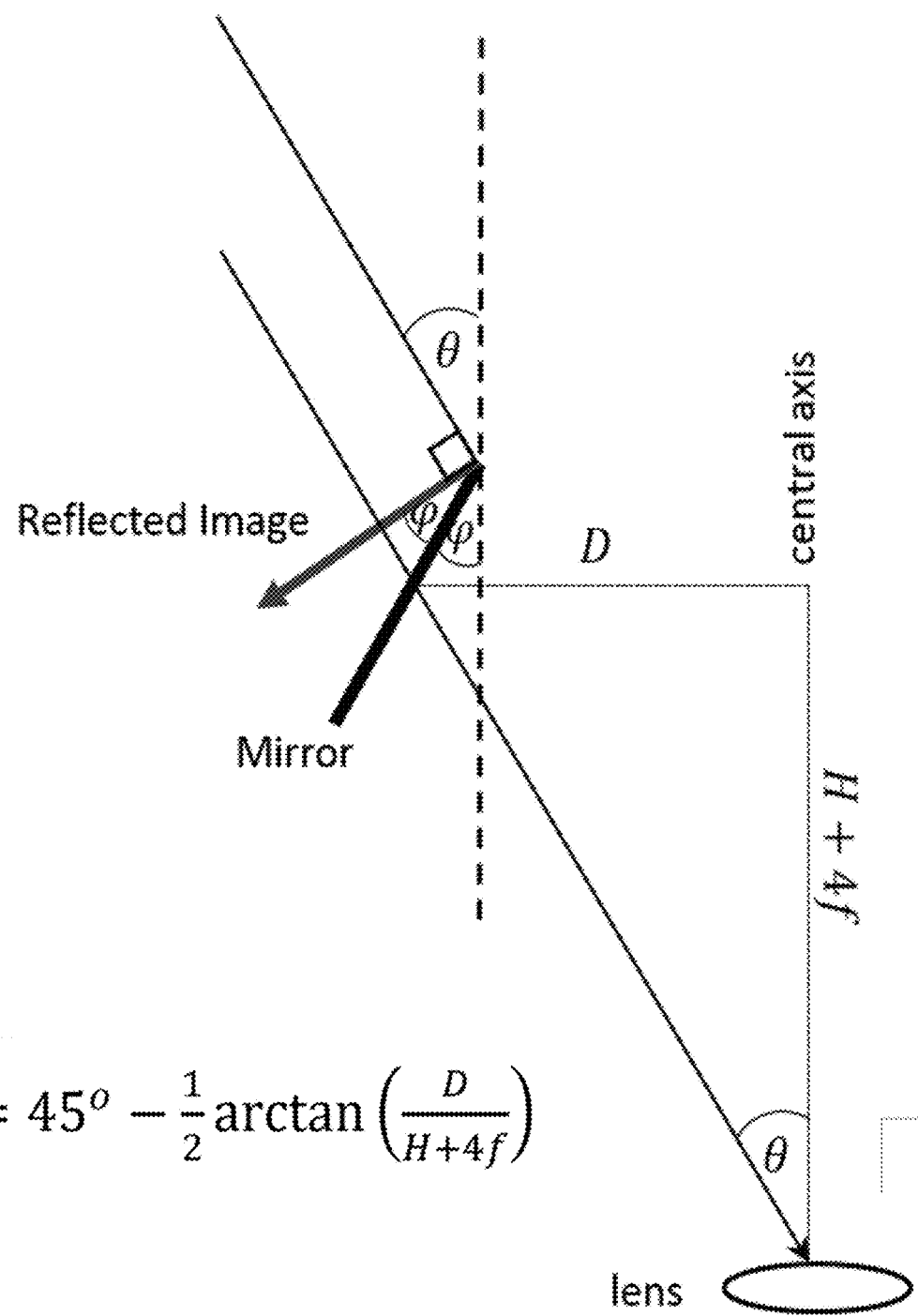
FIG. 11 shows determination of the angles of the mirrors to provide a "head-on" view of levitating objects, according to one or more embodiments.
Figure 12:
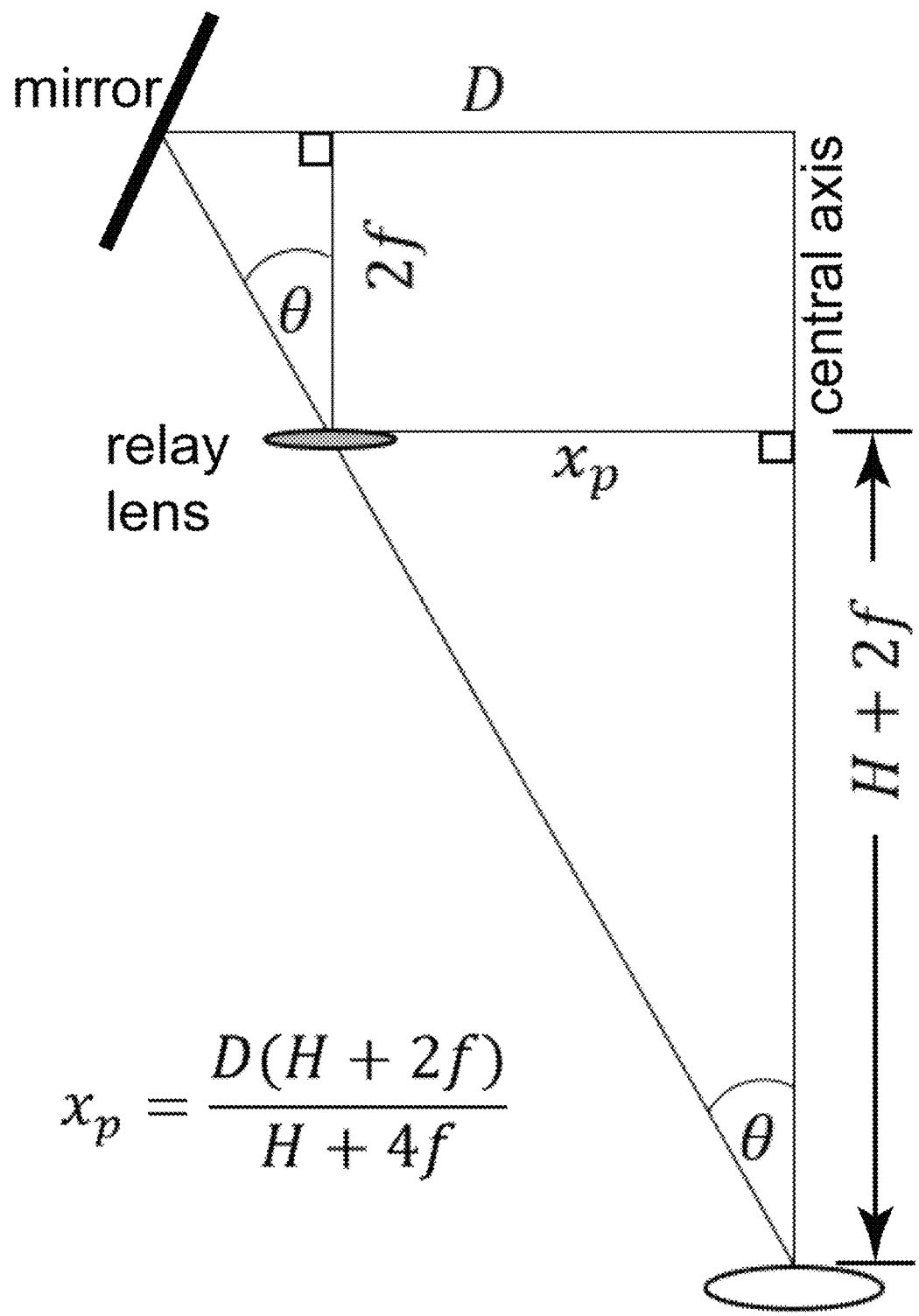
FIG. 12 shows estimation of the lateral shifts of the lenses, $x_p$, with respect to the central axis of the scanner, where f is the focal length of the relay lens, according to one or more embodiments.

In addition, in some embodiments, the specific design of the scanner using a single focusing lens (or equivalent) had an oblique angle in viewing a 3D object placed on the flatbed, in a position that was laterally shifted from its central axis (c-axis, FIGS. 8A and 9; see FIG. 10B for an example using binder clips). Carefully adjusting the angles of the mirrors, and the lateral displacements of the lenses, $D_L$, with respect to the central axis of the scanner, generated focused, non-oblique views of the samples that levitated in the tubes (see FIGS. 9-12 for detailed designs). Due to the particular shape of the magnetic fields between the magnets, the samples (e.g., small colored particles having the same density) levitated at the same z-coordinates, and formed straight lines (in the y-z plane) parallel to the faces of the magnets (FIG. 8B). Because the mirrors face the tubes in the gaps, the reflected images of the lines in the mirrors, and also the refocused images on the flatbed of the scanner, appeared to the scanner as single dots (FIG. 8A-B). FIG. 8C shows an image of a set of four, colored particles (used as density standards) that the scanner acquired. These particles appeared as single dots on the acquired image; the view to the particles behind the first particles of the same color was blocked. In some embodiments, these particles may, however, become partially visible when they levitate at different z-coordinates due to differences in density, or slight misalignment of the mirrors and/or the lenses. In some embodiments, the spatial arrangement of the mirrors and lenses is described in table 1.

TABLE 1

Spatial Arrangement of the Mirrors and Lenses.

| Tube No. | 1 | 2 | 3 | 4 | 5 | 6 | 7 | 8 |
|---|---|---|---|---|---|---|---|---|
| Lateral shift of the mirror (D, mm) | −24.0 | −15.0 | −6.0 | 3.0 | 12.0 | 21.0 | 30.0 | 39.0 |

TABLE 1-continued

Spatial Arrangement of the Mirrors and Lenses.

| Tube No. | 1 | 2 | 3 | 4 | 5 | 6 | 7 | 8 |
|---|---|---|---|---|---|---|---|---|
| Angle of the mirror | 40.2° | 42.0° | 43.8° | 45.6° | 47.4° | 49.2° | 51.0° | 52.8° |
| Lateral shift of the lens ($x_p$, mm) | −23.4 | −15.0 | −6.5 | 1.8 | 10.2 | 18.5 | 27.2 | 35.6 |

Note:
See FIG. 9 for assignment of tube number. All values were reported with respect to the central axis of the scanner, and the direction of the lateral shift of the illumination is designated as "positive."

The Scanner

An Epson® Perfection V600, and its associated software (specifically, the "film" mode) to control and acquire the images was used. The scanner had a flatbed with a width 223 mm, and, in its closable lid, a LED that provided a uniform, line illumination (83 mm). The lid was physically attached to the body of the scanner (through a cable), but was raised from the body of the scanner to a maximum distance of ~65 mm—a distance large enough to accommodate the analytic device. The LED traversed, during scanning, the central axis of the scanner, and illuminated a strip that overlapped the central axis of the scanner with a lateral shift of ~7.5 mm in the orthogonal direction to the central axis. The scanner and the software recorded the central region of the strip with a width of ~60 mm.

FIG. 10A shows a schematic of a simple optical system used to model the optics internal to the scanner. FIG. 10B shows four binder clips (h=32 mm), along with a ruler, placed on the scanner at various distances (marks on the ruler: 2.0 cm, 5.0 cm, 8.0 cm, and 11.2 cm) to the central axis (dashed white line). An object with a height of h was placed on the flatbed at a distance of D to the central axis of the scanner, and had a perceived length of x in the image acquired by the scanner. A similar triangle was used to calculate the physical separation, h, of the flatbed and the lens. When the scanner was used to image 3D-objects (e.g., the analytic device), it provided an oblique view, that is objects placed further away from the central axis of the scanner appeared to be tilted toward the axis. This observation probably originated from the optics of the scanner, and is not a surprise given the fact that the scanner is usually optimized to image thin, 2D sheets. A simple convex lens was used to model the optics internal to the scanner (which was presumed to be based on a similar design), which estimated the critical parameter (~240 mm, based on the model described in FIG. 10), the distance of physical separation between the flatbed and the lens of the scanner. This parameter was used to design and guide the spatial placement of mirrors and lenses.

The Mirrors

Mirrors were inserted in the gaps of the magnet array at ~45±5° facing downward to project images of the individual tubes. In building the mirror component of the device, a total of 8 mirrors in each of the 12 gaps were inserted at an inter-mirror separation of 9 mm, the centers of the mirrors positioned at the half height of the top magnets, and the row of mirrors aligned symmetrically about the axis of illumination. Because the axis of illumination was laterally shifted by +7.5 mm (the shifts in the direction of the illumination axis were defined as positive values), the coordinates for the centers of the mirrors were thus the following: 39, 30, 21, 12, 3, −6, −15, and −24 (mm).

The angles of the mirrors were finely tuned for tubes situated at different distances to the central axis of the scanner to provide a non-oblique view of the sample that levitated in these tubes. Because of the shape of the magnetic field, the samples, e.g., small particles, formed horizontal lines within the tubes. The spatial arrangements of the mirrors and lenses were adjusted such that the lines appeared as single dots on the acquired images.

A model (FIG. 11) was developed to estimate the angle at which the axis of the tube in the reflected image is perpendicular to the line defined by the centers of the mirror and the lens of the scanner, and this angle used to provide a non-oblique view of the samples in the tube. The center of the mirror was positioned at 4f above the flatbed of the scanner. f was the focal length of the relay lens, and H was the distance between the flatbed and the lens of the scanner. A relay lens (not shown), when placed at a distance of 2f below the tube, projected an image of the tube to the flatbed of the scanner at a distance of 2f with a 1:1 magnification. D was the distance of the mirror to the central axis.

The Lenses

Relay lenses were placed below the mirrors to project images of the tubes to the flatbed of the scanner. The lenses were shifted toward the central axis of the scanner such that the central portion of the tubes became visible to the scanner. The model illustrated in FIG. 12 was used to estimate the lateral shifts of the lenses with respect to the central axis, and these estimates used (for a total of eight lenses for a single column of tubes on the plate) as the initial set of values to optimize the lateral shifts of the lenses.

Assembly of the Device 3D-printed plastic parts were used to house the magnets and assemble the supporting components (e.g. mirrors and lenses). FIG. 13 depicts the major components used in the fully assembled device.

Preparation of Density Standards

Figure 14A:
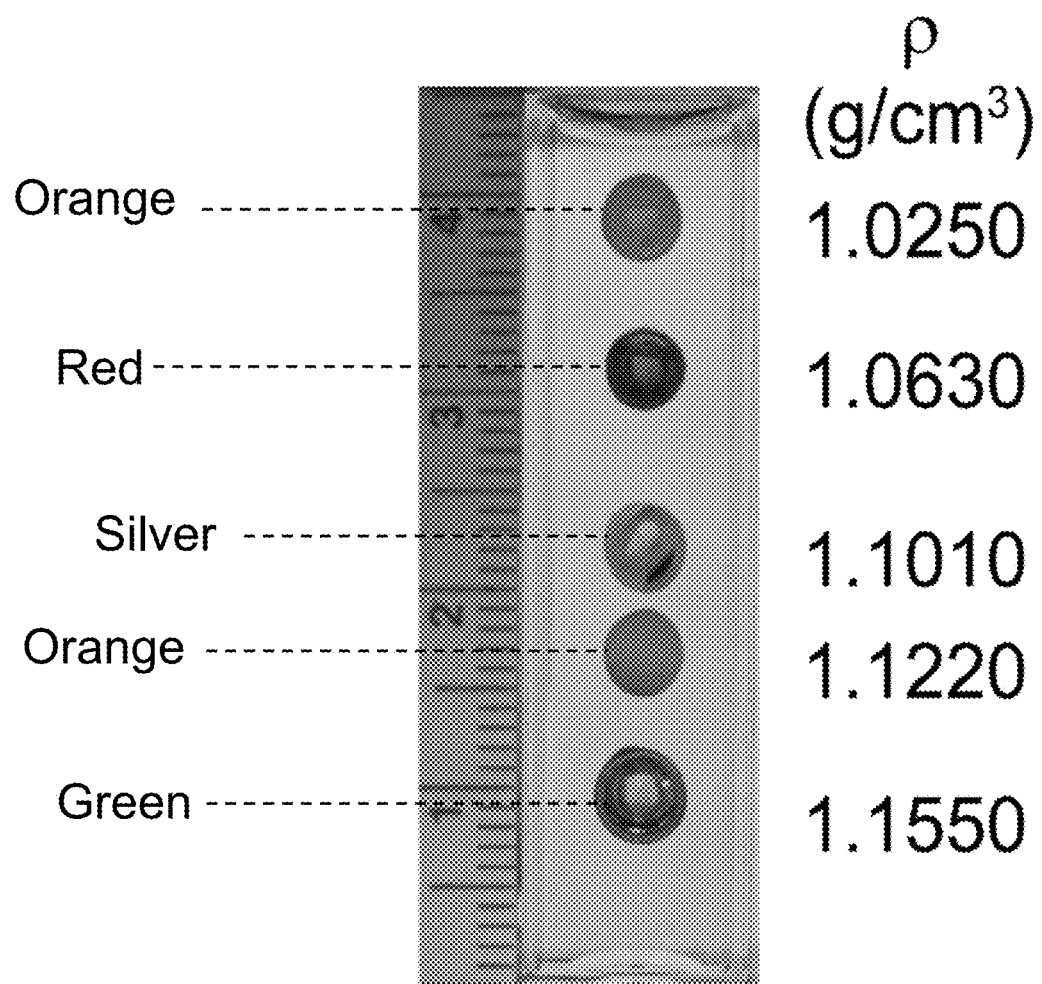
FIG. 14A shows a set of five glass beads having precisely known densities levitated in the magnetic levitation (MagLev) device of FIG. 2, according to one or more embodiments.

Commercially available and highly precise (±0.0002 g/cm$^3$) density standards (glass beads, American Density Materials, Inc.) were used to calibrate the magnetic levitation (MagLev) device of FIG. 2. These beads were ~4-5 mm in diameter (FIG. 14A), too large to be directly useful to calibrate the high-throughput analytic device describe in one or more embodiments. There were two simple methods useful to calibrate the device: (i) use of small particles having known densities and (ii) use of hydrophobic liquids having known densities (in the form of small droplets suspended in an aqueous solution, or emulsions). Method (i) was selected over method (ii), in some embodiments, because multiple density standards could be easily combined in a single solution—which allowed convenient preparation, use, and storage of these density standards for calibration purposes. FIG. 14A shows a set of five glass beads having precisely known densities (±0.0002 g/cm$^3$) levitated in an aqueous solution of 1.000 M MnCl$_2$ containing 1 wt % Tween-20 in the magnetic levitation (MagLev) device of FIG. 2. A ruler with a minimal division of 1 mm was used to measure the levitation heights, h (mm), of the beads. The calibration curve was h=−228ρ+273, $R^2$>0.99.

Figure 14B:
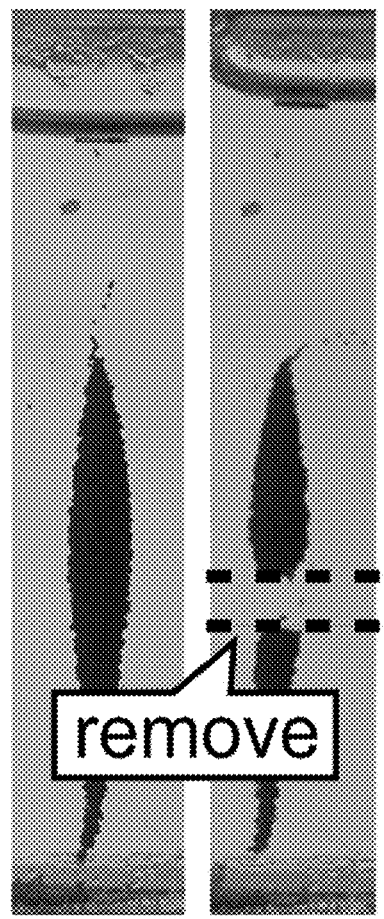
FIG. 14B shows small polyethylene beads levitated under the same conditions as described in FIG. 14A, in according to one or more embodiments.
Figure 14C:
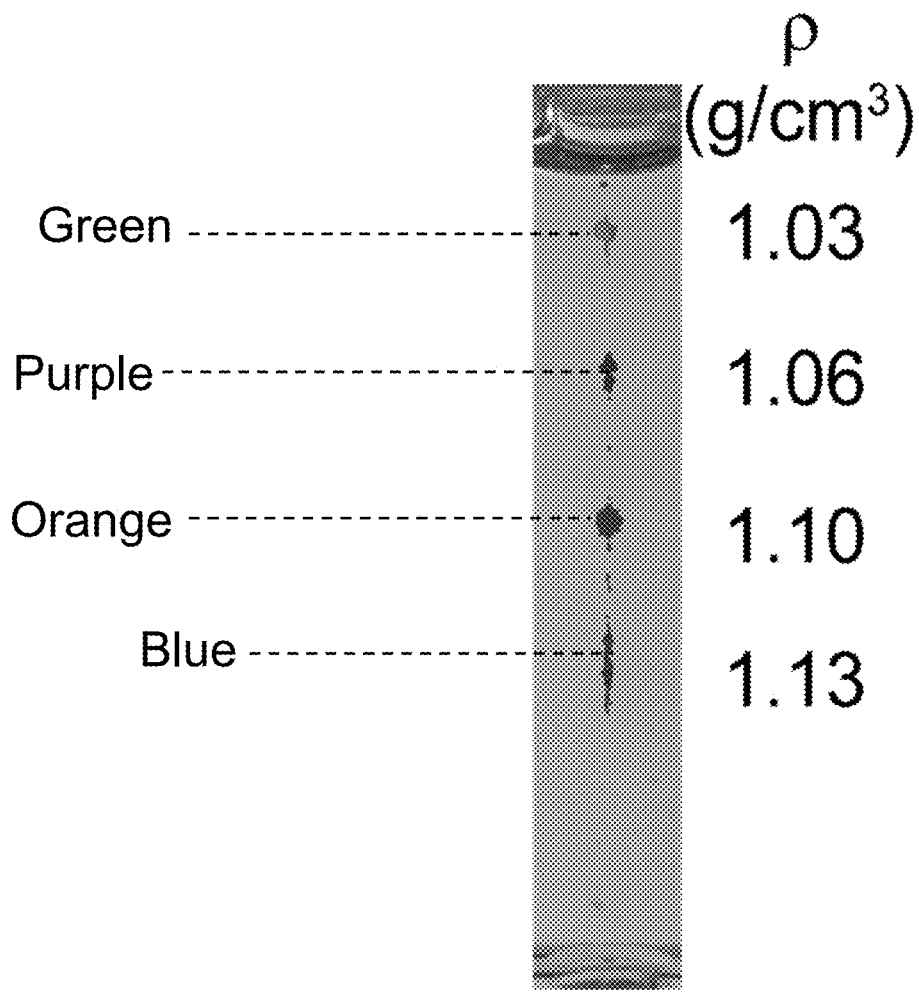
FIG. 14C shows determination of the average densities of particles using the centroids of the clusters and the calibration curves established in FIG. 14A, according to one or more embodiments.

Density standards of small (~200 μm in diameter), colored particles were commercially available (Cospheric, LLC), but these beads had a large distribution in density (e.g., Δρ~0.1 g/cm$^3$ for the particles in FIG. 14B), and thus, were sub-optimal to calibrate the high-throughput analytic device. Therefore, the magnetic levitation (MagLev) device of FIG. 2 was used to fractionate the beads and improve the quality of the density standards. The precision in density of these beads were improved (i.e., the distribution in density narrowed) by up to ~8×. In some embodiments, the precision of the density standards can be further improved, if needed, using AMPS. See Bloxham et al. (2015) *Anal. Chem.* 87:7485-7491. Each population of the prepared particles has a spread in density~±0.01 g/cm$^3$ around its average density (FIG. 14C).

Analysis of Images

Images of each well were processed with custom software to determine the positions of the levitated samples relative to the center of the viewing circle. Each well was calibrated based on the measured locations of density standards (~200 μm colored particles). The densities of samples not used during calibration were then measured and compared with literature values. The software identified and segmented samples based on either a distinguishing color or a change in contrast at the boundary of the samples.

The center of each viewing circle was identified by converting an image of the well to binary with a threshold value of 0.047 using the im2bw( ) function in MATLAB and computing the centroid of the largest connected region.

Figure 16:
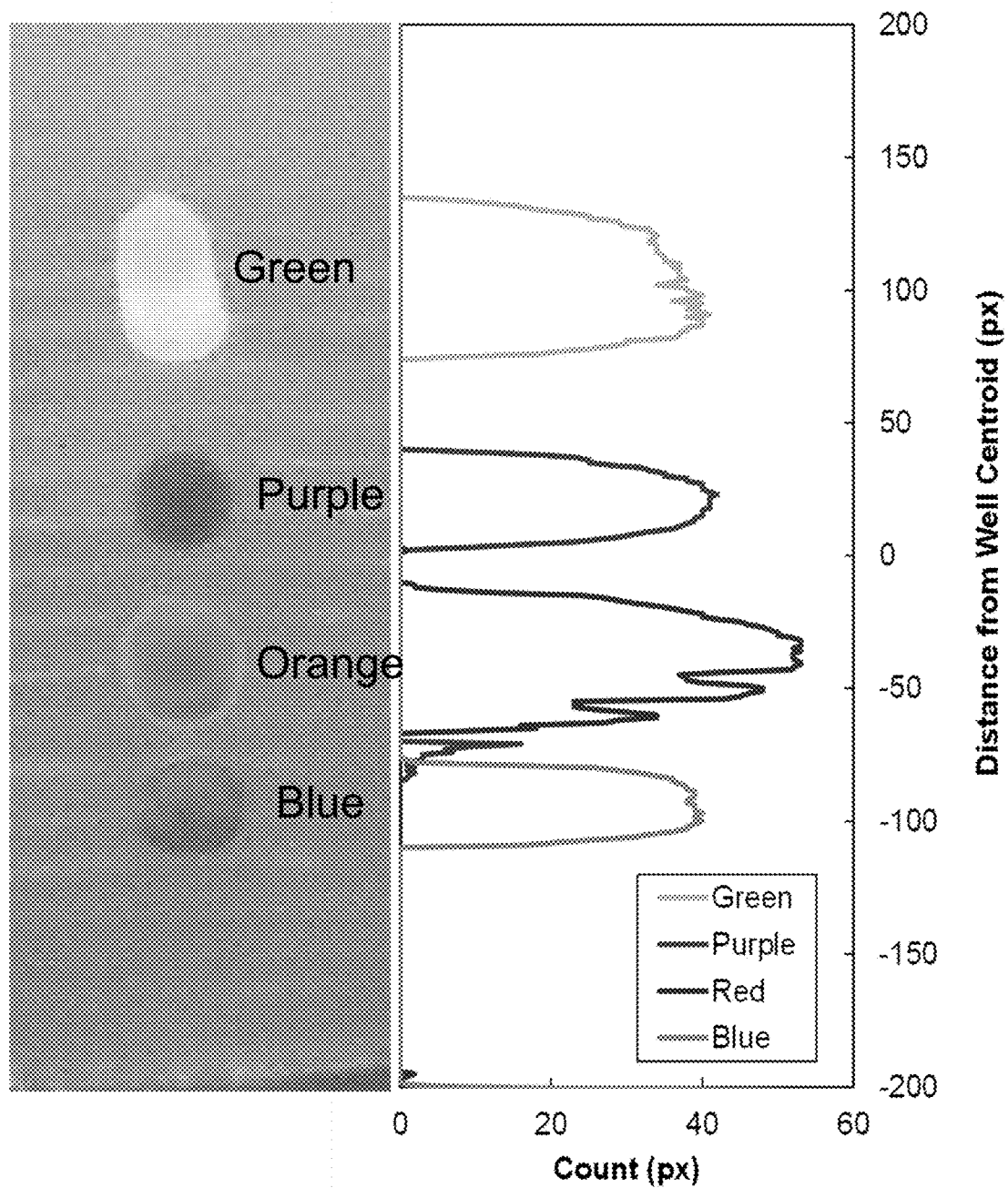
FIG. 16 shows image processing of colored particles in a well to determine their locations relative to the well centroid, according to one or more embodiments.

Samples with colors clearly distinguishable from the background were identified primarily based on their hue value. This was the case for all four of the density standards used for calibration (FIG. 16). Occasionally, the background showed a faint color similar to the particles, which was caused by both the fluorescence that these dyed particles emitted under the experimental conditions, and the natural color of the plastic housing used; the color, however, did not interfere with the determination of the positions of these particles. Cut-off hue values and other specifications are detailed in Table 2.

TABLE 2

Identifiers and constraints used to segment colored particles from images.

| Color | Identifier 1 | Constraint on 1 | Identifier 2 | Constraint on 2 |
|---|---|---|---|---|
| Green | Hue | 0.17 < H < 0.45 | Value | H > 0.97 |
| Purple | Hue | 0.80 < H < 0.98 | Value | H > 0.60 |
| Red | Hue | 0.01 < H < 0.07 | Value | H > 0.75 |
| Blue | Hue | 0.45 < H < 0.65 | Red Channel | R < 0.35 |

Several of the samples measured experimentally lacked a distinguishing color; the locations of these samples were not readily identifiable using the procedures as described above. Instead, edge detection was used to determine the location of these samples (FIG. 17A-17H).

Figure 21A:
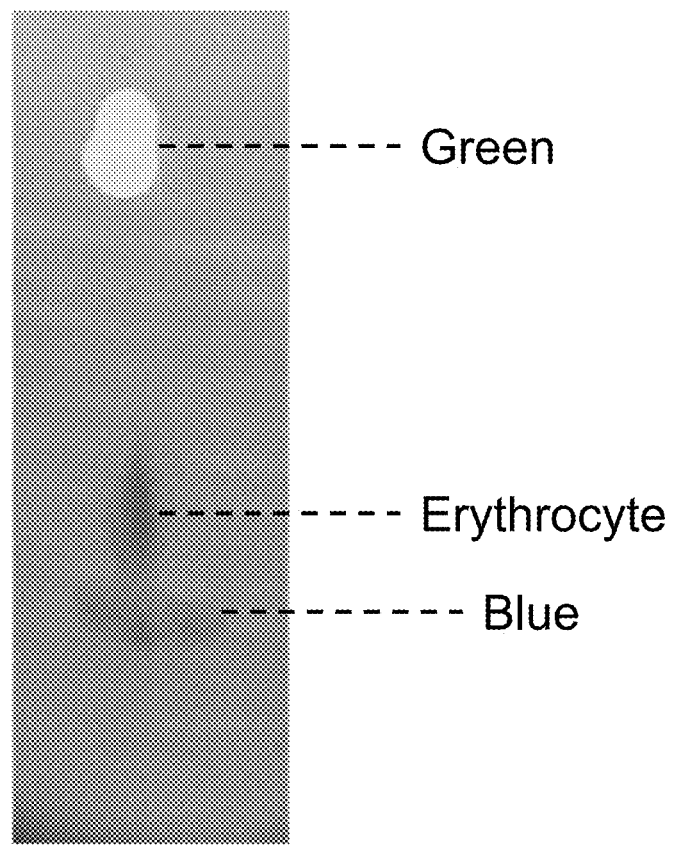
FIG. 21A shows a sample of erythrocytes and density standards levitated in a paramagnetic solution, according to one or more embodiments.

The spread in density of samples of red blood cells was analyzed by fitting a normal distribution to the density distribution of the cells (FIG. 21). The density distribution was measured experimentally by comparing with an in situ calibration performed by fitting the measured locations of density standards.

The preceding image processing and analysis operations were described on a per-well basis. To evaluate the entire 96-well plate, these operations were run in a loop over an image of the entire plate, where the image of the entire plate was spliced into 96 sections (8×12), each of which was analyzed serially.

Calibrations and Reproducibility Across the Array

Figure 15A:
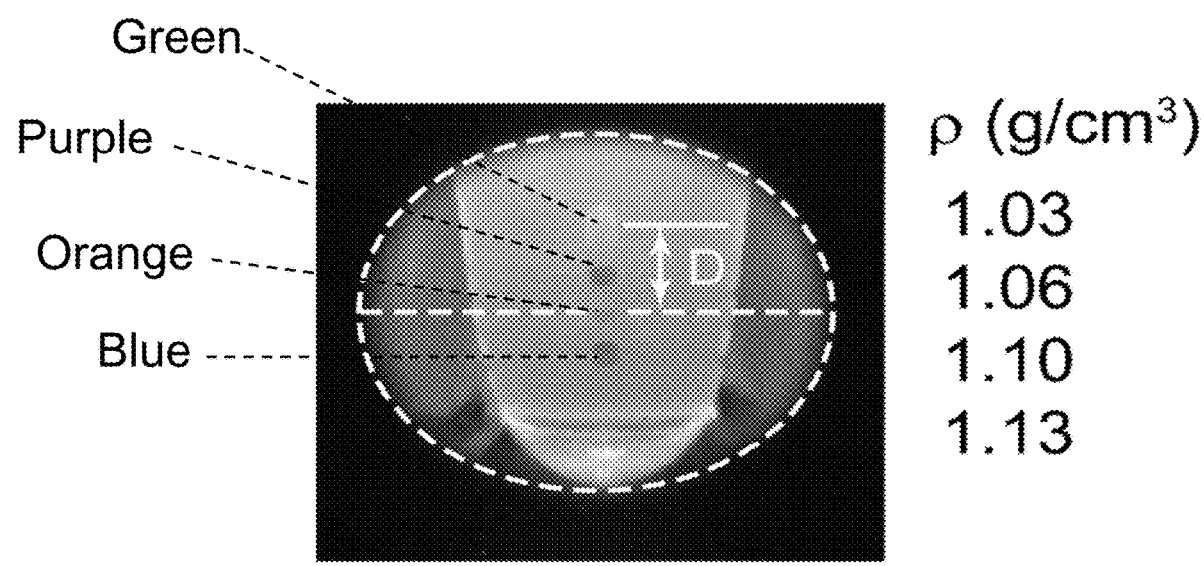
FIG. 15A shows density standards levitated at different distances to the center of the viewing circle, for device calibration according to one or more embodiments.
Figure 15B:
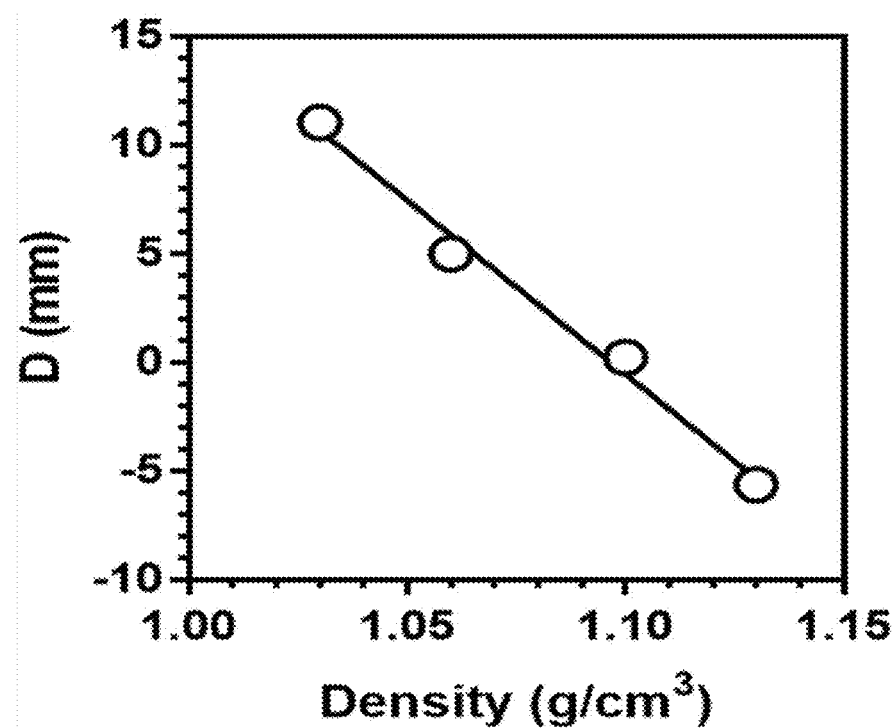
FIG. 15B shows a representative plot of D vs. the densities of the particle(s) in a single tube, according to one or more embodiments.
Figure 15C:
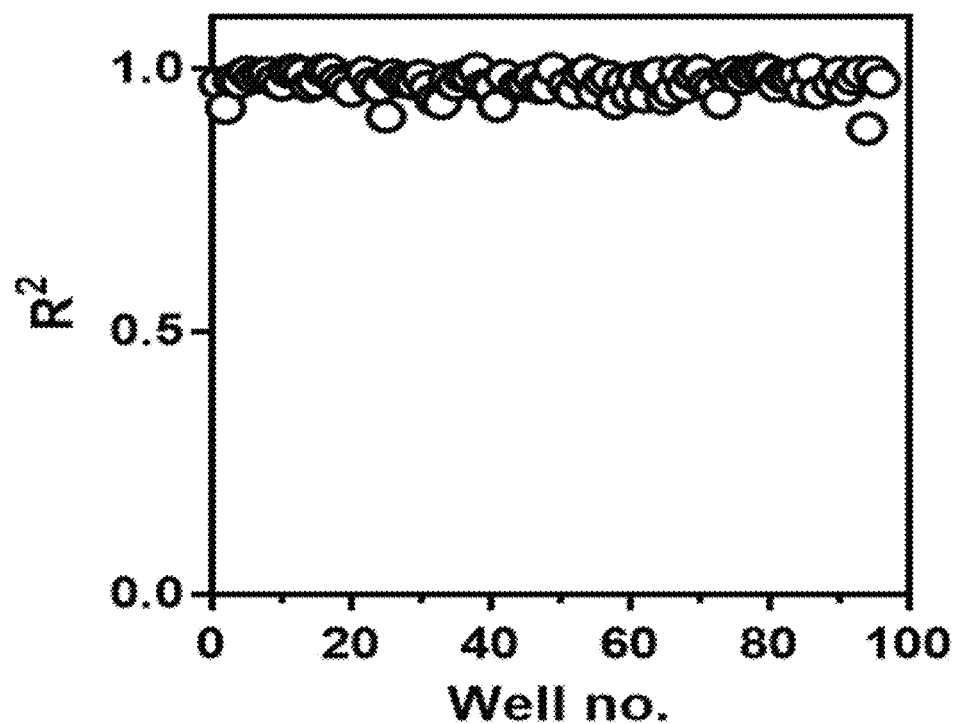
FIG. 15C shows the coefficient of determination $R^2$ across the plate, according to one or more embodiments.

Calibration of the analytic device used the particles prepared in 0.100 M MnCl$_2$ (with 1% Tween-20 to facilitate the dispersion of these hydrophobic particles) (FIG. 15A-15C) at room temperature (23±1° C.). The levitation heights, defined as the apparent distance, D, between the centroid of the standard particle(s) and the horizontal line running through the center of the view area, were measured. This distance, D, measured the separation between the centroid of the particles and the center of the viewing area on the image that formed at the flatbed, and thus, did not represent the physical distance in the tube (FIG. 5A-C). FIG. 15B shows a representative calibration curve for a tube on the plate, where D=−160(±12)ρ+176(±13), $R^2$=0.99. The values for the slope and the intercept were presented as best-fit values±standard deviation (SD) of the respective best-fit value. The linear fits of D vs. density for particles that levitated in individual tubes across the plate gave an average $R^2$ of 0.97 (N=91 wells, FIG. 15C). Five wells were excluded because they either missed one or more colored beads or produced low-quality images. In another set of experiments, an additional calibration was performed using small drops of anisole (p 0.993 g/cm³, stabilized by 1% Tween-20 in the suspending medium), and the combined results yielded an average $R^2$ of 0.98 across the plate. Together, these results validated the assumption of approximately linear magnetic fields in the magnet array.

Estimation of the Uncertainty of Measurements for Samples in Single Tubes Using Calibration Curves A set of four colored particles was used to calibrate the density measurements in individual wells, and to estimate the uncertainty in the estimated values of densities of samples using the calibration curves. Single tubes were treated as independent measurements.

In some embodiments, equation 3 gives the equation for the best-fit for the plot of density vs. the distance, D, of the colored particles to the center of the viewing area. Four pairs of data ($D_i$, $\rho_i$) (i=1-4) were used to establish the calibration curve for each tube. In this embodiment, D (unitless) simply represents the number of pixels on the image, and was negative when the centroid of the particles were below the center of the viewing area on the image. The number of pixels was not converted to physical distances for this example. ρ (kg/m³) was the average density of the particles.

$$D = m\rho + b \quad (3)$$

For a sample with unknown density (e.g., a cluster of particles), D was first determined and then inserted into equation 3 to calculate its density.

In some embodiments, equation 4 gives the uncertainty, δρ, in the estimate of density using the calibration curve, equation 3. In equation 4, $S_D$ was the standard deviation of the vertical distances on the calibration curve between the D-coordinates of the colored particles and the best-fit curve, |m| was the absolute value of the slope, k was the number of replicate measurements of the unknown sample, n was the number of data points to establish the calibration curve, $\overline{D}$ was the average of the D for the colored particles, $\overline{\rho}$ was the average of the densities for the colored particles, and D was the distance between the centroid of the sample to the center of the viewing circle.

$$\delta\rho = \frac{S_D}{|m|}\sqrt{\frac{1}{k} + \frac{1}{n} + \frac{(D-\overline{D})^2}{m^2 \sum(\rho_i - \overline{\rho})^2}} \quad (4)$$

Figure 18A:
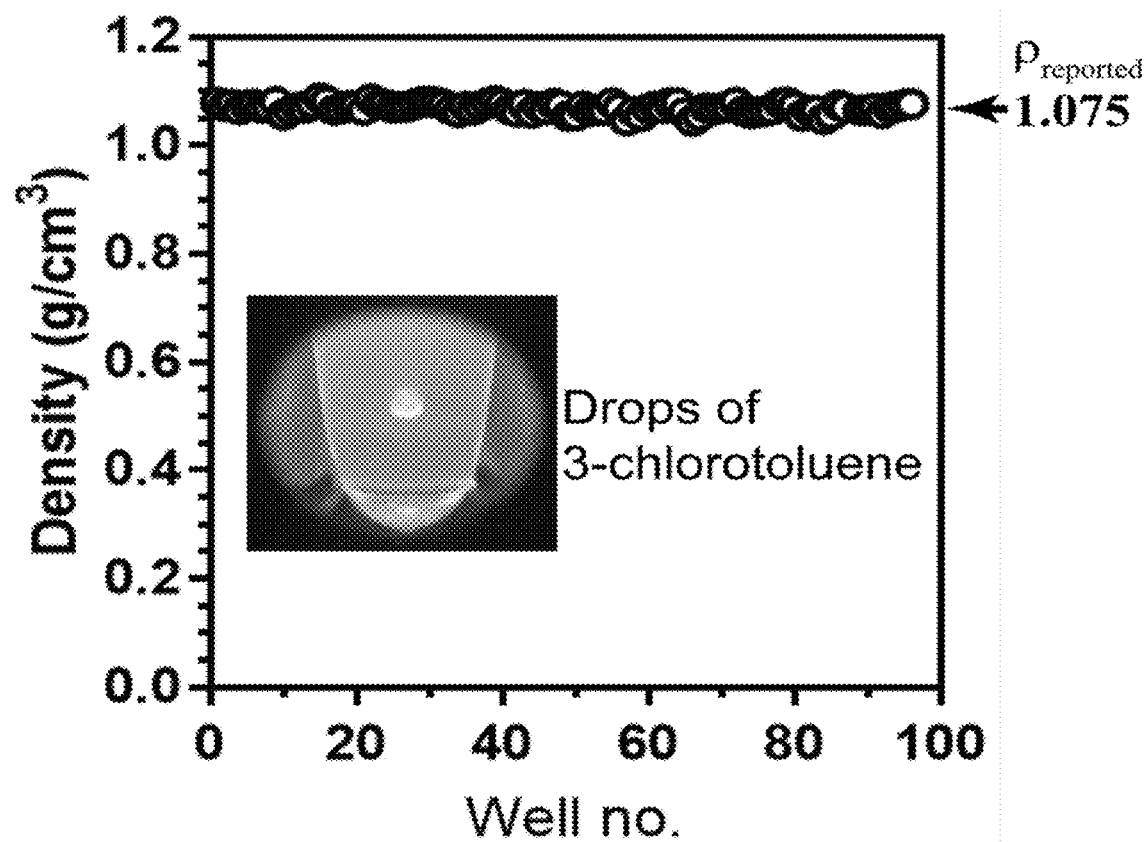
FIG. 18A shows levitation of small, surfactant-stabilized droplets of 3-chlorotoluene in a paramagnetic solution, according to one or more embodiments.

Equations 3 and 4 were applied to estimate the density, and its associated uncertainty, of a sample of 3-chlorotoluene (a single measurement, k=1) in the tube shown in FIG. 18A, and obtained 1.068±0.006 g/cm³.

Experimental Determination of the Magnetic Susceptibility of a Paramagnetic Medium The magnetic susceptibility of an aqueous solution of nominal 3 M $DyCl_3$ was experimentally determined. The concentrated solution was first diluted by 6× to yield an aqueous solution of nominal 0.5 M $DyCl_3$, and then used to levitate a set of glass beads (1.0200, 1.0630, 1.1100, and 1.1550 g/cm³) with precisely known densities (±0.0002 g/cm³) using the magnetic levitation (MagLev) device of FIG. 2. A ruler with a minimal division of 1 mm (read to ±0.1 mm) was used to measure the levitation heights of the beads. The density vs. h was plotted, and a linear fit performed, which yielded equation 5:

$$\rho = -6663(\pm 187)h + 1267(\pm 5) \quad (5)$$

In equation 5, ρ (kg/m³) was the density of a sample that levitated at a distance of h (m) to the surface of the bottom magnet. The slope was presented as best-fit value±standard deviation of the best-fit value.

Equations 6-8 gave the formulas for ρ vs. h using the magnetic levitation (MagLev) device of FIG. 2.

$$\rho = \alpha h + \beta \quad (6)$$

$$\alpha = \frac{(\chi_s - \chi_m)4B_0^2}{g\mu_o d^2} \quad (7)$$

$$\beta = \rho_m - \frac{(\chi_s - \chi_m)2B_0^2}{g\mu_o d^2} \quad (8)$$

In equations 7 and 8, $\chi_s$ (unitless) was the magnetic susceptibility of the sample, $\chi_m$ (unitless) was the magnetic susceptibility of the paramagnetic medium, $B_0$ (T) was the maximum strength of the linear magnetic field along central axis in the gap between the two facing magnets, g (9.8 m/s²) was the constant of gravitational acceleration, $\mu_o$ (4π×10⁻⁷ N·A⁻²) was the magnetic permeability of the free space, d (m) was the distance of separation of the two magnets, and $\rho_m$ (kg/m³) was the density of the paramagnetic medium.

Equations 5 and 7 were used to calculate the magnetic susceptibility of the solution, $\chi_m$, and the part that contributed by the $DyCl_3$, $\chi'_{D_yCl_3}$. Equations 9 and 10 gave the rearranged equations for the calculation.

$$\chi_m = \chi_s - \frac{\alpha g \mu_o d^2}{4B_0^2} \quad (9)$$

$$\chi'_{D_yCl_3} = \chi_m - \chi_{H_2O} \quad (10)$$

To calculate the $\chi'_{D_yCl_3}$, experimentally measured values for $B_0$ (0.385 T), and d (45.0 mm) were used. The magnetic susceptibility of the glass bead, $\chi_s$, was estimated using a model in which the glass beads ($\rho_{bead}$=1.1100 g/cm³ for this calculation) consisted of glass ($\rho_{glass}$≈2.4 g/cm³, $\chi_{glass}$=−1.39×10⁻⁵), and an air pocket (assumed zero density or magnetic susceptibility).

$$\chi_{bead} = \chi_{glass}\left(\frac{V_{glass}}{V_{bead}}\right) = \chi_{glass}\left(\frac{\rho_{glass}}{\rho_{bead}}\right) = -3.0 \times 10^{-5} \quad (11)$$

In equation 10, $\chi_{H_2O}$ was the magnetic susceptibility of water ($-9.0\times10^{-6}$).

The major uncertainty in estimating the $\chi_{D_yCl_3}$ was assumed to stem from the uncertainty of the linear fit, and the magnetic susceptibility of the diluted $DyCl_3$ solution, $\chi'_{D_yCl_3}$ was estimated as:

$$\chi'_{D_yCl_3}=(2.60\pm0.08)\times10^{-4} \quad (12)$$

Therefore, the magnetic susceptibility of the original solution of nominal 3 M $DyCl_3$ was:

$$\chi_{D_yCl_3}=(2.60\pm0.08)\times10^{-4}\times6-9.0\times10^{-6}=(1.56\pm0.05)\times10^{-3} \quad (13)$$

Calculation of the Density of a Cluster of Particles

The magnitude of the $B_z(dB_z/dz)$ at distance, D, (with respect to the center of the viewing circle, FIG. 14A) was first estimated using the calibration curves established by the small, colored particles. Equation 14 gave the equation of the linear fit for the colored particles in a tube.

$$D=m\rho+b \quad (14)$$

Equation 15 is the same as equation 2. In some embodiments, this equation allowed estimation of the value of $B_z(dB_z/dz)$ at the position a sample levitates (e.g., density particles having a known density and a magnetic susceptibility) in a paramagnetic medium with a known density and a magnetic susceptibility.

$$\rho = \frac{(\chi_s - \chi_m)}{\mu_o g}\left(B_z\frac{dB_z}{dz}\right) + \rho_m \quad (15)$$

In some embodiments, equations 14 and 15 were combined to give equations 16-19 that, in some embodiments, can be used to estimate the value of $B_z(dB_z/dz)$ at any distance, D, in the linear range characterized using the colored particles.

$$B_z\frac{\partial B_z}{\partial z} = \frac{\mu_o g}{m(\chi_s - \chi_m)}D - \frac{\mu_o g(b/m + \rho_m)}{(\chi_s - \chi_m)} \quad (16)$$

$$K_1 = \frac{\mu_o g}{m(\chi_s - \chi_m)} \quad (17)$$

$$K_2 = \frac{\mu_o g(b/m + \rho_m)}{(\chi_s - \chi_m)} \quad (18)$$

$$B_z\frac{\partial B_z}{\partial z} = K_1 D - K_2 \quad (19)$$

Values of $K_1$ and $K_2$ were calculated for each tube using the calibration curve that was constructed using the set of four colored particles (1.03, 1.06, 1.10, and 1.13 g/cm$^3$). In this experiment, an aqueous solution of 0.100 M $MnCl_2$ (prepared from a stock solution, 3.000±0.001 M) was used to levitate the particles, and its density and magnetic susceptibility calculated using the formula as described previously:

$$\rho_m = 1008.1 \text{ kg/m}^3$$

$$\chi_m = 9.58\times10^{-6}$$

The small density particles used were based on polyethylene, and they had a magnetic susceptibility $\chi_s$ of $-9.50\times10^{-6}$.

$K_1$ and $K_2$ were estimated for each individual tube, then individual values of $K_1$ or $K_2$ combined across the plate to obtain the average $K_1=0.28\pm0.03$ (mean±SD, T$^2$/m) and average $K_2=31\pm14$ (mean±SD, T$^2$/m).

The centroid of a cluster of the copper or glass particles that levitated in an aqueous solution of 3 M $DyCl_3$ was calculated using equation 19 (and its associated pair of $K_1$ and $K_2$) to estimate the value of $B_z(dB_z/dz)$ at that distance, D.

The estimated values of $B_z(dB_z/dz)$, the experimentally measured density of the $DyCl_3$ solution (1.6927 g/cm$^3$), and the estimated magnetic susceptibility of the $DyCl_3$ solution (1.56×10$^{-3}$, equation 13), were used to calculate the density of the cluster of the copper or glass particles. In this calculation, the magnetic susceptibility of the sample (i.e., the copper and glass particles) was neglected because it is negligible compared to the magnetic susceptibility (1.56×10$^{-3}$) of the $DyCl_3$ solution used to levitate the samples.

Averages of the estimated densities across the plate for the sample of copper powder (7.7±0.6 g/cm$^3$, N=95 wells) and for the sample of glass particles (2.4±0.4 g/cm$^3$, N=95 wells) were obtained.

Density Measurements of Simple Liquids and Irregularly Shaped Solids

Figure 18B:
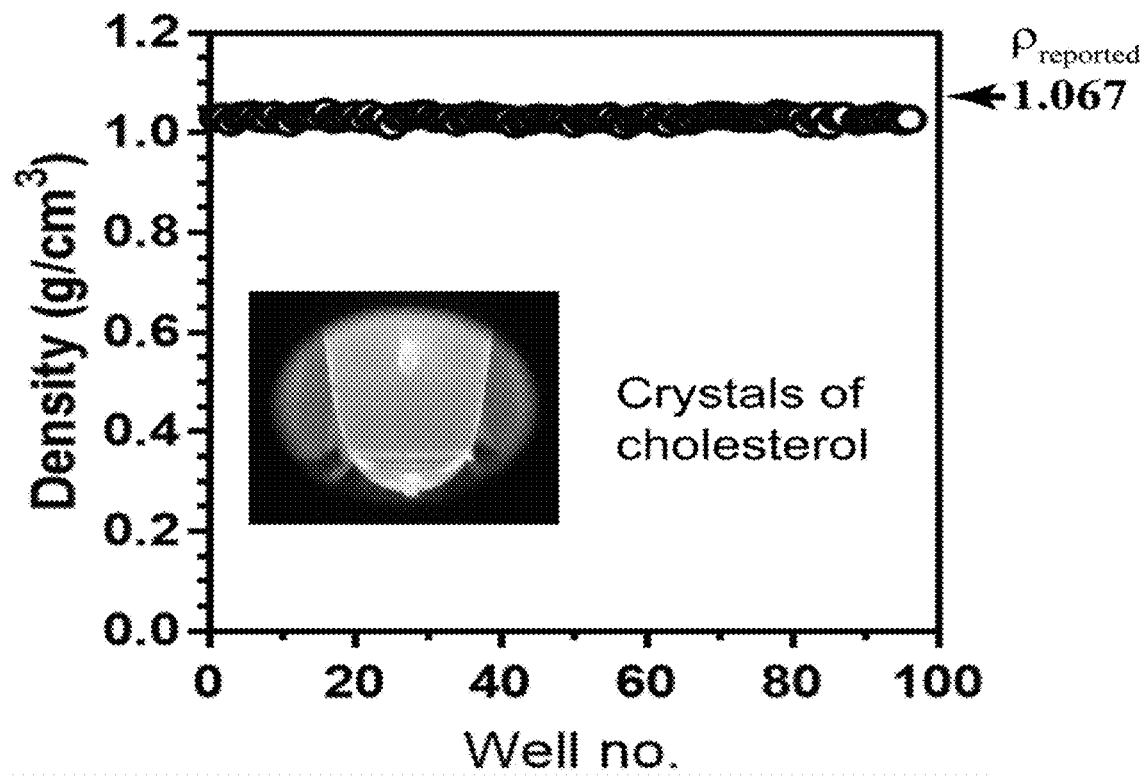
FIG. 18B shows similar density measurements as FIG. 18A for small crystals of cholesterol, according to one or more embodiments.

In some embodiments, cholesterol and 3-chlorotoluene served as examples to illustrate the use of the analytic device to measure the densities of simple liquids and irregularly-shaped solids (FIG. 18A-18B). The sample was prepared by vigorously shaking 0.5 mL of 3-chlorotoluene in 20 mL of $MnCl_2$ solution containing 1 wt % Tween-20, and adding the sample as an emulsion to the wells using a 12-channel pipettor. Including 1% surfactant Tween-20 in the suspending medium (0.100 M $MnCl_2$) facilitated the dispersion of the hydrophobic compounds (particles or liquid drops) in the aqueous suspending medium. At equilibrium, the small drops of 3-chlorotoluene appeared as white clusters in the tubes. The centroids of the clusters were determined, and the densities estimated independently for each tube using the calibration curve established for that tube (e.g., the equation described in the caption of FIG. 15B). A representative value of density was estimated to be 1.068±0.006 g/cm$^3$ (mean±estimated SD, N=1 well). Taking advantage of the parallel measurements, all the individual measurements were combined to yield an estimated density of 3-chlorotoluene, 1.069±0.008 g/cm$^3$ (mean±SD, N=95 wells). This estimate agreed ($\Delta\rho$ is 0.006 g/cm$^3$) with the reported value, 1.075 g/cm$^3$. Similar calculations for the sample of cholesterol (FIG. 18B) yielded an estimated density of 1.030±0.005 g/cm$^3$ (mean±SD, N=95 wells); this estimate agreed reasonably well ($\Delta\rho$ is 0.037 g/cm$^3$, or ~4%) with the reported value, 1.067 g/cm$^3$. In these embodiments, the low value may reflect small air bubbles trapped in the irregularly shaped particles.

Figure 17A:
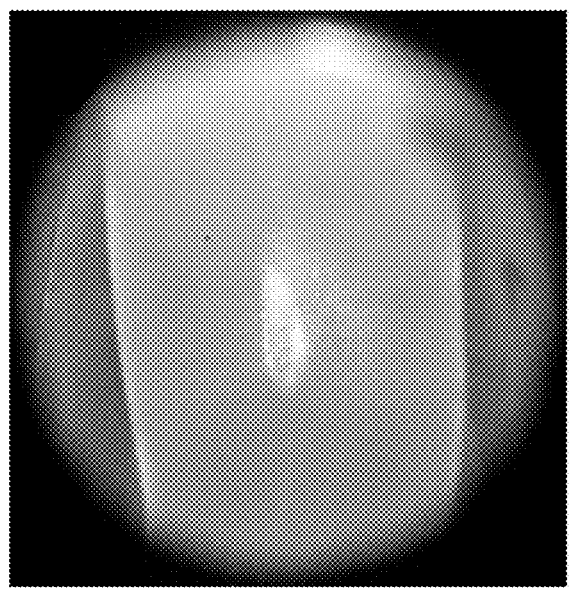
FIG. 17A shows an image of cholesterol suspended in a well using magnetic levitation (MagLev), according to one or more embodiments.
Figure 17B:
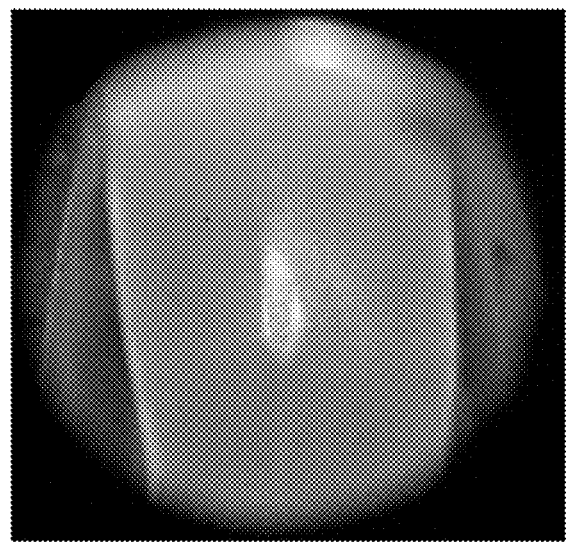
FIG. 17B shows processing of the image of FIG. 17A by extracting the value channel of the hue saturation value representation, according to one or more embodiments.
Figure 17C:
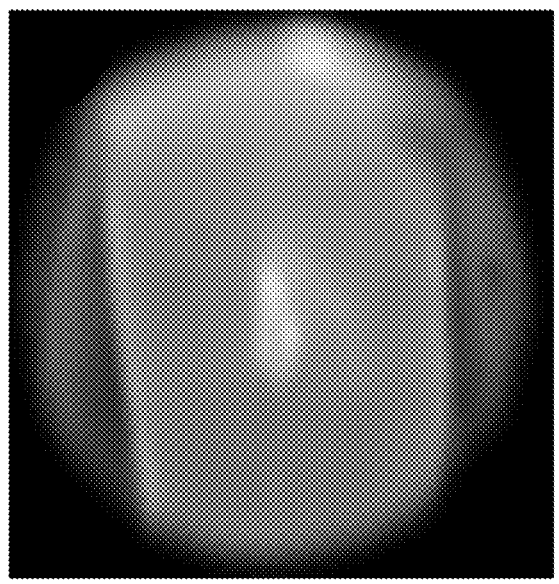
FIG. 17C shows processing of the image of FIG. 17B by blurring with a Gaussian filter, according to one or more embodiments.
Figure 17D:
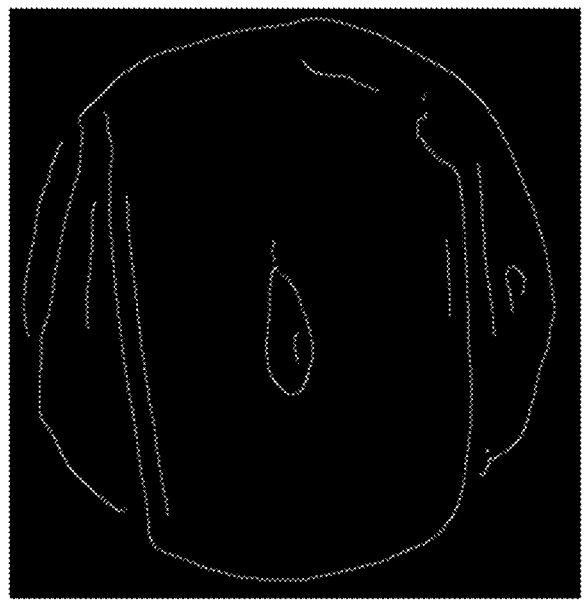
FIG. 17D shows processing of the image of FIG. 17C by detecting the edges with a Canny edge detection algorithm, according to one or more embodiments.
Figure 17E:
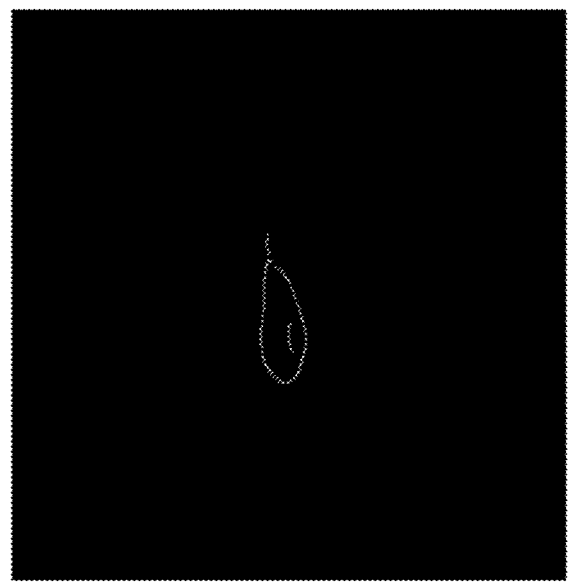
FIG. 17E shows processing of the image of FIG. 17D by cropping regions outside the well, according to one or more embodiments.
Figure 17F:
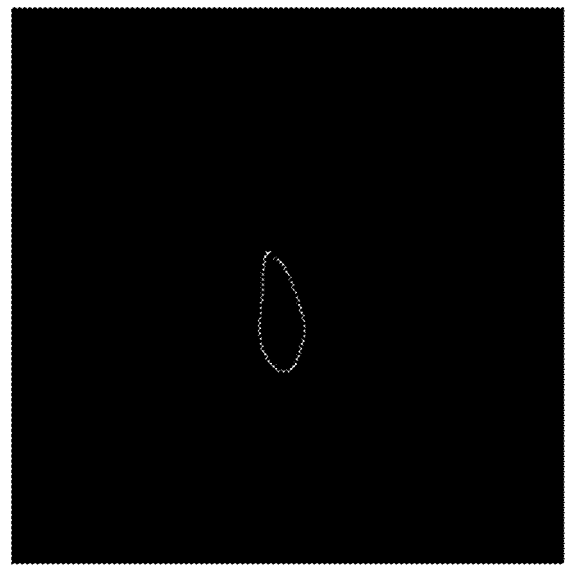
FIG. 17F shows processing of the image of FIG. 17E by removing artefactual edges that fall under a threshold length, according to one or more embodiments.
Figure 17G:
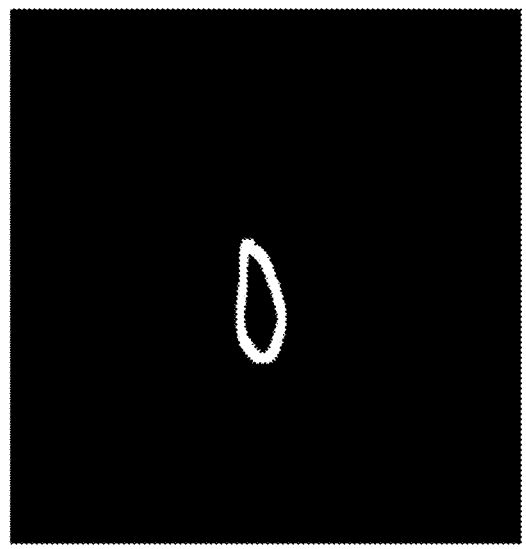
FIG. 17G shows processing of the image of FIG. 17F by dilating the remaining edges, according to one or more embodiments.
Figure 17H:
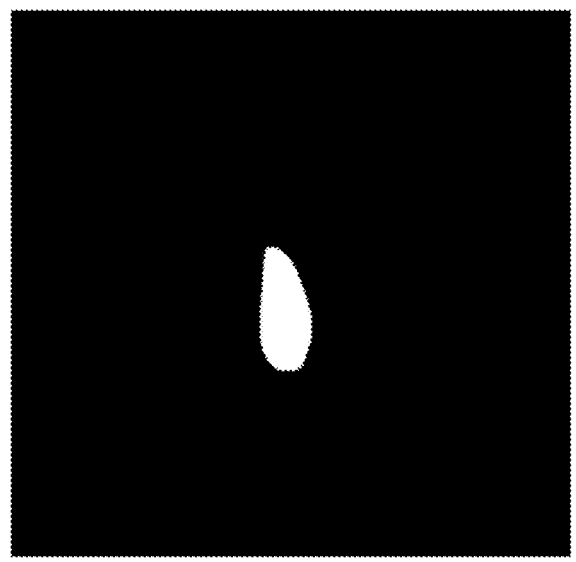
FIG. 17H shows processing of the image of FIG. 17G by filling the region of interest within the edges as a convex hull of the edge pixels, according to one or more embodiments.

FIGS. 17A-17H show processing of an image of cholesterol suspended in a well using an edge detection algorithm. Starting from the original image (FIG. 17A), the value channel of the hue-saturation-value representation was extracted (FIG. 17B) and blurred with a Gaussian filter (FIG. 17C). Edges were detected with the Canny edge detection algorithm (FIG. 17D), and regions outside of the well were cropped (FIG. 17E). Finally, artefactual edges under a threshold length were removed (FIG. 17F), the remaining edges were dilated (FIG. 17G), and the region of interest within the edges was filled as a convex hull of the edge pixels (FIG. 17H).

Separation and Density Measurements of Mixtures of Particles and Powders

Figure 19A:
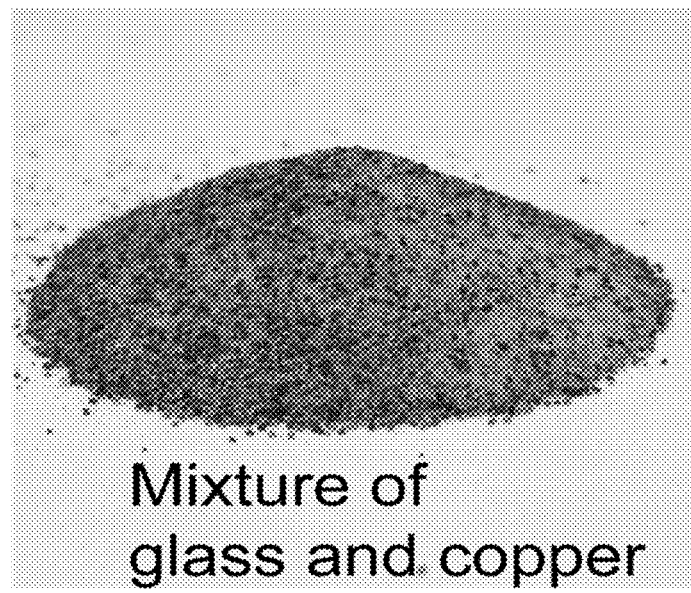
FIG. 19A shows a mixture of fine glass particles and copper powders, according to one or more embodiments.
Figure 19B:
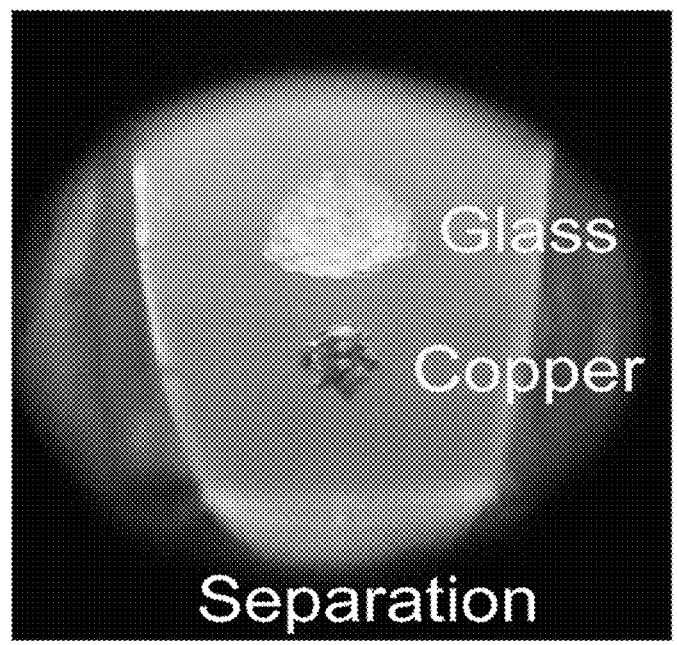
FIG. 19B shows separation of the mixture of FIG. 19A into two subpopulations in an aqueous solution of $DyCl_3$, according to one or more embodiments.
Figure 19C:
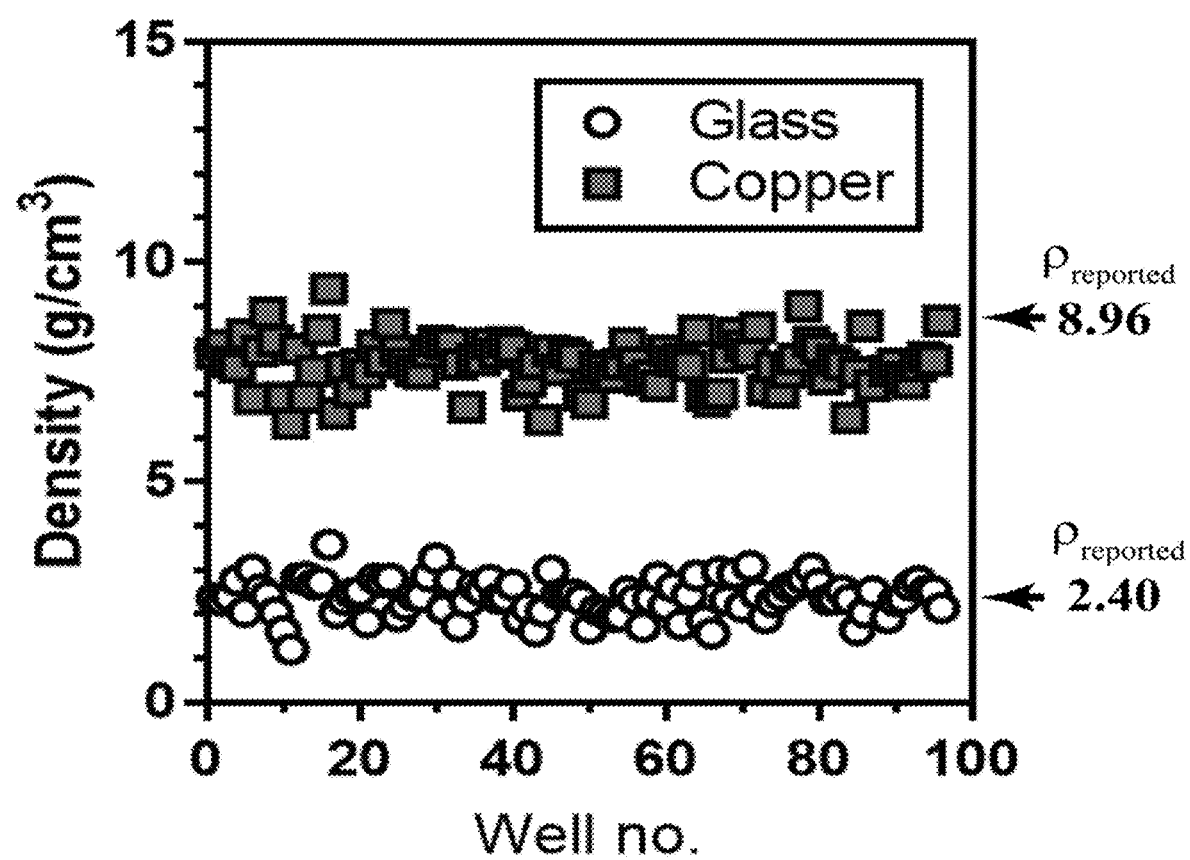
FIG. 19C shows estimation of the densities of the two subpopulations of FIG. 19B, according to one or more embodiments.

A mixture of spherical glass particles (150-212 µm) and irregularly-shaped copper powders (~420 µm) was prepared to demonstrate the use of the analytic device to perform separation and then measure the densities of its constituents of the mixture (FIG. 19). Because glass and copper are more dense than typical organic materials, an aqueous solution of 3 M $DyCl_3$ was used to levitate these samples.

In some embodiments, $DyCl_3$ is a suitable paramagnetic salt for this application because it (i) had a higher magnetic susceptibility than those of more commonly used paramagnetic species (e.g., $MnCl_2$ and $GdCl_3$), (ii) had a high solubility in water (~3.5 M), (iii) was highly transparent (it had a faint yellow color even at high concentrations), (iv) had a low toxicity, and (v) was commercially available at an affordable price (e.g., 100 g for ~$46). The mixture was suspended in a $DyCl_3$ solution with 1 wt % Tween-20, and yielded, in the analytic device, two clearly separated clusters of particles with easily distinguishing colors (FIG. 19B). The densities of the two clusters were calculated using equation 2, instead of establishing and using a calibration curve (because there were no easily accessible density standards for this range of density). Equation 2 was used to calculate the profile of $B_z(dB_z/dz)$ along the z-axis over the linear range (e.g., using the calibration curve in FIG. 15 for that tube), and then the density (1.6927 $g/cm^3$ using a densitometer) of the suspending medium (3 M $DyCl_3$), and also its magnetic susceptibility ($1.56 \times 10^{-3}$), experimentally measured. The densities of the copper clusters in individual tubes were estimated, and then an average density of 7.7±0.6 $g/cm^3$ (N=95 wells) obtained. The estimated average agreed qualitatively ($\Delta\rho$ is 1.3 $g/cm^3$ or ~14%) with the reported value, 8.96 $g/cm^3$. In these embodiments, this discrepancy may arise from sample preparations (e.g., incomplete removal of trapped air bubbles). Similar calculations were performed for the clusters of the glass beads, and an average density of 2.5±0.5 $g/cm^3$ (N=95 wells) obtained, which agreed with the value, 2.40±0.04 $g/cm^3$, for the same type of glass beads measured in a separate study using tilted magnetic levitation (MagLev). See Nemiroski et al. (2016) *J. Am. Chem. Soc.* 138:1252-1257.

Density Measurements of Erythrocytes

Figure 20:
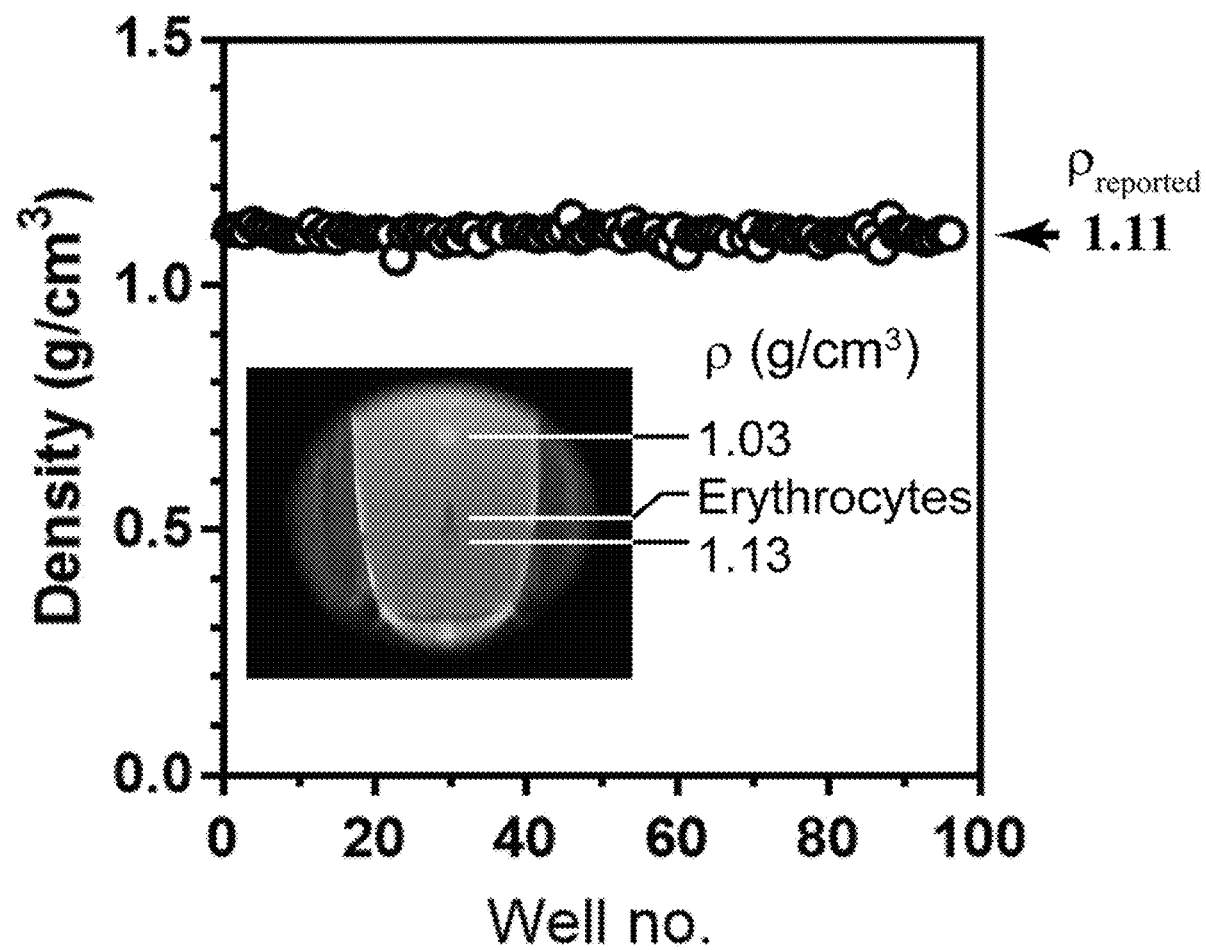
FIG. 20 shows density measurements of erythrocytes, according to one or more embodiments.
Figure 21B:
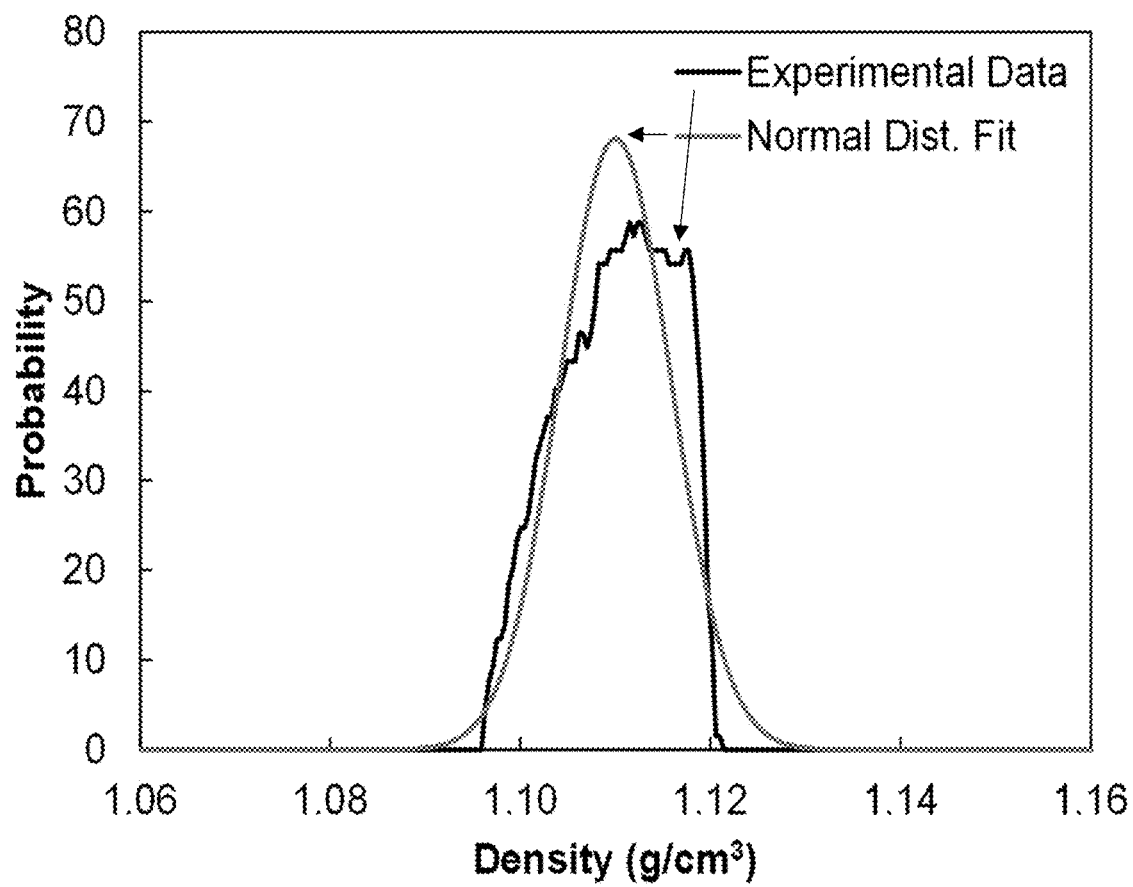
FIG. 21B shows the spread in density for the erythrocyte sample of FIG. 21A, according to one or more embodiments.

Erythrocytes served as an example to demonstrate the use of the device to levitate and measure densities of biological particles (FIG. 20). In this demonstration, the biocompatible paramagnetic chelate, gadobutrol, was used to levitate erythrocytes. Diluted whole blood (2000× dilution) was levitated in phosphate-buffered saline containing 60.0 mM gadobutrol. Density standards (the same particles described in FIG. 6) were included in the same suspending medium to calibrate the system, and thus to calculate the density of the erythrocyte cluster that located between the two standard particles. No surfactant Tween-20 was used in this experiment (beads were washed with PBS); enough beads were used so that the majority of the wells had both types of particles that levitated in the medium. These hydrophobic beads tended to trap at the liquid-air interface in the absence of a surfactant. The spread in density was determined by first calibrating the density in situ using the density standards (FIG. 21A, the green and blue particles), then, a normal distribution was fit to the density distribution of the erythrocytes (FIG. 21B). The density of the erythrocytes was estimated to be 1.10±0.03 $g/cm^3$ (N=93 wells), which agreed with the values (~1.11 $g/cm^3$) reported in the literature.

Determination of the Arrhenius Activation Energy of a Reaction on a Solid Support The analytic device was used to monitor the progress of a coupling reaction of 2,5-diiodobenzoic acid with leucine-functionalized Wang resin (porous polymer beads, 74-149 μm in diameter). In some embodiments, Magnetic levitation (MagLev), demonstrated previously using the single-sample configuration (see Mirica et al. (2008) *J. Am. Chem. Soc.* 130:17678-17680), is a particularly suitable tool with which to conveniently monitor certain types of chemical reactions on solid supports. The coupling reactions were carried out in a small volume (5 mL) under controlled temperatures (23.6° C., 7.6° C., −0.4° C., and −13.0° C.). Small aliquots (0.5 mL) were sampled periodically during the reaction. The reaction was carried out in dimethylformamide (DMF) in the presence of O-(benzotriazol-1-yl)-N,N,N',N'-tetramethyluronium hexafluorophosphate (HBTU) and N,N-diethylisopropylamine (DIEA).

Figure 22A:
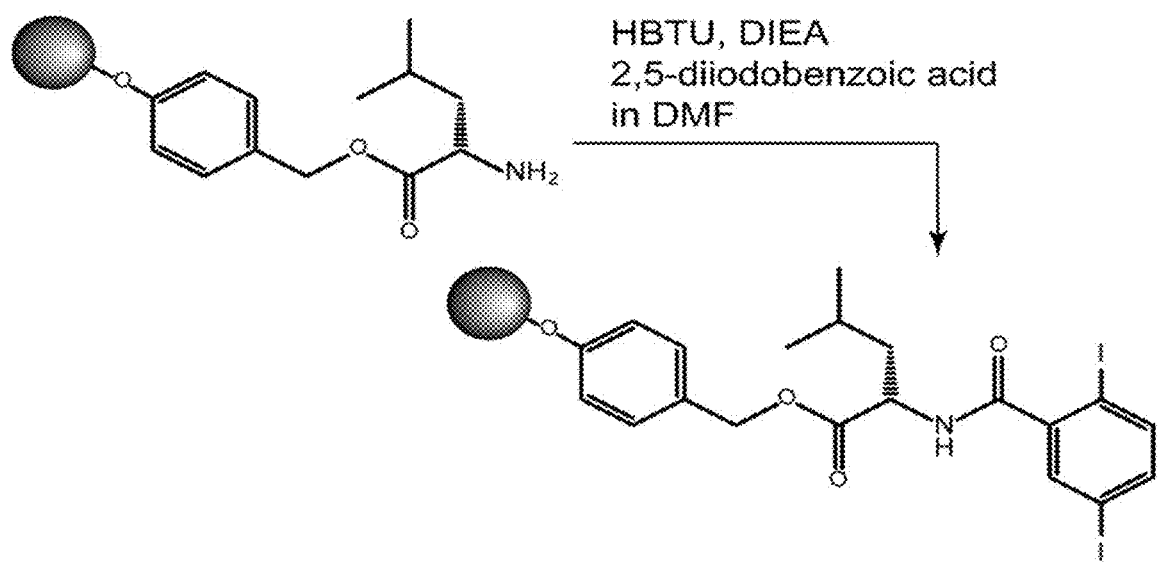
FIG. 22A shows the scheme of the coupling reaction between 2,5-diiodobenzoic acid with leucine-functionalized Wang resin, according to one or more embodiments.
Figure 22B:
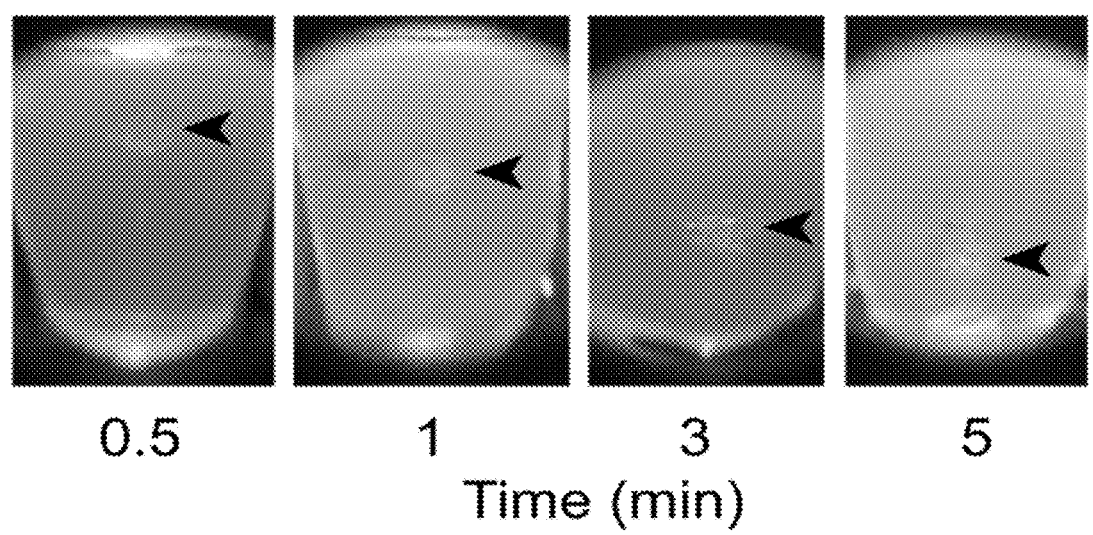
FIG. 22B shows monitoring the progress of the coupling reaction of FIG. 22A using the analytic device according to one or more embodiments.
Figure 22C:
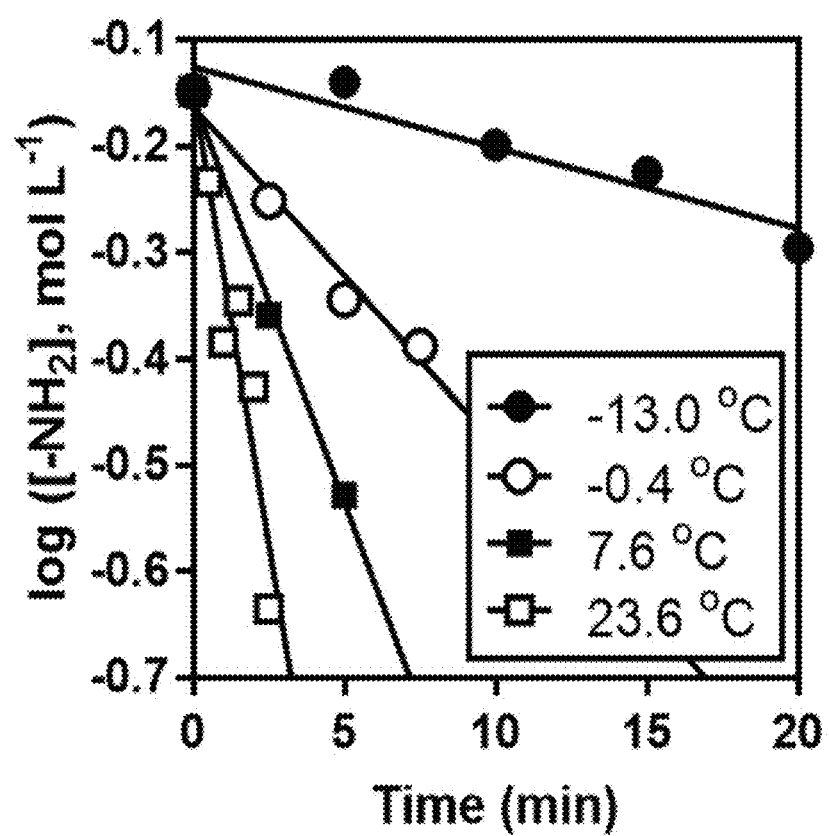
FIG. 22C shows the unreacted amine present on the resin decreased at different rates over time for reactions carried out at different temperatures, according to one or more embodiments.
Figure 22D:
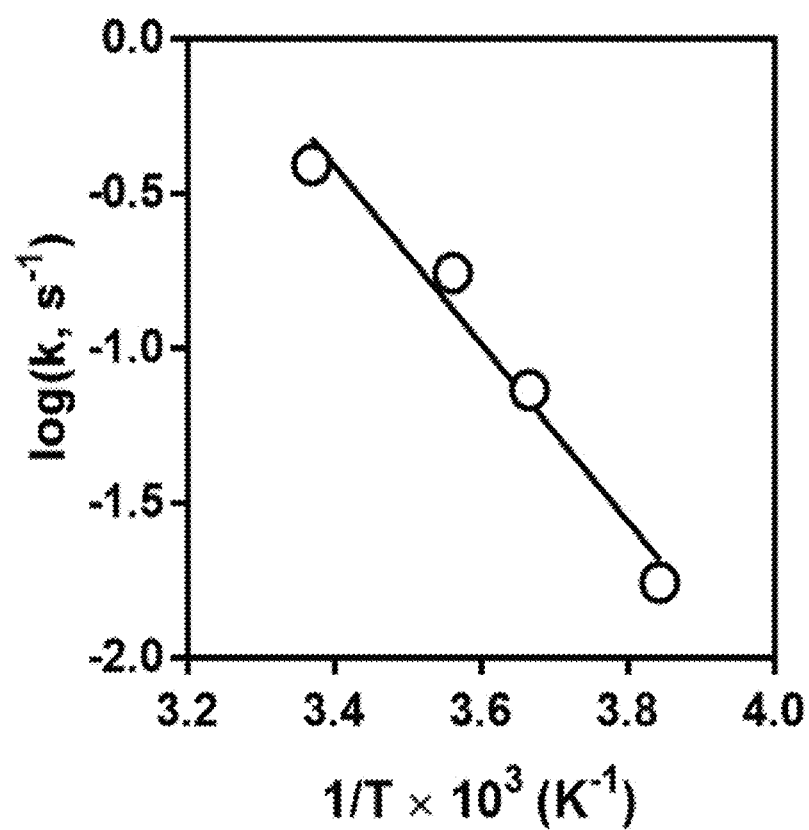
FIG. 22D shows the Arrhenius plot to determine the activation energy of the reaction of FIG. 22A, according to one or more embodiments.
Figure 23:
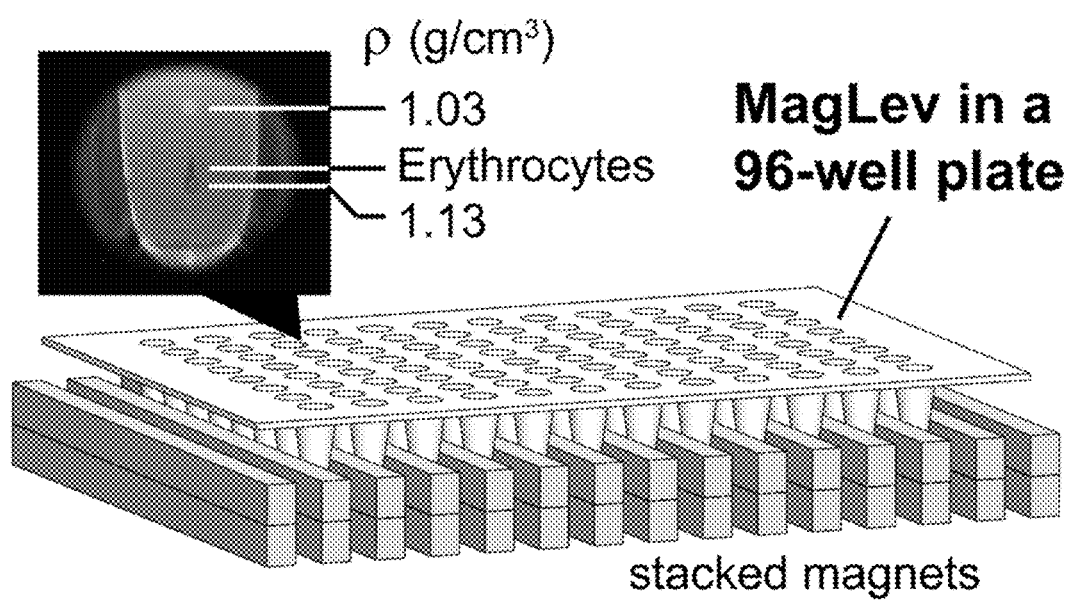
FIG. 23 shows the analytic device described in one or more embodiments, used to measure the density of erythrocytes.

Empirical determination of the composition of the suspension medium (11 mM $GdCl_3$ and 0.7 M $ZnBr_2$ in dimethylformamide) to levitate the polymer beads in the device at room temperature (23±1° C.) was conducted, such that the densities of the unreacted (1.04 $g/cm^3$, experimentally determined using the magnetic levitation (MagLev) device of FIG. 2) and fully converted (1.12 $g/cm^3$) beads spanned approximately the full linear range of density (FIG. 22B). The levitation height of the beads (marked by the black arrowhead, sampled from the reacting mixture at 23.6° C. at four time points during the reaction) decreased as the reaction proceeded. The suspension medium was dimethylformamide (DMF) containing 11 mM $GdCl_3$ and 0.7 M $ZnBr_2$, and all density measurements were carried out at room temperature (23.6° C.). The levitation height of the beads enabled the calculation of the fraction of conversion of the amine present on the beads, and also of the rate constants at different temperatures (FIG. 22C). The Arrhenius activation of this reaction (FIG. 22D) was determined to be 55 kJ/mol, which agreed with a reported value (64 kJ/mol, a relative difference of 14%).

Contemplated Utilities

In several embodiments, the analytic device and method of using the analytic device for high-throughput density analysis has several contemplated uses. Non-limiting examples of these include (i) materials chemistry to separate, analyze, and/or identify materials, and to monitor physical and/or chemical changes of materials over time, (ii) forensic science and other areas that deal extensively with various sorts of materials (e.g., analysis of trace evidence, and separation/identification of small minerals for geological applications), (iii) analytical science to develop broadly useful and easily accessible density-based assays, and (iv) biological and medical fields to measure and monitor changes in density associated with cellular activities and/or physiological conditions. The optical system and design of the analytic device described in one or more embodiments may also be valuable for other parallel measurements using similar formats.

It will be appreciated that while one or more particular materials or steps have been shown and described for purposes of explanation, the materials or steps may be varied in certain respects, or materials or steps may be combined, while still obtaining the desired outcome. Additionally, modification to the disclosed embodiment and the invention as claimed are possible and within the scope of this disclosed invention.

The invention claimed is:

1. A device, comprising:
a plate comprising a sample deposition tube adapted to receive a sample comprising one or more analytes, the sample deposition tube defining a vertical axis substantially perpendicular to a main surface of the plate; and
a mirror positioned to project, substantially parallel to the main surface of the plate, an image of the sample deposition tube along its vertical axis, so as to allow determination of the vertical location of the one or more analytes inside the sample deposition tube.

2. The device of claim 1, wherein the mirror is positioned at about 40° to about 50° with respect to the vertical axis substantially perpendicular to the main surface of the plate.

3. The device of claim 2, wherein the mirror is positioned at about 45° with respect to the vertical axis substantially perpendicular to the main surface of the plate.

4. The device of claim 1, further comprising a plurality of said sample deposition tubes and one or more said mirrors, wherein each one of the plurality of mirrors is positioned to project, substantially parallel to the main surface of the plate, an image of one or more of the plurality of the sample deposition tubes along the vertical axis substantially perpendicular to the main surface of the plate.

5. The device of claim 1, further comprising an image-capturing device.

6. The device of claim 5, wherein the image-capturing device comprises a flatbed scanner, a camera, or a combination thereof.

7. The device of claim 1, further comprising one or more relay lenses configured to focus the projected image.

8. The device of claim 1, wherein the main surface of the plate is defined by an x-axis and a y-axis, and wherein the plate comprises m sample deposition tubes arranged in a row along the x-axis, n sample deposition tubes arranged in a row along the y-axis, and a plurality of said mirrors each positioned to project, substantially parallel to the main surface of the plate, an image of one of the sample deposition tubes along its vertical axis.

9. The device of claim 8, wherein m and n are 2 and 3, 3 and 4, 4 and 6, 6 and 8, 8 and 12, 16 and 24, or 32 and 48, respectively.

10. The device of claim 1, wherein the plate comprises 6, 12, 24, 48, 96, 384, or 1536 said sample deposition tubes.

11. The device of claim 10, wherein the plate comprises 96 said sample deposition tubes.

12. The device of claim 1, further comprising a first magnet and a second magnet disposed adjacent to the sample deposition tube to impart a magnetic field that is inside the sample deposition tube; wherein each magnet comprises a first pole and a second pole, and the first pole of the first magnet faces the first pole of the second magnet.

13. The device of claim 12, further comprising a third magnet disposed underneath the first magnet and a fourth magnet disposed underneath the second magnet; wherein each of the third and fourth magnets comprises a first pole and a second pole, and the second pole of the third magnet faces the second pole of the second magnet.

14. The device of claim 12, further comprising a plurality of said sample deposition tubes and a plurality of said first and second magnets.

15. The device of claim 1, wherein the sample comprises a paramagnetic medium.

16. The device of claim 15, wherein the paramagnetic medium comprises a paramagnetic salt, a paramagnetic hydrophobic metal chelate, or a paramagnetic ionic liquid.

17. The device of claim 16, wherein the paramagnetic salt comprises $MnCl_2$, $GdCl_3$, $DyCl_3$, $MnBr_2$, $CuSO_4$, $FeCl_2$, or $HoCl_3$.

18. The device of claim 16, wherein the metal chelate comprises gadopentetate dimeglumine (Gd•DTPA), gadodiamide, gadoversetamide, gadobenate dimeglumine, gadoxetate disodium, gadofosveset trisodium, gadoteridol, gadobutrol, or gadoterate meglumine.

19. The device of claim 16, wherein the paramagnetic ionic liquid comprises [methyltrioctylammonium]$_2$ [MnCl$_4$], [methyltrioctylammonium]$_3$ [GdCl$_6$], [methyltrioctylammonium]$_3$ [HoCl$_6$], [methyltrioctylammonium]$_3$ [HoBr$_6$], [1-butyl-3-methyl imidazolium]3 [HoCl$_6$], [1-butyl-3-methyl imidazolium][FeCl$_4$], [1-butyl-2,3-dimethyl imidazolium]2 [MnCl$_4$], [1-butyl-2,3-dimethyl imidazolium]$_3$ [DyCl$_6$], [1-butyl-3-methyl imidazolium]3 [DyCl$_6$], [alanine methylester][FeCl$_4$], [alanine methylester]$_2$ [MnCl$_4$], [alanine methylester]3 [GdCl$_6$], [alanine methylester]$_3$ [HoCl$_6$], or [alanine methylester]$_3$ [DyCl$_6$].

20. The device of claim 1, wherein the one or more analytes comprise a diamagnetic material.

21. The device of claim 1, wherein the one or more analytes comprise molecules, particles, powders, emulsions, biological samples, or biological cells.

22. A method comprising:
providing a device comprising:
a plate comprising one or more sample deposition tubes adapted to receive one or more samples comprising one or more analytes, each of the one or more sample deposition tubes defining a vertical axis substantially perpendicular to a main surface of the plate; and
one or more mirrors positioned to project, substantially parallel to the main surface of the plate, an image of each of the one or more sample deposition tubes along its vertical axis, so as to allow determination of the vertical location of the one or more analytes inside each of the one or more sample deposition tubes;
depositing a sample comprising one or more analytes into one or more of the sample deposition tubes;
allowing the one or more analytes to migrate to a position at least partially determined by its density; and
projecting, substantially parallel to the main surface of the plate, an image of each of the one or more sample deposition tubes along its vertical axis to determine the vertical location of the one or more analytes inside each of the one or more sample deposition tubes.

* * * * *